(12) United States Patent
Ikeda et al.

(10) Patent No.: US 8,838,111 B2
(45) Date of Patent: Sep. 16, 2014

(54) COMMUNICATION SYSTEM, COMMUNICATION METHOD, MOBILE TERMINAL, AND BASE STATION DEVICE

(75) Inventors: Shinkichi Ikeda, Kanagawa (JP); Takahisa Aoyama, Kanagawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 38 days.

(21) Appl. No.: 13/818,247

(22) PCT Filed: Sep. 8, 2011

(86) PCT No.: PCT/JP2011/005057
§ 371 (c)(1),
(2), (4) Date: Feb. 21, 2013

(87) PCT Pub. No.: WO2012/032782
PCT Pub. Date: Mar. 15, 2012

(65) Prior Publication Data
US 2013/0157659 A1 Jun. 20, 2013

(30) Foreign Application Priority Data

Sep. 9, 2010 (JP) .................................. 2010-202516
Jun. 15, 2011 (JP) .................................. 2011-133394

(51) Int. Cl.
*H04W 36/00* (2009.01)
*H04L 29/06* (2006.01)
*H04W 12/08* (2009.01)
*H04W 60/00* (2009.01)
*H04W 36/08* (2009.01)
*H04W 76/02* (2009.01)
*H04W 88/08* (2009.01)
*H04W 8/08* (2009.01)

(52) U.S. Cl.
CPC ............ *H04W 36/08* (2013.01); *H04L 63/0236* (2013.01); *H04W 12/08* (2013.01); *H04L 63/0263* (2013.01); *H04W 36/0033* (2013.01); *H04W 76/022* (2013.01); *H04W 60/00* (2013.01); *H04W 88/08* (2013.01); *H04L 63/164* (2013.01); *H04W 8/082* (2013.01)
USPC ............ 455/436; 455/437; 455/438; 455/447

(58) Field of Classification Search
CPC . H04W 12/08; H04W 36/0033; H04W 36/08; H04W 60/00; H04W 88/08; H04W 8/082
USPC ......... 455/436, 437, 438, 439, 442, 445, 451, 455/452.1
See application file for complete search history.

(56) References Cited

U.S. PATENT DOCUMENTS 8,259,659 B2 * 9/2012 Luft et al. .................... 370/329
8,311,541 B2 * 11/2012 Yano et al. ................... 455/436

(Continued)

OTHER PUBLICATIONS

3GPP 23.829 V1.1.0 (May 2010) Local IP Access and Selected IP Traffic Offload (Release 10).

(Continued)

Primary Examiner — Jean Gelin
(74) Attorney, Agent, or Firm — Pearne & Gordon LLP

(57) ABSTRACT

A base station device includes a processing unit that performs a base station process on a mobile terminal and a core network device; a cellular communication unit for connection to the mobile terminal; and a connection control unit, wherein the cellular communication unit receives a connection request message for connection to an external network from the mobile terminal, the base station processing unit replaces an access point name of the connection request message with "APN-L" and transfers the connection request message to a mobility management entity when the access point name indicating a local network is other than APN-L, and the connection control unit performs a radio bearer setting process between the mobile terminal and the connection control unit, based on a context setup request message in which the "APN-L", having a bearer established, received from the mobility management entity is stored.

9 Claims, 56 Drawing Sheets

(56) References Cited

U.S. PATENT DOCUMENTS

| | | | |
|---|---|---|---|
| 8,401,068 B2 * | 3/2013 | Ulupinar et al. | 375/240 |
| 8,452,327 B2 * | 5/2013 | Liu et al. | 455/552.1 |
| 2009/0109925 A1 * | 4/2009 | Nakamura et al. | 370/331 |
| 2010/0150049 A1 * | 6/2010 | Kim et al. | 370/312 |
| 2010/0329205 A1 * | 12/2010 | Bi et al. | 370/331 |
| 2011/0075675 A1 * | 3/2011 | Koodli et al. | 370/401 |
| 2011/0103310 A1 * | 5/2011 | Stojanovski et al. | 370/328 |
| 2011/0170469 A1 * | 7/2011 | Watfa et al. | 370/312 |
| 2012/0033679 A1 * | 2/2012 | Horn | 370/401 |
| 2013/0051327 A1 * | 2/2013 | Kim et al. | 370/328 |
| 2013/0294410 A1 * | 11/2013 | Shuai et al. | 370/331 |

OTHER PUBLICATIONS

Qualcomm Incorporated, Verizon Wireless, Coexistence of the corporate APN and LIPA, [online]. 3GPP TSG SA WG2 Meeting #80 S2-103375, Aug. 30, 2010, [retrieved on Nov. 21, 2011] Retrieved from the Internet: <URL:http://www.3gpp.org/ftp/tsg_sa/WG2_Arch/TSGS2_80_Brunstad/ Docs/S2-103375.zip>.

Alcatel-Lucent, LG Electronics, Verizon Wireless, HSS configuration for LIPA, [online]. 3GPP TSG SA WG2 Meeting #80 S2-103263, Aug. 30, 2010, [retrieved on Nov. 21, 2011]. Retrieved from the Internet: <URL:http://www.3gpp.org/ftp/tsg_sa/WG2_Arch/TSGS2_80_Brunstad/Docs/S2-103263.zip>.

International Search Report for Application No. PCT/JP2011/005057 dated Nov. 29, 2011.

* cited by examiner

COMMUNICATION SYSTEM, COMMUNICATION METHOD, MOBILE TERMINAL, AND BASE STATION DEVICE

TECHNICAL FIELD

The present invention relates to a communication system, a communication method, a mobile terminal, and a base station device.

BACKGROUND ART

As a measure for expanding the coverage of a cellular communication system, the introduction of femto base stations that form cells for covering narrow areas such as residential houses, schools, and enterprises has proceeded. Further, expectation for local IP access services to be connected to local networks utilized through femto base stations by homes, schools, enterprises and the like has increased. This is expectation for the high level of QoS guarantee and security according to the use of cellular technology, as compared to local network connection using a wireless LAN in the related art.

The local network connection through the femto base station has been studied in standard-setting organizations that formulate cellular standard technology. Particularly, in 3GPP (3rd Generation Partnership Project), as local IP access (LIPA), the formulation of network architecture, procedures, and protocols have proceeded (Non Patent Literature 1). Non Patent Literature 1 discloses a method of causing a mobile terminal to specify an identifier (particularly, access point name, referred to as APN) indicating a local network (hereinafter, also referred to as a local IP network or a LIPA network) serving a connection destination and perform LIPA.

On the other hand, with the progress of technological development in which cellular phones are made into IP terminals, full-time connection to the Internet has been realized. In such a situation, a large number of essential problems, such as unintentional access to malicious Internet sites or the receiving of electronic mails including a virus, in Internet full-time connection have been confirmed. In order to solve such problems, there is a method of setting a security filter in a packet gateway or the like of an operator network. Here, in the security filter, so-called five-tuples constituted by a combination of source/destination addresses, port numbers, protocol numbers or the like, and an URL or the like which is an identifier of a web page are set as a filter entry. When a security gateway picks up packets matching with the security filter entry, the security gateway executes action such as the discard of packets or the notifying of a user.

The setting of the security filter entry as mentioned above is generally performed via a subscriber information database or the like. For example, a user performs the setting of the filter entry through a web page or the like of an operator. Therefore, it takes time until the setting is reflected. Addresses or port numbers to be used may be dynamically changed depending on services, and thus real-time reflection in the filter entry becomes an important requirement.

In addition, it is necessary that individual cellular phone users individually act. Particularly, in areas, such as schools or educational facilities, in which a large number of cellular phone users gather, it is considered to perform collective setting as school affairs. Individual setting for a large number of cellular phones takes considerable effort. Furthermore, since harmful sites on the Internet increase every day, the filter entry is required to be updated accordingly, and thus effort to perform individual setting is considerable. In addition, it is also considered that students change the filter entry independently, and thus there is a limit on the setting of the filter entry, required for educational environment recommended by schools, in individual cellular phone contracts.

In order to solve the above-mentioned problems, a gateway for performing security filtering network is installed in the school. For example, it is considered that a serving gateway (SGW) which is equipment of an operator core network is installed on a network utilized by the school, and that security filtering is carried out. This is to accommodate a cellular phone to be filtered in the femto base station, establish PDN connection for Internet connection via the SGW in the school with a packet gateway (PGW) of an operator core network, and filter the traffic of the cellular phone in the SGW. Thereby, since the security filter can be set in the SGW in the school, it is possible to secure the real-time properties of setting reflection. In addition, since the traffic of cellular phones to be accommodated can be filtered collectively, it is not necessary to perform the setting of the filter entry on individual cellular phones.

CITATION LIST

Non Patent Literature

Non Patent Literature 1: TR23.829 version 1.1.0; "Local IP Access and Selected IP Traffic Offload, Release-10"

SUMMARY OF INVENTION

Technical Problem

However, in the above-mentioned method, an SGW is expensive operator equipment, and the high level of security is required after the installation thereof. Particularly, a measure of high security based on, for example, the stipulation of an operator is required to be applied to a network in a school in order not to be under attack from an external network such as the Internet through a network in a school, and thus there is a concern of network management costs being increased remarkably.

In addition, at the time of the connection of a cellular phone, a mobile management entity (MME) which is an operator core network device selects a serving gateway (SGW) which serves as a connection destination. However, in order to select a serving gateway (SGW) in accordance with a base station serving as a connection source, it is necessary to hold and manage, for example, mapping tables of the serving gateway (SGW) and the base station. That is, only when connection from a specific femto base station is confirmed, individual management such as the allocation of the serving gateway (SGW) in a school is required in the mobile management entity (MME), and thus there is a problem of the selection of the serving gateway (SGW) becoming complicated.

An object of the present invention is to provide a communication system, a communication method, a mobile terminal, and a base station device for switching a connection of a mobile terminal connected to a network through a base station device to a non-cellular connection via a local network access which is connected through a cellular channel.

Solution to Problem

The present invention provides a base station device, including: a base station processing unit that performs a base station process on a mobile terminal and a core network device; a cellular communication unit for connection to the mobile terminal through a cellular channel; and a connection control unit, wherein the cellular communication unit receives a connection request message (Attach Request) for connection to an external network PDN from the mobile terminal, when an access point name (APN) indicating a local network is other than APN-L based on the access point name (APN) specified in the connection request message, the base station processing unit replaces the access point name (APN) of the connection request message with "APN-L" which is an access point name (APN) and transfers the replaced connection request message to a mobility management entity (MME), and the connection control unit performs a radio bearer setting process between the mobile terminal (UE) and the connection control unit through the cellular communication unit based on a context setup request message in which the "APN-L" which is an access point name (APN), having a bearer established, received from the mobility management entity (MME) is stored.

The present invention also provides a mobile terminal, including: a communication processing unit that performs protocol processing including a connection and a handover to a base station device; a connection establishment processing unit that switches between a connection to an external network PDN through the base station device and a connection using LIPA through the base station device; and an N3G connection establishment processing unit that performs a handover using a Non3G access method, wherein the connection establishment processing unit performs the handover using the Non3G access method through the N3G connection establishment processing unit when it is determined that an access point name (APN) of a connection destination notified from the base station device through the communication processing unit at a time of reconnection is an access point name (APN-L) for LIPA which is different from an access point name (APN-M) of the external network PDN which is an access point name (APN) of a connection destination specified through the communication processing unit at a time of initial connection.

The present invention also provides a base station device, including: an LGW communication unit that performs a protocol for connection to a local gateway (LGW); a cellular communication unit for connection to a mobile terminal through a cellular channel; and a connection control unit, wherein the LGW communication unit stores an access point name (APN-L) for LIPA in a handover indication message to transmit the handover indication message to a mobility management entity (MME), and receives a context setup request message that stores the access point name (APN-L) for LIPA, as an access point name (APN) having a radio bearer established, from the mobility management entity (MME), and the connection control unit performs a setting process of a LIPA bearer which is different from a bearer to an external network PDN established before a handover through the cellular communication unit based on the access point name (APN-L) for LIPA stored in the context setup request message.

The present invention also provides a communication system in which a mobile terminal returns from an idle mode to start communication, wherein a base station device stores an access point name (APN-L) of LIPA to which the mobile terminal is capable of being connected through the base station device, in a service request message for causing the mobile terminal to return from the idle mode and start the communication, and transmits the service request message to a mobility management entity (MME), and the mobility management entity (MME) selects an address of a local gateway (LGW) corresponding to the access point name (APN-L) of LIPA which is stored in the service request message, and transmits a context setup request message in which "APN-L" which is an access point name (APN), having a radio bearer established, is stored, to the base station device.

The present invention also provides a communication system in which a mobile terminal performs a handover from a base station device to a macro base station eNB, wherein the macro base station eNB stores information indicating whether or not to allow LIPA to be performed on an access point name (APN) to which the mobile terminal is connected, in a handover indication message, based on a handover confirmation message received from the mobile terminal, and transmits the handover indication message to a mobility management entity (MME), and the mobility management entity (MME) hands over an established LIPA bearer to the macro base station eNB, when it is determined that LIPA is able to be performed based on the information indicating whether or not to allow LIPA to be performed, and extracts an address of a packet gateway PGW to which a connection on a LIPA bearer is connected based on subscriber information of the mobile terminal, when it is determined that LIPA is not able to be performed based on the information indicating whether or not to allow LIPA to be performed.

The present invention also provides a communication system including a macro base station (eNB) and a mobility management entity (MME), in which a mobile terminal returns from an idle mode to start communication, wherein the macro base station eNB stores information indicating whether or not to allow LIPA to be performed on an access point name (APN) to which the mobile terminal is connected, in a service request message for causing the mobile terminal to return from the idle mode to start the communication, and transmits the service request message to the mobility management entity (MME), and the mobility management entity (MME) establishes an established LIPA bearer in the macro base station eNB, when it is determined that LIPA is able to be performed based on the information indicating whether or not to allow LIPA to be performed, and extracts an address of a packet gateway PGW to which a connection on a LIPA bearer is connected based on subscriber information of the mobile terminal, when it is determined that LIPA is not able to be performed based on the information indicating whether or not to allow LIPA to be performed.

The present invention also provides a communication system in which a mobile terminal is connected to an external network PDN from a base station device via a LIPA bearer, wherein the mobile terminal stores an access point name (APN-M) indicating the external network PDN serving as a connection destination on an established LIPA bearer, and transmits a DHCP request message to a DHCP server, and the DHCP server commands a filter gateway to establish a path with a packet gateway PGW, when connection to "APN-M" is approved to the mobile terminal as a result of authentication/approval to APN-M received from an AAA server, and transmits a DHCP response message storing an IP address for connection to APN-M, to the mobile terminal.

The present invention also provides a communication method between a mobile terminal and a base station device which includes a base station processing unit that performs a base station process on the mobile terminal and a core network device, a cellular communication unit for connection to the mobile terminal through a cellular channel, and a connection control unit, the communication method including: a step of causing the cellular communication unit to receive a connection request message (Attach Request) for connection to an external network PDN from the mobile terminal; a step of causing the base station processing unit to replace an access point name (APN) of the connection request message with "APN-L" which is an access point name (APN) and transfer the connection request message to a mobility management entity (MME), when the access point name (APN) indicating a local network is other than APN-L based on the access point name (APN) specified in the connection request message, and a step of causing the connection control unit to perform a radio bearer setting process between the mobile terminal (UE) and the connection control unit through the cellular communication unit based on a context setup request message in which the "APN-L" which is an access point name (APN), having a bearer established, received from the mobility management entity (MME) is stored.

Advantageous Effects of Invention

According to the communication system, the communication method, the mobile terminal, and the base station device of the present invention, it is possible to switch a connection of a mobile terminal connected to a network through a base station device to a connection via a local network access, and to apply real-time and inexpensive security filtering to the traffic of the mobile terminal.

In addition, according to the communication system, the communication method, the mobile terminal, and the base station device of the present invention, an operator core network device which is expensive like a serving gateway (SGW) and of which the significantly high security of a management network is required is not required to be installed locally, and thus it is possible to reduce operational costs.

In addition, according to the communication system, the communication method, the mobile terminal, and the base station device of the present invention, when the mobile management entity (MME) selects the serving gateway (SGW), the database management of a specific base station is also not required, and thus it is possible to reduce a database management load and a processing load in the mobile management entity (MME).

DESCRIPTION OF EMBODIMENTS

Hereinafter, embodiments of the present invention will be described with reference to the accompanying drawings.

First Embodiment

In a communication system according to a first embodiment, a cellular phone (hereinafter, referred to as a mobile terminal) performs an initial connection (Initial Attach) process for accessing a PDN (Packet Data Network) that provides network services such as the Internet via a femto base station (hereinafter, referred to as a local base station).

<Configuration of Communication System>

Figure 1:
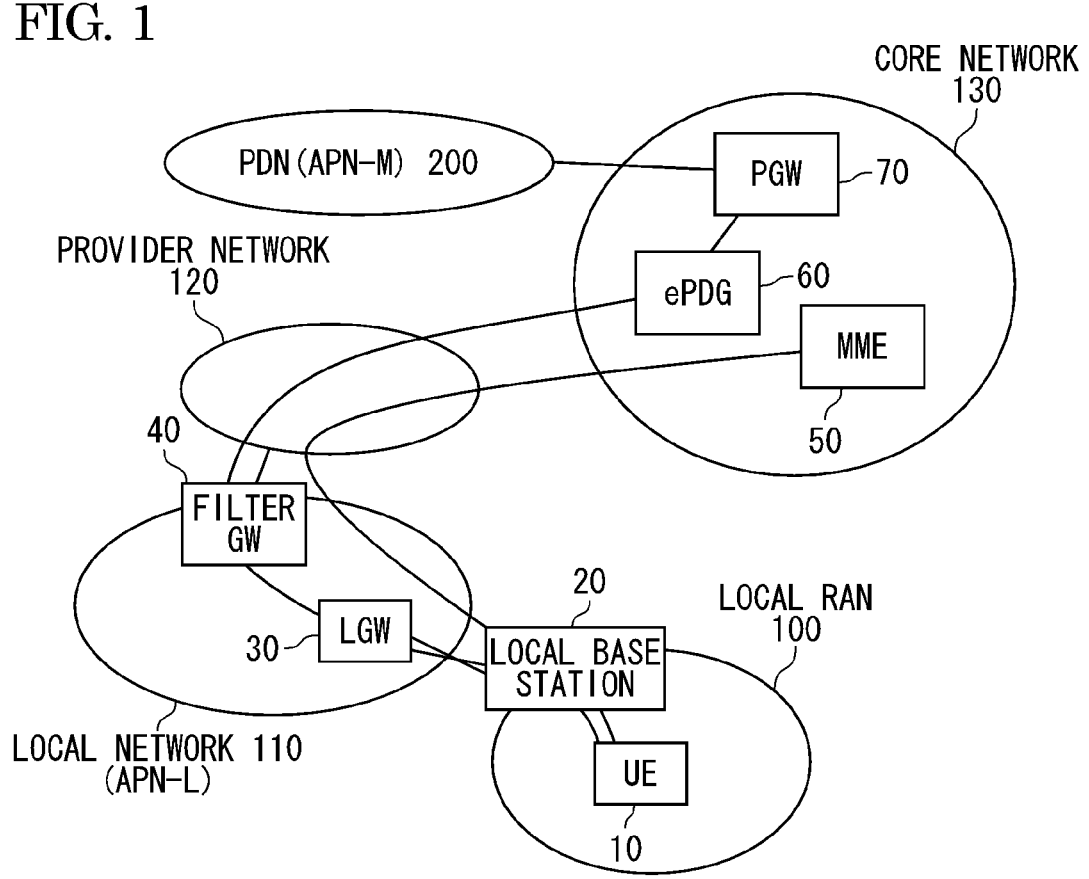
FIG. 1 is a diagram illustrating a configuration of a communication system according to a first embodiment.

A configuration of the communication system according to the first embodiment will be described with reference to FIG. 1. FIG. 1 is a diagram illustrating a configuration of the communication system according to the first embodiment. The communication system shown in FIG. 1 includes a mobile terminal 10 (UE 10 in the drawing) functioning a user equipment (UE), a local base station 20 to which the mobile terminal 10 is connected, a local RAN 100 formed by the local base station 20, a local network 110 to which the local base station 20 is connected, a local gateway (LGW) 30 (LGW 30 in the drawing), installed on the local network 110, which serves as a gateway when the mobile terminal 10 is connected to the local network 110, a provider network 120 that accommodates the local network 110, an operator core network 130, a mobility management entity (MME) 50 (MME 50 in the drawing) disposed in the operator core network 130, a packet gateway ePDG 60 (ePDG 60 in the drawing) disposed in the operator core network 130, a packet gateway PGW 70 (PGW 70 in the drawing) disposed in the operator core network 130, an external network PDN 200 (PDN (APN-M) 200 in the drawing) to which the mobile terminal 10 is connected via the operator core network 130, and a filter gateway (filter GW) 40 (filter GW 40 in the drawing) that monitors packets which the mobile terminal 10 and the external network PDN 200 exchange with each other.

<Operation of Communication System>

Figure 2:
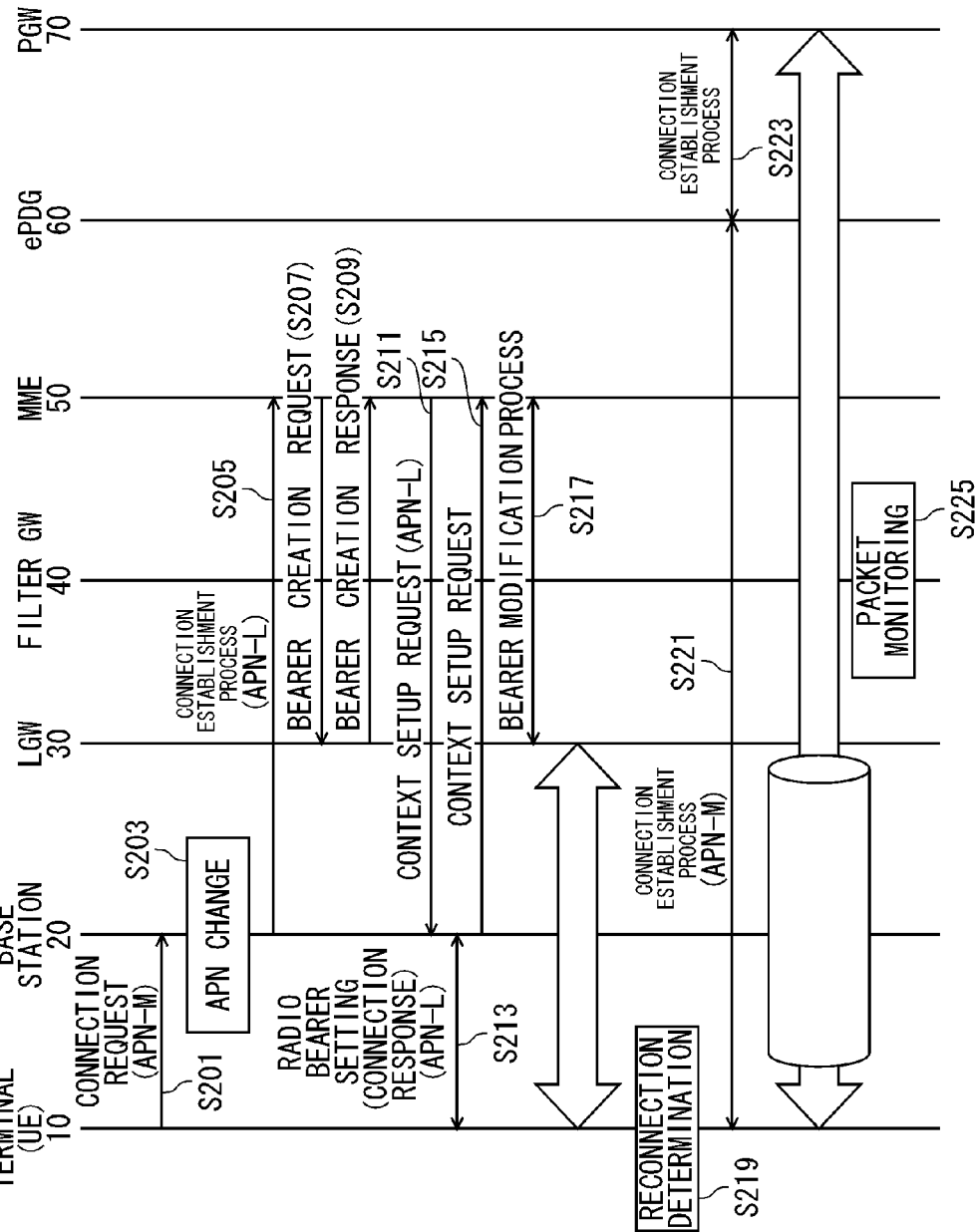
FIG. 2 is a diagram illustrating operations of the communication system shown in FIG. 1.

Operations of the communication system shown in FIG. 1 will be described with reference to FIG. 2. FIG. 2 is a diagram illustrating the operations of the communication system shown in FIG. 1. As shown in FIG. 2, the mobile terminal (UE) 10 transmits a connection request message (Attach Request) for connection to the external network PDN 200 to the local base station 20 (step S201: connection request (APN-M)). Here, an identifier APN (Access Point Name) of a connection destination network to be specified is set to APN-M indicating the external network PDN 200.

The local base station 20 receiving the connection request message confirms an access point name (APN) specified in the connection request message. When the specified access point name (APN) is other than an access point name (APN) (set to, for example, APN-L) indicating the local network 110, the local base station 20 replaces the access point name (APN) specified in the connection request message with "APN-L" (step S203: APN change), and transfers it to the mobility management entity (MME) 50 (step S205: connection request (APN-L)).

Alternatively, the local base station 20 receiving the connection request message does not correct the APN specified in the connection request message, but adds the APN (APN-L) indicating the local network 110 to a container message for transferring the connection request message to the mobility management entity (MME) 50, and transmits the message to the mobility management entity (MME) 50 (connection request message transfer) (step S205: connection request (APN-L)).

Alternatively, the local base station 20 receiving the connection request message may add information (for example, a flag or a LIPA indicator) that promotes LIPA bearer establishment, instead of the "APN-L" which is an access point name (APN) indicating the local network 110, to the connection request message or the container message for transferring the connection request message to the mobility management entity (MME) 50. In this case, the connection request message maintains a state where the APN-M specified by the mobile terminal (UE) 10 is stored, but has a meaning of requesting the connection establishment via the LIPA. Thereby, the local base station 20 requests the mobility management entity (MME) 50 to establish LIPA connection (LIPA bearer) to the local network 110.

The mobility management entity (MME) 50 receiving the connection request message extracts an access point name (APN) (here, "APN-L") from the connection request message or the container message that transfers the connection request message, derives a gateway (LGW 30 in the present embodiment) serving as a connection destination, and generates a context regarding a LIPA bearer of the mobile terminal (UE) 10.

Meanwhile, the "APN-L" (or, LIPA indicator) may be specified by the mobility management entity (MME) 50. That is, in the mobility management entity (MME) 50, the access point name (access point name (APN) for LIPA: "APN-L") for the LIPA bearer establishment which corresponds to the local base station 20 (identified by a base station identifier, a cell identifier, a CSG value, and the like) or the feasibility of the LIPA connection is managed, and the access point name (APN) for LIPA or the LIPA indicator is specified at all times with respect to a connection request via the local base station 20. Thus, the following processes may be performed.

Subsequently, the mobility management entity (MME) 50 transmits a bearer creation request message for generating a LIPA bearer to the derived local gateway (LGW) 30 (step S207: bearer creation request).

The local gateway (LGW) 30 generates a context regarding the LIPA bearer of the mobile terminal (UE) 10, and transmits a bearer creation response message to the mobility management entity (MME) 50 (step S209: bearer creation response).

The mobility management entity (MME) 50 transmits a context setup request message that requests the establishment of a radio bearer to the local base station 20 (step S211: context setup request). Here, a connection response message is superimposed on the context setup request message, and "APN-L" is stored here as an access point name (APN) which is a connection destination of a bearer established in the connection response message.

When the context setup request message is received, the local base station 20 performs a radio bearer setting process between the mobile terminal (UE) 10 and the local base station. At this time, the local base station 20 transfers the connection response message (including "APN-L") superimposed on the context setup request message to the mobile terminal (UE) 10 (step S213: radio bearer setting (connection response) (APN-L)).

When the local base station 20 completes the radio bearer establishment with the mobile terminal (UE) 10, the local base station 20 transmits a context setup response message to the mobility management entity (MME) 50 (step S215: context setup response).

In order to reflect a QoS parameter of the established radio bearer, the mobility management entity (MME) 50 performs a bearer modification process, as necessary, between the local gateway (LGW) 30 and the mobility management entity (step S217: bearer modification process). Thereby, the LIPA bearer is established between the mobile terminal (UE) 10 and the local gateway (LGW) 30. Meanwhile, messages exchanged between the mobility management entity (MME) 50 and the local gateway (LGW) 30 may be routed through the local base station 20. Thereby, the interface (particularly, signaling interface) between the mobility management entity (MME) 50 and the local network 110 can be unified in one. Particularly, interface management costs in the mobility management entity (MME) 50 can be reduced.

Here, the mobile terminal (UE) 10 detects connection to the "APN-L" different from the "APN-M" which is initially specified in the connection request. By receiving this, the mobile terminal (UE) 10 determines, under the present local base station 20, that connection to the external network PDN ("APN-M") directly via the core network 130 is not permitted, and determines that (re)connection using a Non3G access method on the LIPA bearer is performed (step S219: reconnection determination).

Meanwhile, when the reconnection is determined, the mobile terminal (UE) 10 may further detect that the connected "APN-L" is an access point name (APN) for the LIPA connection. For example, the mobile terminal (UE) 10 performs the detection from the fact that an identifier indicating the LIPA connection of domain name "lipa" or the like is provided. Thereby, the mobile terminal (UE) 10 determines more reliably that the PDN via the core network is possible through an off-road via the LIPA, and misconnection can be prevented from occurring. That is, the APN-L is not used for the LIPA connection, but is used for avoiding the establishment of such redundant connection as to superimpose another external network connection on connection to an external network, and thus it is possible to reduce useless consumption of network resources.

In addition, the mobility management entity (MME) 50 or the local base station 20 may give notice of the "APN-L" in the connection response message, and may notify the mobile terminal (UE) 10 of information (for example, flag) indicating that connection to the external network PDN ("APN-M") directly via the core network is not permitted under the present local base station 20. Thereby, the mobile terminal (UE) 10 performs the reconnection determination more reliably, and thus it is possible to prevent resources from being uselessly consumed due to erroneous determination. In order to perform reconnection using a Non-3GPP access method on the LIPA bearer, the mobile terminal (UE) 10 generates an identifier for finding the packet gateway ePDG 60 disposed in the core network 130 (or using an identifier which is generated beforehand), and derives an address of the packet gateway ePDG 60 using an address derivation mechanism such as a DNS.

Meanwhile, originally, the ePDG (PDG) is a gateway device for accessing the core network from a Non-3GPP (non-cellular) access network such as WLAN or a wired network. In addition, the ePDG is also referred to as PDG, and the present invention can be performed similarly in any case.

Subsequently, the mobile terminal (UE) 10 starts a connection establishment process to the packet gateway ePDG 60 through the LIPA bearer, that is, using an address (IP address) allocated to the LIPA bearer (step S221: connection establishment process (APN-M)). That is, the mobile terminal (UE) 10 performs an Untrusted Non-3GPP Attach procedure as disclosed in TS23.402. By receiving this, the packet gateway ePDG 60 performs a connection establishment process such as bearer context generation between the packet gateway PGW 70 and the packet gateway (step S223: connection establishment process). Thereby, the mobile terminal (UE) 10 establishes connection to the packet gateway PGW 70, and starts communication with the external network PDN 200.

Meanwhile, in the connection through the LIPA bearer, a null algorithm is selected as an encryption algorithm applied to a tunnel which is established with the packet gateway ePDG 60. This null algorithm may be specified from the mobile terminal (UE) 10, and an AAA server (not shown) may command the ePDG 60 to use the null algorithm by receiving an authentication result at the time of the tunnel establishment. Thereby, packets (application messages) that the mobile terminal (UE) 10 exchanges with the external network PDN 200 can be monitored in the filter GW 40 (step S225: packet monitoring). When a security filter entry is added, real-time filter update can be made by performing an additional correction to a security filter of the filter GW 40 using a predetermined interface. In addition, since the security filter can be set with respect to the mobile terminal (UE) 10 located down the local base station 20, settings for the individual mobile terminal (UE) 10 are not required, and thus management costs can be reduced.

Meanwhile, when the Non-3GPP connection through the LIPA bearer is performed previously, and then new PDN connection is added, the mobile terminal (UE) 10 may start a Non-3GPP connection establishment process to the ePDG 60 immediately using an address of the LIPA bearer. Alternatively, after connection via the local base station 20 is attempted, and a failure notification is received from the mobility management entity (MME) 50, the Non-3GPP connection establishment process on the LIPA bearer may be performed.

In addition, a connection request to other than the access point name (APN) for LIPA may be always driven into failure or refused by the local base station 20 or the mobility management entity (MME) 50. Further, the access point name (APN) for LIPA (here "APN-L") is notified in the connection response message that notifies failure or refusal. When the APN-L is notified in the connection response message that notifies failure or refusal, information indicating that only the connection to this notified access point name (APN) is permitted may be notified together. By receiving this, the mobile terminal (UE) 10 establishes the LIPA bearer, and establishes thereon the connection to the external network PDN 200 through the ePDG 60.

<Configuration and Operation of Mobile Terminal>

Figure 3:
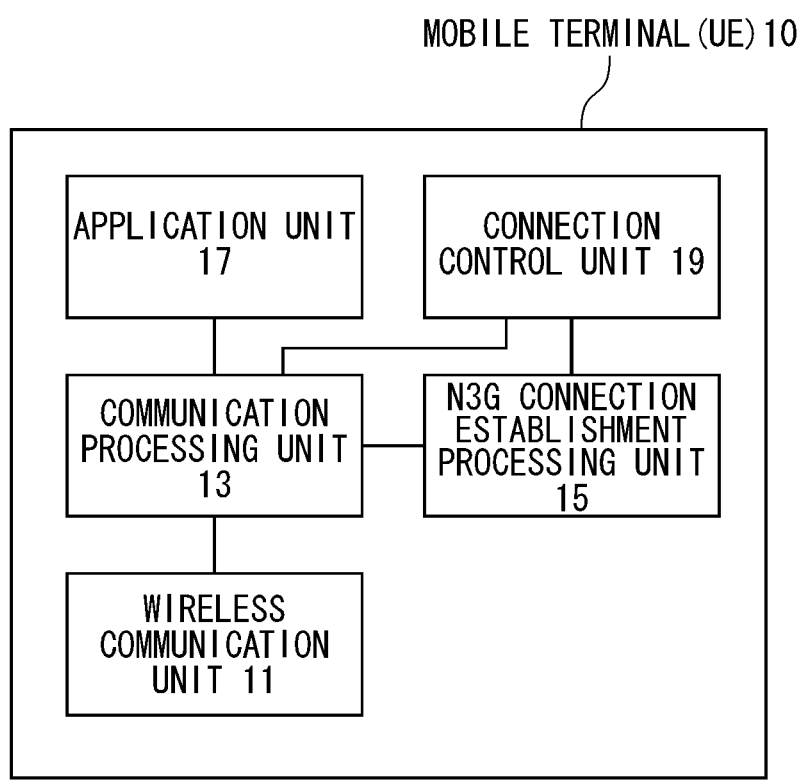
FIG. 3 is a block diagram illustrating a configuration of a mobile terminal (UE) 10.

A configuration of the mobile terminal (UE) 10 according to the first embodiment will be described with reference to FIG. 3. FIG. 3 is a block diagram illustrating a configuration of the mobile terminal (UE) 10. The mobile terminal (UE) 10 shown in FIG. 3 includes a wireless communication unit 11 for physical/logical connection to a cellular base station including the local base station 20, a communication processing unit 13 that performs protocol processing such as connection or handover to a base station or a core network device, an N3G connection establishment processing unit 15 that performs protocol processing between communication nodes used from Non-3GPP access of the ePDG and the like, an application unit 17 for getting applications to work, and a connection control unit 19.

Figure 4:
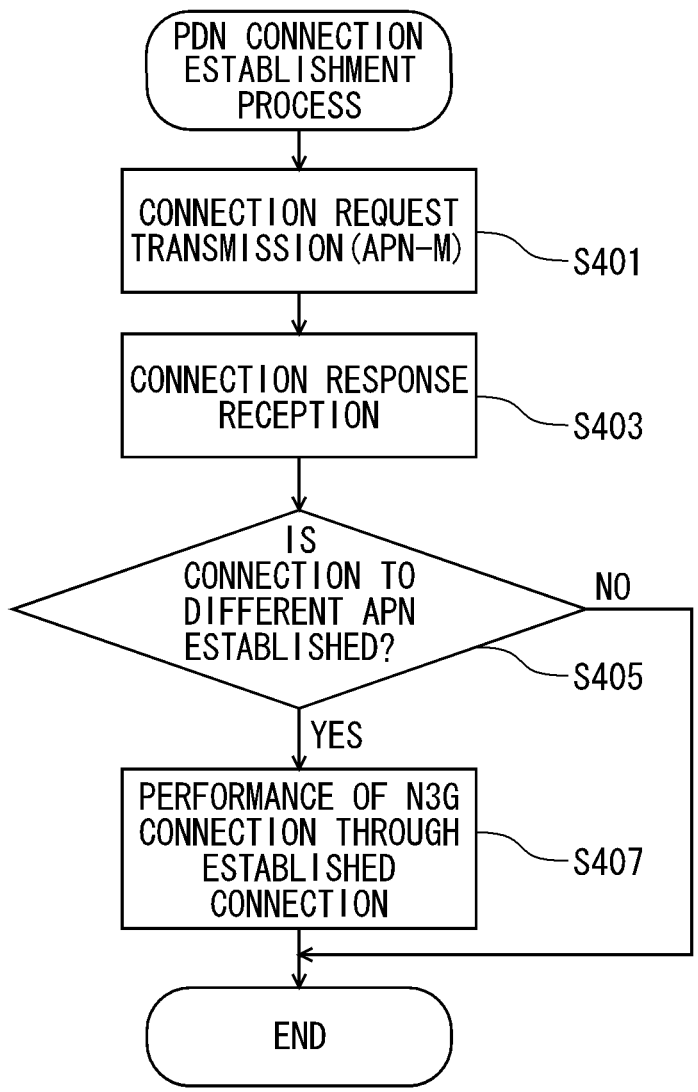
FIG. 4 is a flow diagram illustrating a "PDN connection establishment process" of the mobile terminal (UE) 10.

Operations of the mobile terminal (UE) 10 shown in FIG. 3 will be described with reference to FIG. 4. FIG. 4 is a flow diagram illustrating a "PDN connection establishment process" of the mobile terminal (UE) 10, and is a flow diagram for performing an initial connection establishment process to a local network.

As shown in FIG. 4, the communication processing unit 13 transmits a connection request message (Attach Request) for connection to the external network PDN 200 through the wireless communication unit 11 to the local base station 20 (step S401: connection request transmission (APN-M)).

The wireless communication unit 11 receives the connection response message (including "APN-L") superimposed on the context setup request message from the local base station 20 (step S403: connection response reception).

The connection control unit 19 determines whether connection to an access point name (APN) different from the access point name (APN) which is initially specified in the connection request message is established based on the received connection response message (step S405: is connection to "different APN established?"). For example, when the connection response message (including "APN-L") superimposed on the context setup request message is received from the local base station 20 through the wireless communication unit 11, the connection control unit 19 detects connection to the "APN-L" different from the "APN-M" which is initially specified in the connection request. When the connection to the "APN-L" different from the "APN-M" which is initially specified in the connection request is detected, the connection control unit 19 determines that connection to the external network PDN ("APN-M") directly via the core network 130 is not permitted under the present local base station 20, and the connection control unit 19 determines that (re)connection using a Non3G access method on the LIPA bearer is performed through the N3G connection establishment processing unit 15.

The N3G connection establishment processing unit 15 performs the (re)connection using a Non3G access method on the LIPA bearer through the established connection (step S407: "performance of N3G connection through established connection").

<Configuration and Operation of Local Base Station>

Figure 5:
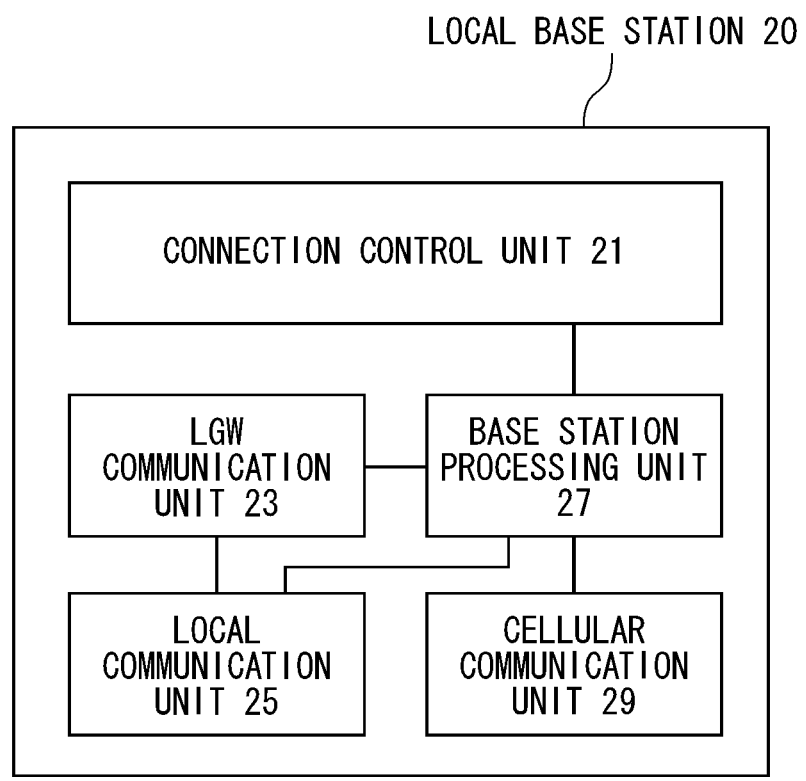
FIG. 5 is a block diagram illustrating a configuration of a local base station 20.

A configuration of the local base station 20 according to the first embodiment will be described with reference to FIG. 5. FIG. 5 is a block diagram illustrating a configuration of the local base station 20. The local base station 20 shown in FIG. 5 includes a connection control unit 21, an LGW communication unit 23 that performs a protocol for connection to a local gateway (LGW), a local communication unit 25 for connection to the local network 110, a base station processing unit 27 that performs a base station process on the mobile terminal (UE) 10 or the core network device, and a cellular communication unit 29 for connection to the mobile terminal (UE) 10 through a cellular channel.

Figure 6:
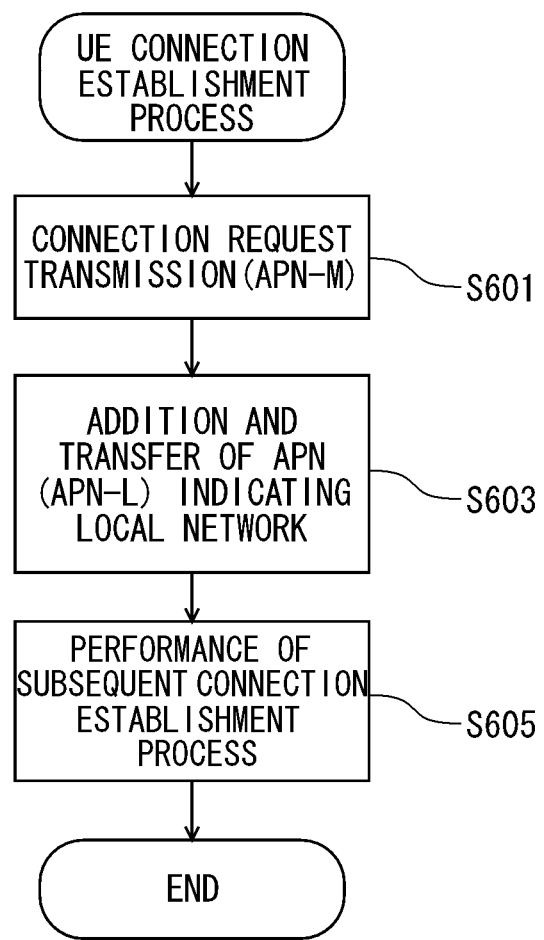
FIG. 6 is a flow diagram illustrating a "UE connection establishment process" of the local base station 20.

Operations of the local base station 20 shown in FIG. 5 will be described with reference to FIG. 6. FIG. 6 is a flow diagram illustrating a "UE connection establishment process" of the local base station 20.

As shown in FIG. 6, the cellular communication unit 29 receives a connection request message (Attach Request) for connection to the external network PDN 200 from the mobile terminal (UE) 10 (step S601: connection request (APN-M)). Here, the identifier APN (Access Point Name) of a connection destination network specified by the mobile terminal (UE) 10 is set to the APN-M indicating the external network PDN 200.

When the specified access point name (APN) is other than the access point name (APN) (for example, APN-L) indicating the local network 110, the connection control unit 21 replaces the access point name (APN) included in the connection request message with the "APN-L" based on the connection request message (Attach Request) for connection to the received external network PDN 200, and transfers it to the mobility management entity (MME) 50 (step S603: "addition and transfer of "APN-L" which is access point name (APN) indicating local network").

The base station processing unit 27 performs a subsequent connection establishment process through each of the communication units (LGW communication unit 23, local communication unit 25, and base station processing unit 27) (step S605: performance of subsequent connection establishment process).

Second Embodiment

In a communication system according to a second embodiment, a mobile terminal (UE) 10A establish PDN connection from a macro base station, and then hands over the connection to a local base station 20A.

<Configuration of Communication System>

Figure 7:
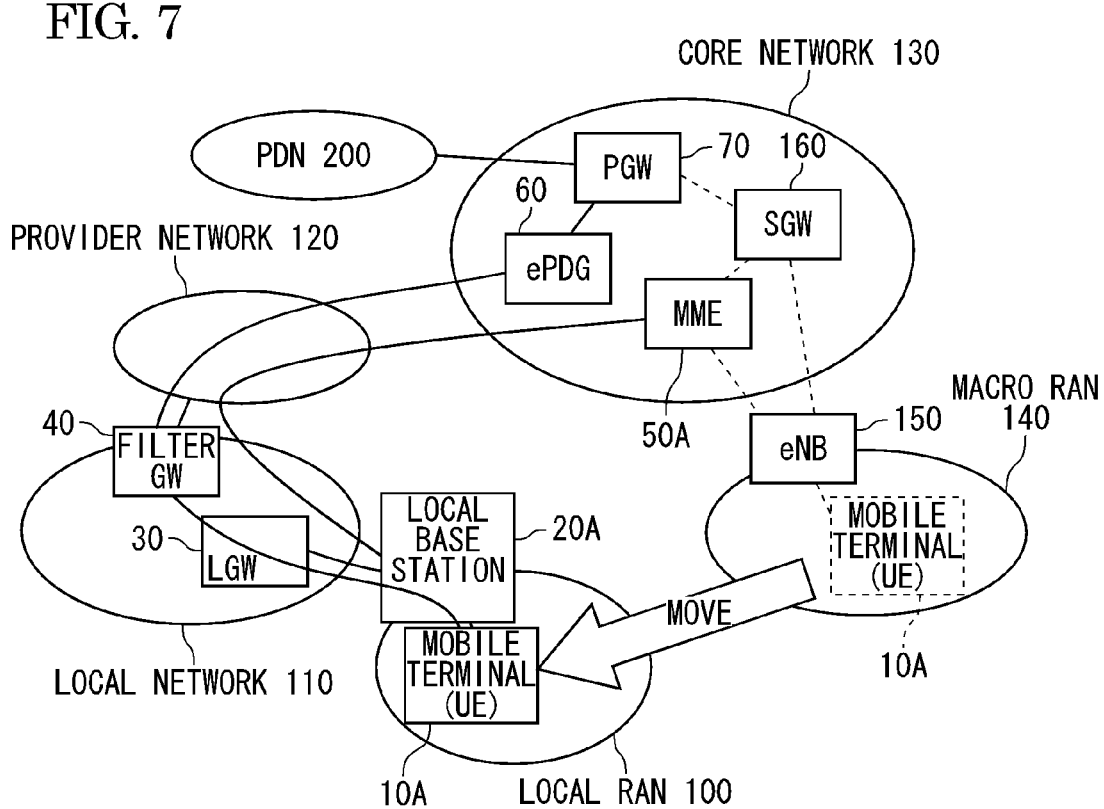
FIG. 7 is a diagram illustrating a configuration of a communication system according to a second embodiment.

A configuration of the communication system according to the second embodiment will be described with reference to FIG. 7. FIG. 7 is a diagram illustrating a configuration of the communication system according to the second embodiment, and is a diagram particularly illustrating a state where the mobile terminal (UE) 10A establishes PDN connection via a macro base station via, and then hands over the connection to the local base station 20A.

The communication system shown in FIG. 7 includes the mobile terminal (UE) 10A functioning as user equipment (UE), the local base station 20A to which the mobile terminal (UE) 10A is connected, a local RAN 100 formed by the local base station 20A, a local network 110 to which the local base station 20A is connected, a local gateway (LGW) 30, installed on the local network 110, which serves as a gateway when the mobile terminal (UE) 10A is connected to the local network 110, a provider network 120 that accommodates the local network 110, a core network 130 of an operator, a mobility management entity (MME) 50A disposed in the core network 130, a packet gateway ePDG 60 disposed in the core network 130, a serving gateway (SGW) 160 disposed in the core network 130, a packet gateway PGW 70, an external network PDN 200 to which the mobile terminal (UE) 10A is connected via the core network 130, a macro base station eNB 150 to which the mobile terminal (UE) 10A is connected before a handover, a macro RAN 140 formed by the macro base station eNB 150, and a filter gateway (filter GW) 40 that monitors packets which the mobile terminal (UE) 10A and the external network PDN 200 exchange with each other.

<Operation of Communication System>

Figure 8:
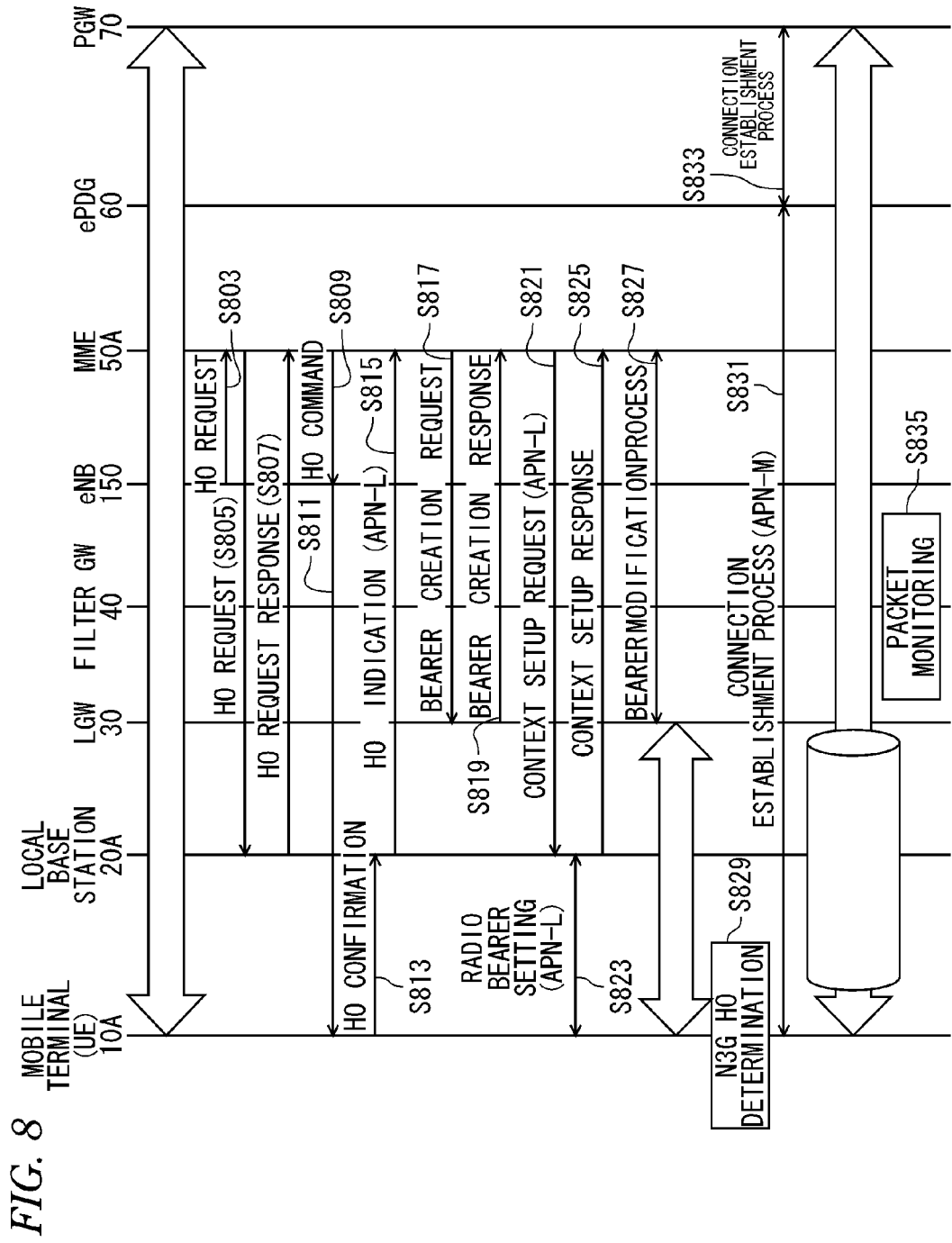
FIG. 8 is a diagram illustrating operations of the communication system shown in FIG. 7.

Operations of the communication system shown in FIG. 7 will be described with reference to FIG. 8. FIG. 8 is a diagram illustrating operations of the communication system shown in FIG. 7. Meanwhile, in FIG. 8, the mobile terminal (UE) 10A completely establishes a bearer (EPS bearer) or connection (PDN connection, PDP context) to the packet gateway PGW 70 via the macro base station eNB 150. When the mobile terminal (UE) 10A moves to enter an area of the local RAN 100, and transmits a measurement report to the macro base station eNB 150, the macro base station eNB 150 determines a handover to the local base station 20A.

As shown in FIG. 8, the macro base station eNB 150 transmits a handover request message to the mobility management entity (MME) 50 (step S803: HO request). Similarly, the mobility management entity (MME) 50A transmits a handover request message to the local base station 20A (step S805: HO request).

In the local base station 20A, when a resource that accommodates the mobile terminal (UE) 10A can be secured or the possibility of the resource being secured is made, the local base station 20A transmit a handover request response message (Handover Response) to the mobility management entity (MME) 50A (step S807: HO request response). By receiving this, the mobility management entity (MME) 50A transmits a handover command message to the mobile terminal (UE) 10A (step S809: HO command). Meanwhile, the handover command message is delivered to the mobile terminal (UE) 10A through the macro base station eNB 150 (step S811).

The mobile terminal (UE) 10A transmits a handover confirmation message to the local base station 20A (step S813: HO confirmation). By receiving this, the local base station 20A transmits a handover indication message to the mobility management entity (MME) 50A (step S815: HO indication (APN-L)). At this time, the local base station 20A stores an APN (for example, here, "APN-L") indicating the local network in the handover indication message and transfers it to the mobility management entity (MME) 50A. Meanwhile, the local base station 20A does not correct the handover indication message, but may add the APN-L to a container message for transferring the handover indication message to the mobility management entity (MME) 50A and transmit it to the mobility management entity (MME) 50A.

In addition, the local base station 20A may add information (for example, a flag or a LIPA indicator) that promotes LIPA bearer establishment, instead of the "APN-L", to the container message (in this case, the local base station 20A may not add the APN-L to the handover indication message).

Thereby, the local base station 20A requests the mobility management entity (MME) 50A to establish LIPA connection (LIPA bearer) to the local network 110.

The mobility management entity (MME) 50A receiving the handover indication message explores the GW (here, local gateway (LGW) 30 corresponding to the APN (APN-L) for LIPA) corresponding to the acquired APN-L. For example, the APN-L is input to a mechanism such as a DNS and an address of the local gateway (LGW) is derived.

When the local base station 20A selects the local gateway (LGW), a context regarding the LIPA bearer of the mobile terminal (UE) 10A is generated. Here, the address of the gateway (GW) may be an address of which the local base station 20A notifies the mobility management entity (MME) 50A. Thereby, it is possible to reduce a load due to a GW address derivation process in the mobility management entity (MME) 50A.

Meanwhile, the APN-L (or LIPA indicator) may be specified by the mobility management entity (MME) 50A based on the user subscription of the mobile terminal (UE) 10A, configuration data regarding the local base station 20A, or the like. That is, the APN (APN for LIPA; APN-L) for LIPA bearer establishment corresponding to the local base station 20A (identified by a base station identifier, a cell identifier, a CSG value, and the like) or the feasibility of the LIPA connection is managed in the mobility management entity (MME) 50A, and at the time of the handover process in which the local base station 20A serves as a target base station, the APN for LIPA or the LIPA indicator is specified at all times. Thus, the following processes may be performed.

Subsequently, the mobility management entity (MME) 50A transmits a bearer creation request message for generating a LIPA bearer to the derived local gateway (LGW) 30 (step S817: bearer creation request).

The local gateway (LGW) 30 generates a context regarding the LIPA bearer of the mobile terminal (UE) 10A, and transmits a bearer creation response message to the mobility management entity (MME) 50A (step S819: bearer creation response).

The mobility management entity (MME) 50A transmits a context setup request message that requests the establishment of a radio bearer to the local base station 20A (step S821: context setup request (APN-L)). Here, as an access point name (APN) in which a bearer is established, the "APN-L" in the present embodiment is stored in the context setup request message.

When the context setup request message is received, the local base station 20A performs a radio bearer setting process between the mobile terminal (UE) 10A and the local base station. At this time, the local base station 20A notifies the mobile terminal (UE) 10A of the APN-L extracted from the context setup request message (step S823: radio bearer setting (APN-L)). When the radio bearer establishment with the mobile terminal (UE) 10A is completed, the local base station 20A transmits a context setup response message to the mobility management entity (MME) 50A (step S825: context setup response).

In order to reflect a QoS parameter of the established radio bearer, the mobility management entity (MME) 50A performs a bearer modification process, as necessary, between the local gateway (LGW) 30 and the mobility management entity (step S827: bearer modification process). Thereby, the LIPA bearer is established between the mobile terminal (UE) 10A and the local gateway (LGW) 30. Meanwhile, messages exchanged between the mobility management entity (MME) 50A and the local gateway (LGW) 30 may be routed through the local base station 20A. Thereby, the interface (particularly, signaling interface) between the mobility management entity (MME) 50A and the local network 110 can be unified in one, and particularly, interface management costs in the mobility management entity (MME) 50A can be reduced.

Here, the mobile terminal (UE) 10A detects that a bearer (that is, LIPA bearer) different from the bearer (that is, bearer to the external network PDN 200 (APN-M)) established before a handover is newly established based on the APN (APN-L) notified in the radio bearer setting process. Further/alternatively, it is detected by the mobile terminal (UE) 10A that a (LIPA) bearer is newly established during a handover, and a bearer which is active (that is, an active flag of a bearer is valid) before a handover is not active (that is, an active flag of a bearer is invalid) in a point of time in which the radio bearer setting process is completed.

By receiving this, the mobile terminal (UE) 10A determines that connection to the external network PDN (APN-M) directly via the core network is not permitted under the present local base station 20A, and determines that handover connection using a Non3G access method on the LIPA bearer is performed (step S829: N3G HO determination). Meanwhile, when the mobile terminal (UE) 10A performs the N3G HO determination, it may be further detected that the "APN-L" which is the notified access point name (APN) is an access point name (APN) for the LIPA bearer (for example, detection is performed from the fact that domain name "lipa" is provided). Thereby, the mobile terminal (UE) 10A can determine more reliably that the PDN via the core network is possible through an off-road via the LIPA. That is, the APN-L is not used for the LIPA connection, but is used for avoiding the establishment of such redundant connection as to superimpose another external network connection on connection to an external network, and thus it is possible to reduce the useless consumption of network resources.

In addition, the local base station 20A may give notice of the APN-L in the radio bearer setting, and may notify the mobile terminal (UE) 10A of information (for example, flag) indicating that connection the external network PDN (APN-M) directly via the core network is not permitted under the present local base station 20A. Thereby, the mobile terminal (UE) 10A performs reconnection determination more reliably, and thus it is possible to prevent resources from being uselessly consumed due to erroneous determination.

In order to perform handover connection using a Non-3GPP access method on the LIPA bearer, the mobile terminal (UE) 10A generates an identifier for finding the packet gateway ePDG 60 disposed in the core network (or using an identifier which is generated beforehand), and derives an address of the packet gateway ePDG 60 using an address derivation mechanism such as a DNS. Meanwhile, originally, the ePDG (PDG) is a gateway device for accessing the core network from a Non-3GPP (non-cellular) access network such as WLAN or a wired network. In addition, the ePDG is also referred to as PDG, and the present invention can be performed similarly in any case.

Subsequently, the mobile terminal (UE) 10A starts a connection establishment process to the packet gateway ePDG 60 through the LIPA bearer, that is, using an address (IP address) allocated to the LIPA bearer (step S831: connection establishment process (APN-M)). That is, the mobile terminal (UE) 10A performs a handover procedure to Untrusted Non-3GPP as disclosed in TS23.402. By receiving this, the packet gateway ePDG 60 performs a handover ePDG process such as bearer modification between the packet gateway PGW 70 and the packet gateway ePDG (step S833: connection establishment process). Thereby, the mobile terminal (UE) 10A switches the connection established between the packet gateway PGW 70 and the mobile terminal to connection via the packet gateway ePDG 60, and continues communication with the external network PDN 200. Meanwhile, in the connection through the LIPA bearer, as an encryption algorithm applied to a tunnel established with the packet gateway ePDG 60, a null algorithm is selected (the null algorithm may be specified from the mobile terminal (UE) 10A, and an AAA server (not shown) may command the ePDG 60 to use the null algorithm by receiving an authentication result at the time of the tunnel establishment).

Meanwhile, a handover request from the mobile terminal (UE) 10A having a bearer other than the access point name (APN) for LIPA to the local base station 20A may be always driven into failure or refused by the local base station 20A or the mobility management entity (MME) 50A. Further, the APN (APN-L) for LIPA is notified in a connection response message that notifies failure or refusal (at this time, information indicating only the connection to the notified APN is permitted may be notified together). Here, a bearer context of the mobile terminal (UE) 10A held by the mobility management entity (MME) 50A is held. By receiving this, the mobile terminal (UE) 10A establishes the LIPA bearer, and performs a handover of the connection thereon with respect to the packet gateway ePDG 60.

In addition, when the mobility management entity (MME) 50A completes the bearer modification process, a message (for example, N3G handover command message) that promotes a Non-3GPP handover may be transmitted to the mobile terminal (UE) 10A. Further, the mobility management entity (MME) 50A may explicitly command that the Non-3GPP connection on the LIPA bearer is performed. Thereby, the mobile terminal (UE) 10A can perform the N3G HO determination more reliably.

Meanwhile, the filter gateway (filter GW) 40 monitors communication packets between the mobile terminal (UE) 10A and the external network PDN 200 (step S835: packet monitoring).

<Configuration and Operation of Mobile Terminal>

Figure 9:
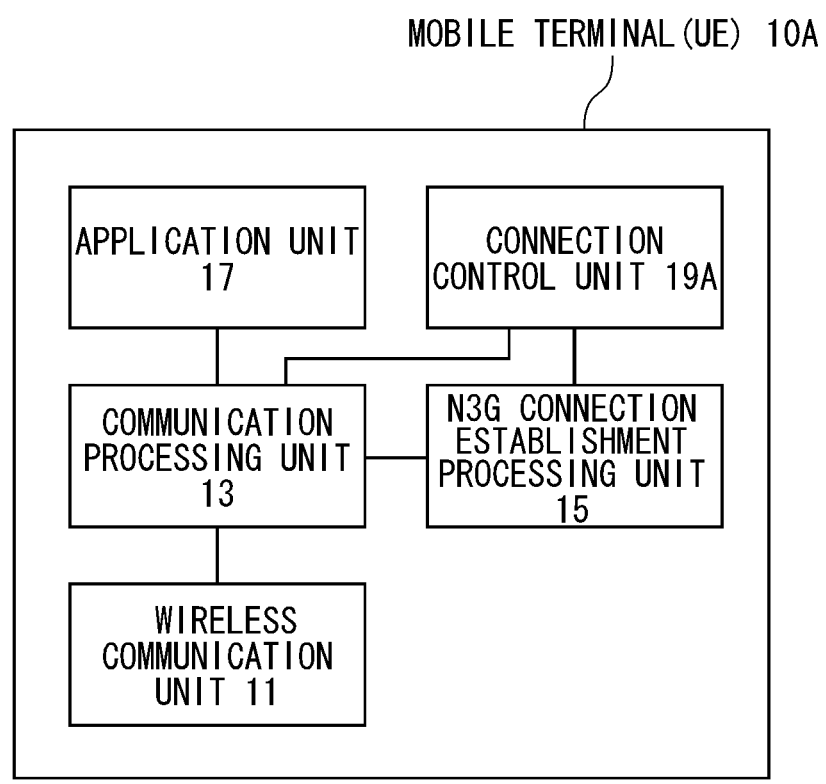
FIG. 9 is a block diagram illustrating a configuration of a mobile terminal (UE) 10A according to the second embodiment.

A configuration of the mobile terminal (UE) 10A will be described with reference to FIG. 9. FIG. 9 is a block diagram illustrating a configuration of the mobile terminal (UE) 10A according to the second embodiment. The mobile terminal (UE) 10A shown in FIG. 9 includes a wireless communication unit 11 for physical/logical connection to a cellular base station including the local base station 20, a communication processing unit 13 that performs protocol processing such as connection or a handover to a base station or a core network device, an N3G connection establishment processing unit 15 that performs protocol processing between communication nodes used from Non-3GPP access of the ePDG and the like, an application unit 17 for getting applications to work, and a connection control unit 19A.

Figure 10:
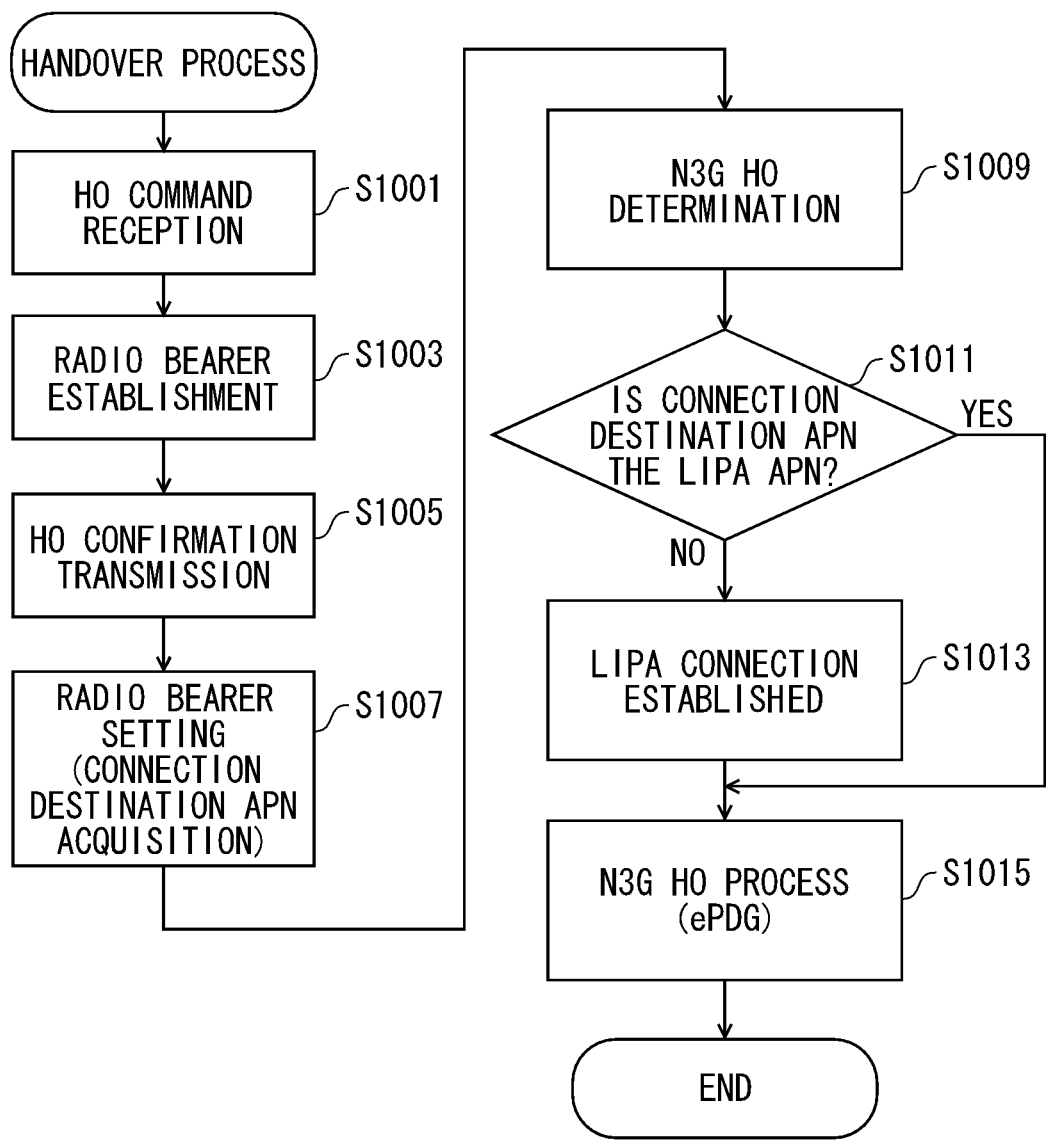
FIG. 10 is a flow diagram illustrating a "handover process" of the mobile terminal (UE) 10A.

Operations of the mobile terminal (UE) 10A will be described with reference to FIG. 10. FIG. 10 is a flow diagram illustrating a "handover process" of the mobile terminal (UE) 10A, and is a flow diagram, particularly, when the mobile terminal (UE) 10A performs the handover process to the local base station 20A.

The wireless communication unit 11 receives a handover command message from the mobility management entity (MME) 50A via the macro base station eNB 150 (step S1001: HO command reception).

The communication processing unit 13 establishes a radio bearer between the local base station 20A and the communication processing unit based on the APN-L notified from the local base station 20A through the wireless communication unit 11 (step S1003: radio bearer establishment).

When a bearer (that is, LIPA bearer) different from the bearer (that is, bearer to the external network PDN 200) established before a handover is newly established, the communication processing unit 13 transmits a handover confirmation message to the local base station 20A through the wireless communication unit 11 (step S1005: HO confirmation transmission).

The communication processing unit 13 detects that a bearer (that is, LIPA bearer) different from the bearer (that is, bearer to the external network PDN 200) established before a handover is newly established based on APN (APN-L) acquired in a radio bearer setting process performed by the communication processing unit 13 (step S1007: radio bearer (connection destination (APN) acquisition)), and determines that connection to the external network PDN (APN-M) directly via the core network is not permitted under the present local base station 20A. The connection control unit 19 determines that handover connection using a Non3G access method on the LIPA bearer is performed through the N3G connection establishment processing unit 15 (step S1009: N3G HO determination).

Here, the connection control unit 19A performs, as necessary, a process shown in step S1011 and a process shown in step S1013. That is, the connection control unit 19 determines whether the access point name (APN) of a connection destination notified from the local base station 20A is an access point name (APN) of the LIPA. When the access point name (APN) of the connection destination notified from the local base station 20A is an access point name (APN) of the LIPA (if Yes), the process transitions to step S1015. When the access point name (APN) of the connection destination notified from the local base station 20A is not an access point name (APN) of the LIPA (if No; that is, if it is APN other than the LIPA), the process transitions to step S1013 (step S1011: "is access point name (APN) of connection destination the LIPA APN?").

When the access point name (APN) of the connection destination notified from the local base station 20A is not an access point name (APN) of the LIPA (if No), the connection control unit 19A establish LIPA connection through the communication processing unit 13 and the wireless communication unit 11 (step S1013: LIPA connection established). Thereby, when the LIPA bearer is not established, for example, during a handover, and only information notifying that connection to the external network PDN (APN-M) directly via the core network is not permitted under the present local base station 20A is distributed, the local base station 20A can newly establish a LIPA bearer serving as a bearer for establishing connection via the ePDG.

When the access point name (APN) of the connection destination notified from the local base station 20A is an access point name (APN) of the LIPA (if Yes), the connection control unit 19A then determines that handover connection using a Non3G access method on the LIPA bearer is performed through the N3G connection establishment processing unit 15, and performs the process (step S1015: N3G HO process (ePDG)).

<Configuration and Operation of Local Base Station>

Figure 11:
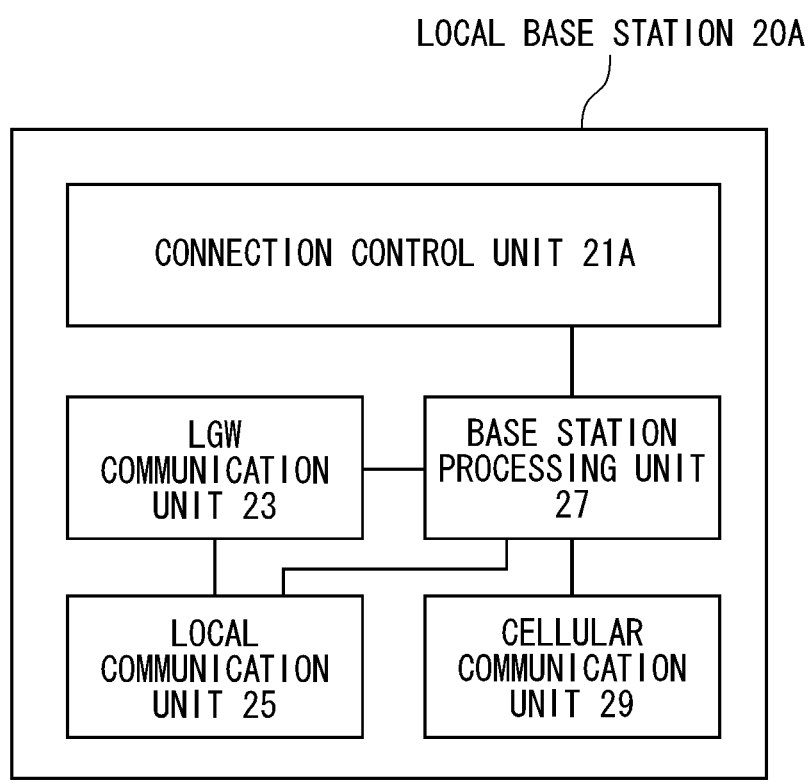
FIG. 11 is a block diagram illustrating a configuration of a local base station 20A.

A configuration of the local base station 20A according to the second embodiment will be described with reference to FIG. 11. FIG. 11 is a block diagram illustrating a configuration of the local base station 20A. The local base station 20A shown in FIG. 11 includes a connection control unit 21A, an LGW communication unit 23 that performs a protocol for connection to a local gateway (LGW), a local communication unit 25 for connection to the local network 110, a base station processing unit 27 that performs a base station process on the mobile terminal (UE) 10 or the core network device, and a cellular communication unit 29 for connection to the mobile terminal (UE) 10 through a cellular channel.

Figure 12:
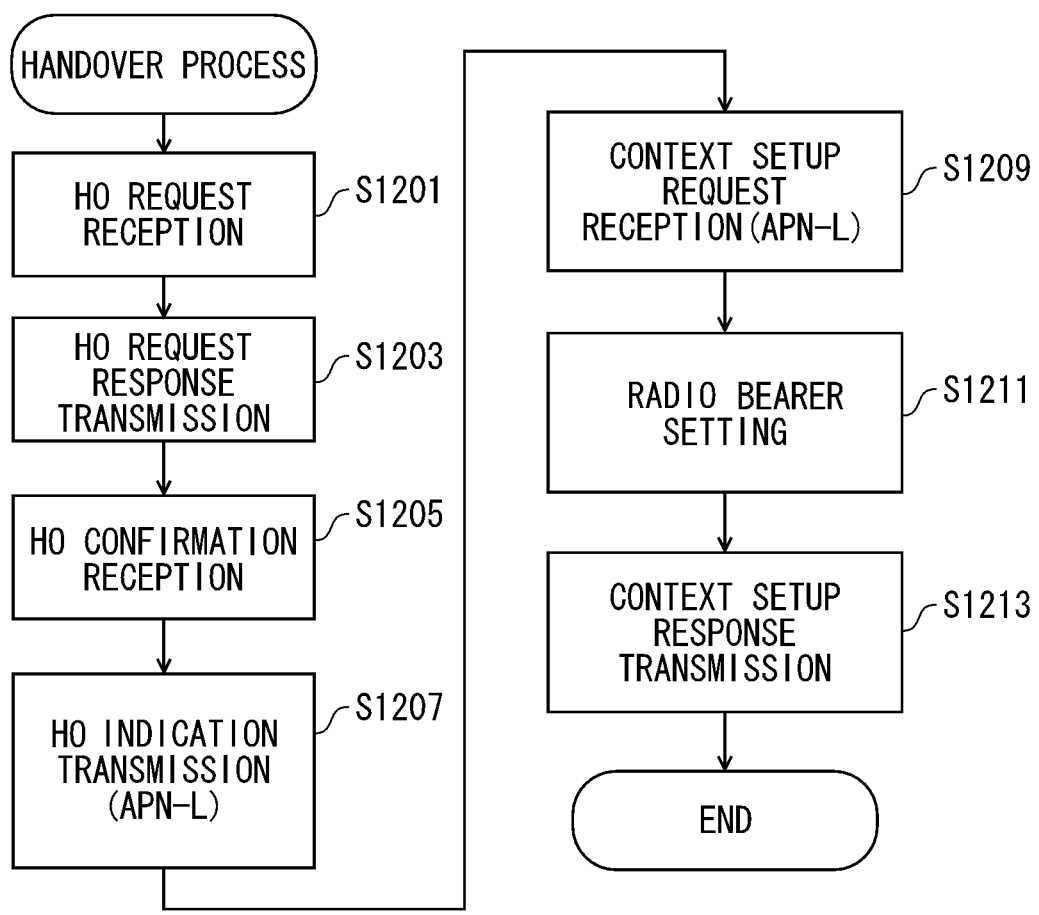
FIG. 12 is a flow diagram illustrating a "handover process" of the local base station 20A.

Operations of the local base station 20 shown in FIG. 11 will be described with reference to FIG. 12. FIG. 12 is a flow diagram illustrating a "handover process" of the local base station 20A, and is a flow diagram for performing, particularly, a handover process of the mobile terminal (UE) 10A to the local base station 20A.

The local communication unit 25 receives a handover request message from the mobility management entity (MME) 50A (step S1201: HO request reception).

The local communication unit 25 transmits a handover request response message (Handover Response) to the mobility management entity (MME) 50A (step S1203: HO request response transmission).

The cellular communication unit 29 receives a handover confirmation message from the mobile terminal (UE) 10A (step S1205: HO confirmation reception).

The local communication unit 25 transmits a handover indication message to the mobility management entity (MME) 50A (step S1207: HO indication transmission (APN-L)).

The local communication unit 25 receives a context setup request message that requests the establishment of a radio bearer from the mobility management entity (MME) 50A (step S1209: context setup request reception (APN-L)). Here, as an access point name (APN) in which a bearer is established, the "APN-L" in the present embodiment is stored in the context setup request message.

The base station processing unit 27 performs a radio bearer setting process between the mobile terminal (UE) 10A and the base station processing unit (step S1211: radio bearer setting). At this time, the cellular communication unit 29 notifies the mobile terminal (UE) 10A of the APN-L extracted from the context setup request message.

When the radio bearer establishment with the mobile terminal (UE) 10A is completed, the local communication unit 25 transmits a context setup response message to the mobility management entity (MME) 50A (step S1213: context setup response transmission).

<Configuration and Operation of MME>

Figure 13:
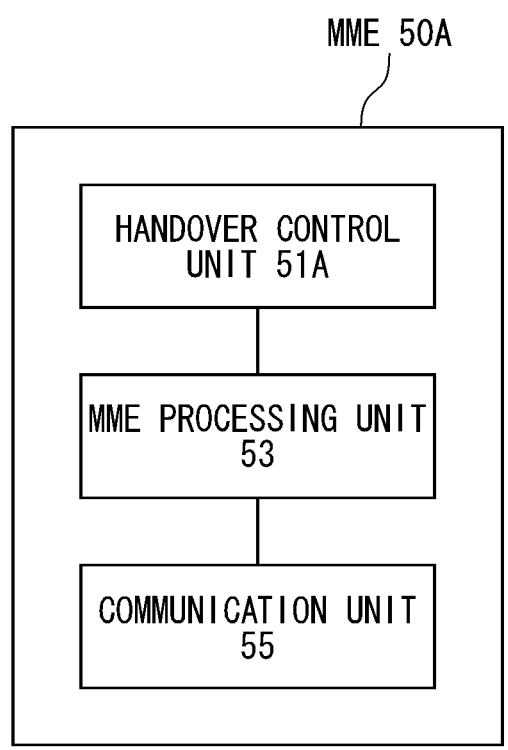
FIG. 13 is a block diagram illustrating a configuration of a mobility management entity (MME) 50A.

A configuration of the mobility management entity (MME) 50A will be described with reference to FIG. 13. FIG. 13 is a block diagram illustrating a configuration of the mobility management entity (MME) 50A. The mobility management entity (MME) 50A shown in FIG. 13 includes a handover control unit 51A, an MME processing unit 53, and a communication unit 55.

Figure 14:
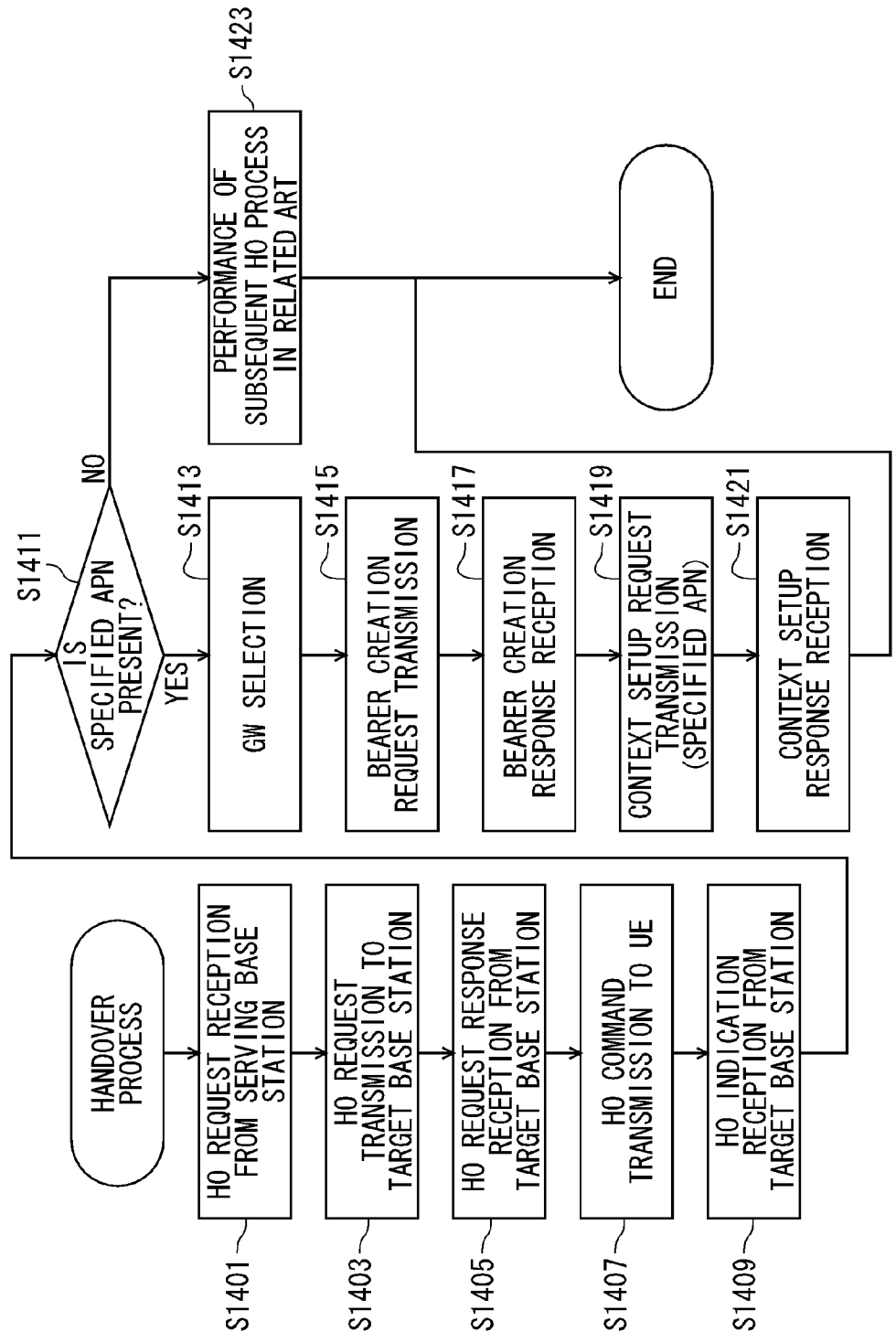
FIG. 14 is a flow diagram illustrating a "handover process" of the mobility management entity (MME) 50A.

Operations of the mobility management entity (MME) 50A shown in FIG. 13 will be described with reference to FIG. 14. FIG. 14 is a flow diagram illustrating a "handover process" of the mobility management entity (MME) 50A.

As shown in FIG. 14, the communication unit 55 receives a handover request message from the macro base station eNB 150 which is a serving base station (step S1401: "HO request reception from serving base station").

The MME processing unit 53 transmits the handover request message to the local base station 20A which is a target base station through the communication unit 55 (step S1403: "HO request transmission to target base station").

The MME processing unit 53 receives a handover request response message (Handover Response) from the local base station 20A which is a target base station through the communication unit 55 (step S1405: "HO request response reception from target base station").

The MME processing unit 53 transmits a handover command message to the mobile terminal (UE) 10A through the communication unit 55 (step S1407: "HO command transmission to UE"). Meanwhile, the handover command message is delivered to the mobile terminal (UE) 10A through the macro base station eNB 150 (step S811).

The MME processing unit 53 receives a handover indication message from the local base station 20A which is a target base station through the communication unit 55 (step S1409: "HO indication reception from target base station").

The handover control unit 51A determines whether an access point name (APN; here, that is, APN-L) specified from the local base station 20A which is a target base station is present, based on the handover indication message stored by the "APN-L". When the specified access point name (APN) is present, the process transitions to step S1413. When the specified access point name (APN) is not present, the process transitions to step S1423 (step S1411: "is specified APN present?").

The handover control unit 51A derives a GW corresponding to the acquired APN-L (here, local gateway (LGW) 30 corresponding to the APN (APN-L) for LIPA) based on the handover indication message stored by the "APN-L" (step S1413: "GW selection").

The handover control unit 51A generates a bearer creation request message for generating a LIPA bearer through the communication unit 55, and transmits the generated bearer creation request message to the derived local gateway (LGW) 30 through the communication unit 55 (step S1415: "bearer creation request transmission").

The MME processing unit 53 receives a bearer creation response message from the local gateway (LGW) 30 through the communication unit 55 (step S1417: "bearer creation response reception").

The MME processing unit 53 transmits a context setup request message that requests the establishment of a radio bearer to the local base station 20A through the communication unit 55 (step S1419: "context setup request transmission (specified APN)"). Here, as an access point name (APN) in which a bearer is established, the "APN-L" in the present embodiment is stored in the context setup request message.

The MME processing unit 53 receives a context setup response message from the local base station 20A through the communication unit 55 (step S1421: "context setup response reception").

The MME processing unit 53 performs a subsequent HO process performance (step S1423: "performance of subsequent HO process").

Third Embodiment

In a communication system according to a third embodiment, the mobile terminal (UE) establishes PDN connection via the macro base station, and then transitions to an idle mode. The mobile terminal moves to the local base station and then returns from an idle mode.

<Communication System Configuration>

Figure 15:
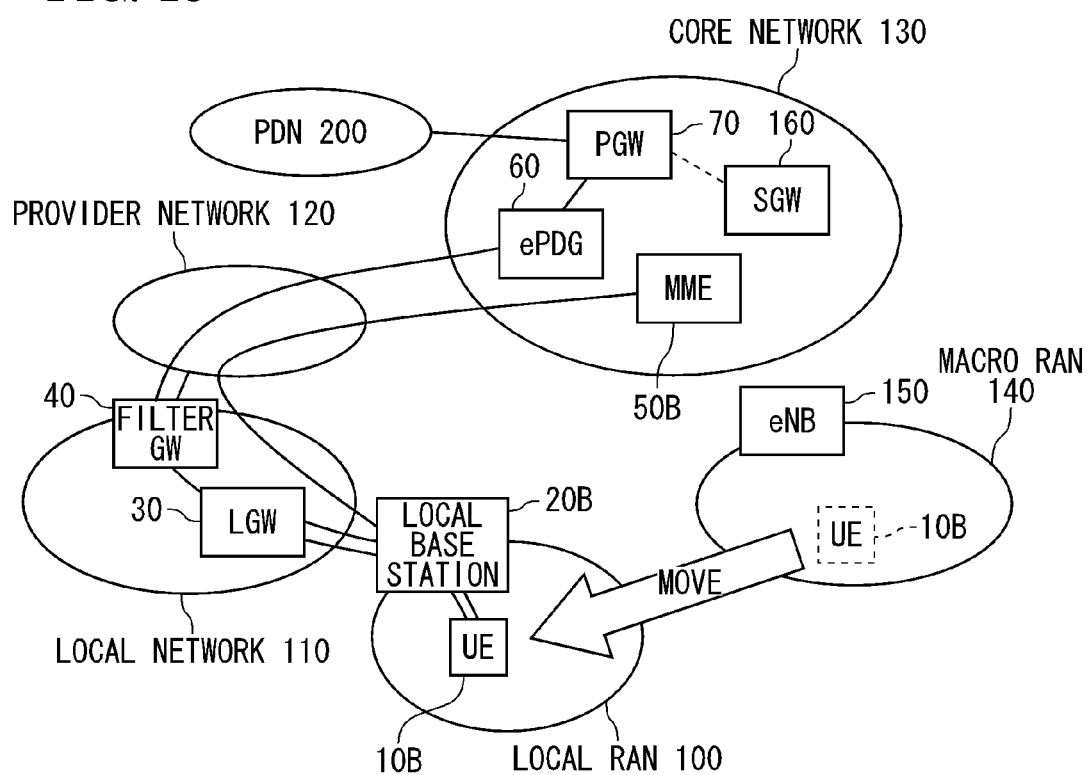
FIG. 15 is a diagram illustrating a configuration of a communication system according to a third embodiment.

A configuration of the communication system according to the third embodiment will be described with reference to FIG. 15. FIG. 15 is a diagram illustrating a configuration of the communication system according to the third embodiment, and is a diagram particularly illustrating a state where the mobile terminal (UE) 10B transitions to an idle mode after PDN connection is established via the macro base station eNB 150, and returns from an idle mode after the mobile terminal moves to the local base station 20B. The communication system according to the present embodiment shown in FIG. 15 is different from the communication system according to the second embodiment shown in FIG. 7, in that the mobile terminal (UE) 10B before movement transitions to an idle mode in the macro RAN 140, and that a radio bearer between the macro base station eNB 150 and the mobile terminal (UE) 10B, a bearer context of the mobile terminal (UE) 10B in the macro base station eNB 150, or an S1 bearer for the mobile terminal (UE) 10B between the macro base station eNB 150, the mobility management entity (MME) 50B, and the serving gateway (SGW) 160 is not present. The configurations other than these points are the same as those of the second embodiment. In FIG. 15, components common to those in FIG. 7 are denoted by the same reference numerals and signs.

<Communication System Operation>

Figure 16:
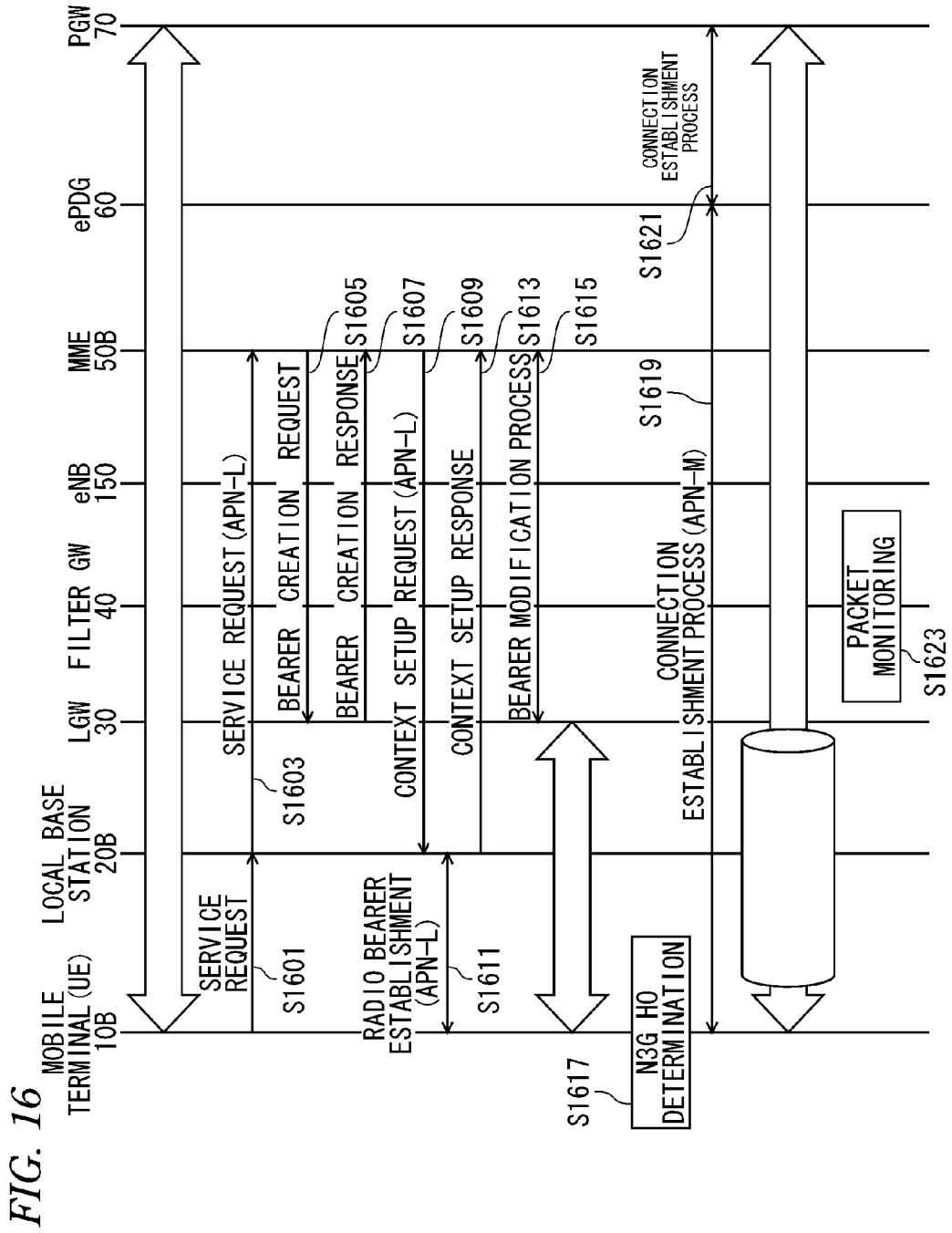
FIG. 16 is a diagram illustrating operations of the communication system shown in FIG. 15.

Operations of the communication system shown in FIG. 15 will be described with reference to FIG. 16. FIG. 16 is a diagram illustrating operations of the communication system shown in FIG. 15. Meanwhile, in FIG. 16, the mobile terminal (UE) 10B establishes a bearer (EPS bearer) or connection (PDN connection, PDP context) to the packet gateway PGW 70 via the macro base station eNB 150, and then transitions to an idle mode. That is, in the system, a radio bearer between the macro base station eNB 150 and the mobile terminal (UE) 10B, a bearer context of the mobile terminal (UE) 10B in the macro base station eNB 150, or an S1 bearer for the mobile terminal (UE) 10B between the macro base station eNB 150, the mobility management entity (MME) 50B, and the serving gateway (SGW) 160 is not present.

As shown in FIG. 16, when the mobile terminal (UE) 10B moves to enter an area of the local RAN 100, and determines a return from an idle mode in order to start communication, a service request message is transmitted to the local base station 20B (step S1601: service request).

The local base station 20B stores an access point name (APN) of the LIPA, for example, "APN-L" which is connectable from the local base station 20B in the service request message, and transfers it to the mobility management entity (MME) 50B (step S1603: service request (APN-L)). Meanwhile, the local base station 20B does not correct the service request message, but may add the APN-L in a container message for transferring the service request message to the mobility management entity (MME) 50B, and may transmit it to the mobility management entity (MME) 50B. In addition, the local base station 20B may add information (for example, a flag or a LIPA indicator) that promotes LIPA bearer establishment, instead of the "APN-L", to the service request message (in this case, may not add the APN-L to the service request message). Thereby, the local base station 20B requests the mobility management entity (MME) 50B to establish LIPA connection (LIPA bearer) to the local network 110.

The mobility management entity (MME) 50B receiving the service request message explores a GW corresponding to the acquired APN-L (here, local gateway (LGW) 30 corresponding to the "APN-L" which is an access point name (APN) for LIPA). For example, the APN-L is input to a mechanism such as a DNS and an address of the LGW is derived. When the LGW is selected, a context regarding the LIPA bearer of the mobile terminal (UE) 10B is generated. Here, the address of the local gateway (LGW) which is a gateway (GW) may be an address of which the local base station 20B notifies the mobility management entity (MME) 50B. Thereby, it is possible to reduce a load due to a GW address derivation process in the mobility management entity (MME) 50B.

Meanwhile, the "APN-L" (or LIPA indicator) may be specified by the mobility management entity (MME) 50B. That is, the APN (access point name (APN) for LIPA; "APN-L") for LIPA bearer establishment corresponding to the local base station 20B (identified by a base station identifier, a cell identifier, a CSG value, and the like) or the feasibility of the LIPA is managed in the mobility management entity (MME) 50B, and at the time of the handover process in which the local base station 20B serves as a target base station, the APN for LIPA or the LIPA indicator is specified at all times. Thus, the following processes may be performed.

Subsequently, the mobility management entity (MME) 50B transmits a bearer creation request message for generating a LIPA bearer to the derived local gateway (LGW) 30 (step S1605: bearer creation request).

The local gateway (LGW) 30 generates a context regarding the LIPA bearer of the mobile terminal (UE) 10B, and transmits a bearer creation response message to the mobility management entity (MME) 50B (step S1607: bearer creation response).

The mobility management entity (MME) 50B transmits a context setup request message that requests the establishment of a radio bearer to the local base station 20B (step S1609: context setup request (APN-L)). Here, the "APN-L" which is an access point name (APN) in which a bearer is established is stored in the context setup request message.

When the context setup request message is received, the local base station 20B performs a radio bearer setting process between the mobile terminal (UE) 10B and the local base station. At this time, the local base station 20B notifies the mobile terminal (UE) 10B of the APN-L extracted from the context setup request message (step S1611: radio bearer setting (APN-L)).

When the radio bearer establishment with the mobile terminal (UE) 10B is completed, the local base station 20B transmits a context setup response message to the mobility management entity (MME) 50B (step S1613: context setup response).

In order to reflect a QoS parameter of the established radio bearer, the mobility management entity (MME) 50B performs a bearer modification process, as necessary, between the local gateway (LGW) 30 and the mobility management entity (step S1615: bearer modification process). Thereby, the LIPA bearer is established between the mobile terminal (UE) 10B and the local gateway (LGW) 30.

Meanwhile, messages exchanged between the mobility management entity (MME) 50B and the local gateway (LGW) 30 may be routed through the local base station 20B. Thereby, the interface (particularly, signaling interface) between the mobility management entity (MME) 50B and the local network 110 can be unified in one, and particularly, interface management costs in the mobility management entity (MME) 50B can be reduced.

Here, the mobile terminal (UE) 10B detects that a bearer (that is, LIPA bearer) different from the bearer (that is, bearer to the external network PDN 200) established before an idle transition is newly established by the APN (that is, APN-L) notified in the radio bearer setting process. Meanwhile, it may be detected by the mobile terminal (UE) 10B that a (LIPA) bearer is newly established during a handover, a bearer which is active (that is, an active flag of a bearer context updated through the radio bearer establishment is valid) before a handover is not activated (that is, the active flag is invalid) in a point of time in which the radio bearer setting process is completed, and only the LIPA bearer newly established is active.

When it is detected that a bearer (that is, LIPA bearer) different from the bearer (that is, bearer to the external network PDN 200) established before an idle transition is newly established, the mobile terminal (UE) 10B determines that connection to the external network PDN ("APN-M") directly via the core network is not permitted under the present local base station 20B, and determines that handover connection using a Non3G access method on the LIPA bearer is performed (step S1617: N3G HO determination).

Meanwhile, when the mobile terminal (UE) 10B performs the N3G HO determination, it may be further detected that the "APN-L" which is the notified access point name (APN) is an access point name (APN) for the LIPA bearer (for example, detection is performed from the fact that domain name "lipa" is provided). Thereby, the mobile terminal (UE) 10B can determine more reliably that the PDN via the core network is possible through an off-road via the LIPA. That is, according to the communication system the present embodiment, the APN-L is not used for the LIPA connection, but is used for avoiding the establishment of such redundant connection as to superimpose another external network connection on connection to an external network, and thus it is possible to reduce the useless consumption of network resources.

In addition, notice may be given of the "APN-L" in the radio bearer setting, and the mobile terminal (UE) 10B may be notified of information (for example, flag) indicating that connection to the external network PDN (APN-M) directly via the core network is not permitted under the present local base station 20B. Thereby, the mobile terminal (UE) 10B performs reconnection determination more reliably, and thus it is possible to prevent resources from being uselessly consumed due to erroneous determination.

In order to perform handover connection using a Non-3GPP access method on the LIPA bearer, the mobile terminal (UE) 10B generates an identifier for finding the packet gateway ePDG 60 disposed in the core network (or using an identifier which is generated beforehand), and derives an address of the packet gateway ePDG 60 using an address derivation mechanism such as a DNS. Meanwhile, originally, the ePDG (PDG) is a gateway device for accessing the core network from a Non-3GPP (non-cellular) access network such as WLAN or a wired network. In addition, the "ePDG" is also referred to as "PDG", and the present embodiment can be performed similarly in any case.

Subsequently, the mobile terminal (UE) 10B starts a connection establishment process to the packet gateway ePDG 60 through the LIPA bearer, that is, using an address (IP address) allocated to the LIPA bearer (step S1619: connection establishment process (APN-M)). That is, the mobile terminal (UE) 10B performs a handover procedure to Untrusted Non-3GPP as disclosed in TS23.402. By receiving this, the packet gateway ePDG 60 performs a handover ePDG process such as bearer modification between the packet gateway PGW 70 and the packet gateway ePDG (step S1621: connection establishment process). Thereby, the mobile terminal (UE) 10B switches the connection established between the packet gateway PGW 70 and the mobile terminal to connection via the packet gateway ePDG 60, and continues communication with external network PDN 200.

Here, in the connection through the LIPA bearer, as an encryption algorithm applied to a tunnel established with the packet gateway ePDG 60, a null algorithm is selected. The null algorithm may be specified from the mobile terminal (UE) 10B, and an AAA server (not shown) may command the ePDG to use the null algorithm by receiving an authentication result at the time of the tunnel establishment.

Meanwhile, a service request from the mobile terminal (UE) 10B having a bearer other than the access point name (APN) of the LIPA may be always driven into failure or refused by the local base station 20B or the mobility management entity (MME) 50B. Further, the "APN-L" which is an access point name (APN) for LIPA is notified in a connection response message that notifies failure or refusal (at this time, information indicating only the connection to the notified access point name (APN) is permitted may be notified together). Here, a bearer context of the mobile terminal (UE) 10B held by the mobility management entity (MME) 50B is held. By receiving this, the mobile terminal (UE) 10B establishes the LIPA bearer, and performs a handover of the connection thereon with respect to the packet gateway ePDG 60.

In addition, when the mobility management entity (MME) 50B completes the bearer modification process, a message (for example, N3G handover command message) that promotes a Non-3GPP handover may be transmitted to the mobile terminal (UE) 10B. Further, the mobility management entity may explicitly command that the Non-3GPP connection on the LIPA bearer is performed. Thereby, the mobile terminal (UE) 10B can perform the N3G HO determination more reliably.

Meanwhile, the filter gateway (filter GW) 40 monitors communication packets between the mobile terminal (UE) 10B and the external network PDN 200 (step S1623: packet monitoring).

<Configuration and Operation of Mobile Terminal>

Figure 17:
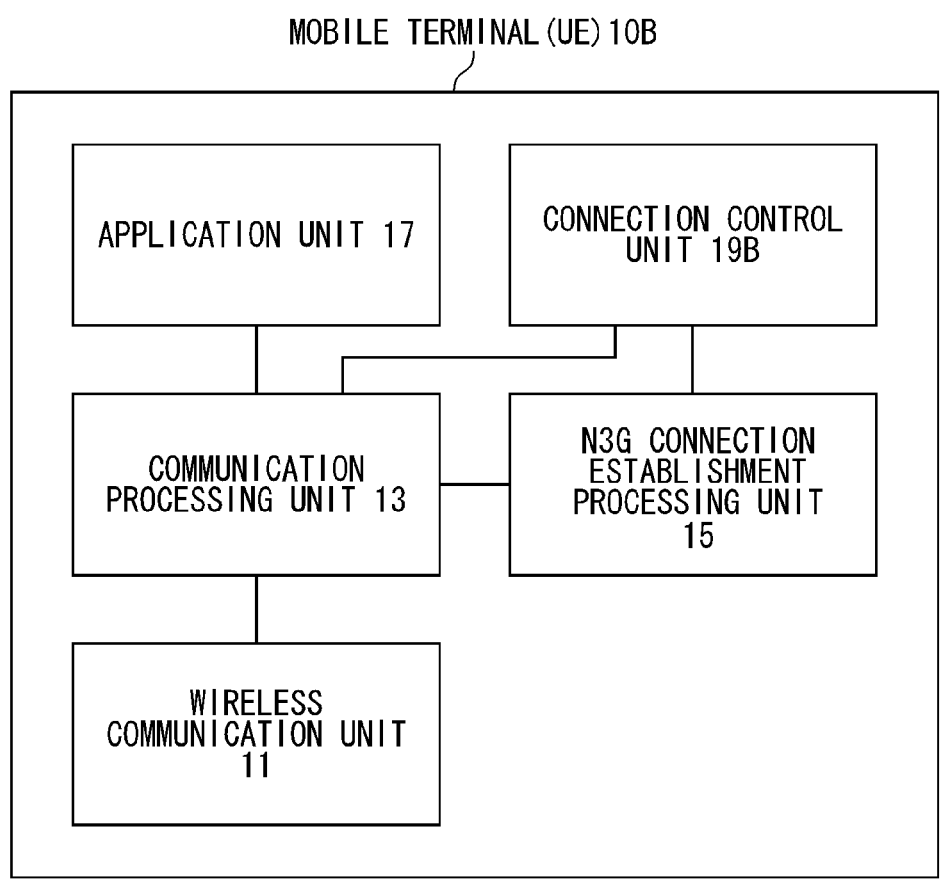
FIG. 17 is a block diagram illustrating a configuration of a mobile terminal (UE) 10B according to the third embodiment.

A configuration of the mobile terminal (UE) 10B will be described with reference to FIG. 17. FIG. 17 is a block diagram illustrating a configuration of the mobile terminal (UE) 10B according to the third embodiment. The mobile terminal (UE) 10B shown in FIG. 17 includes a wireless communication unit 11 for physical/logical connection to a cellular base station including the local base station 20, a communication processing unit 13 that performs protocol processing such as connection or handover to a base station or a core network device, an N3G connection establishment processing unit 15 that performs protocol processing between communication nodes used from Non-3GPP access of the ePDG and the like, an application unit 17 for getting applications to work, and a connection control unit 19B.

Figure 18:
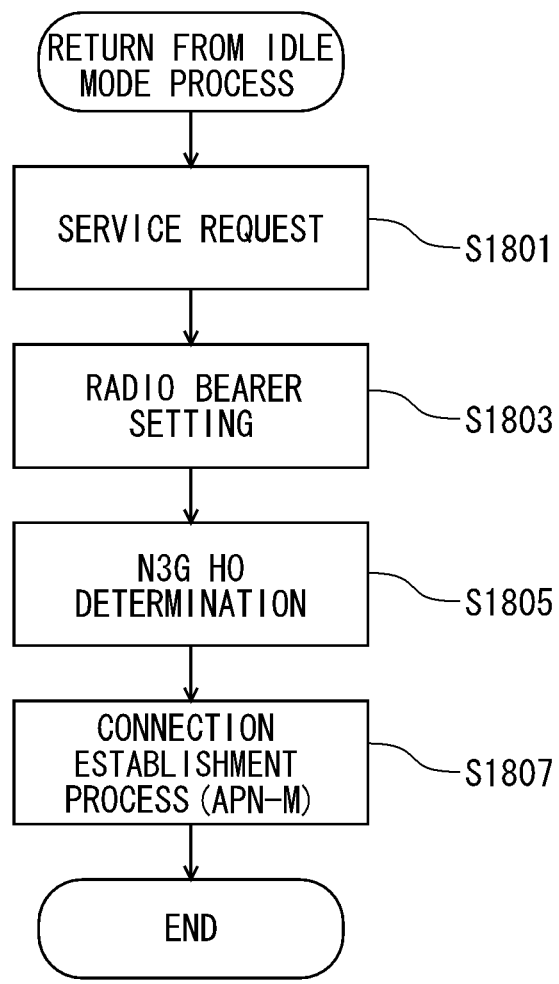
FIG. 18 is a flow diagram illustrating a "recovery from idle process" of the mobile terminal (UE) 10B.

Operations of the mobile terminal (UE) 10B shown in FIG. 17 will be described with reference to FIG. 18. FIG. 18 is a flow diagram illustrating a "recovery from idle process" of the mobile terminal (UE) 10B, and is a flow diagram, particularly, when the mobile terminal (UE) 10B performs an idle mode return under the local base station 20.

When the mobile terminal (UE) 10B returns from an idle mode in order to start communication, the wireless communication unit 11 transmits a service request message to the local base station 20B (step S1801: service request).

After the LIPA bearer is established between the mobile terminal (UE) 10B and the local gateway (LGW) 30 (step S1803: radio bearer setting), the connection control unit 19B determines that connection to the external network PDN ("APN-M") directly via the core network is not permitted under the present local base station 20B when it is detected that a bearer (that is, LIPA bearer) different from the bearer (that is, bearer to the external network PDN 200) established before an idle transition is newly established, based on the APN (APN-L) notified in the radio bearer setting process. The connection control unit 19B then determines that handover connection using a Non3G access method on the LIPA bearer is performed through the N3G connection establishment processing unit 15 (step S1805: N3G HO determination).

The communication processing unit 13 starts a connection establishment process to the packet gateway ePDG 60 through the wireless communication unit 11 and the LIPA bearer, that is, using an address (IP address) allocated to the LIPA bearer (step S1807: connection establishment process (APN-M)).

<Configuration and Operation of Local Base Station>

Figure 19:
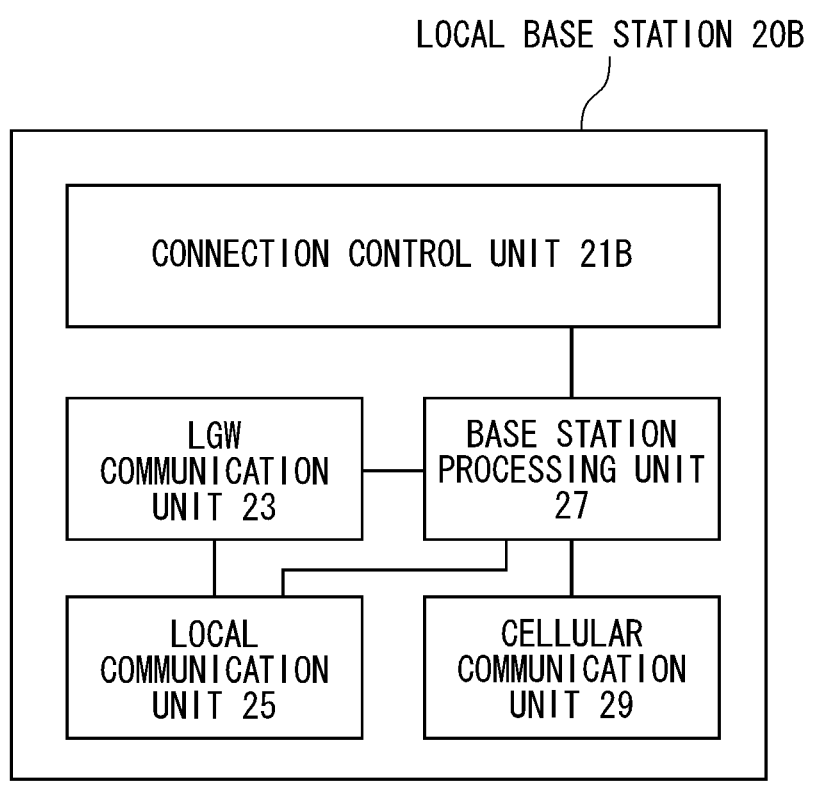
FIG. 19 is a block diagram illustrating a configuration of a local base station 20B according to the third embodiment.

A configuration of the local base station 20B according to the third embodiment will be described with reference to FIG. 19. FIG. 19 is a block diagram illustrating a configuration of the local base station 20B. The local base station 20B shown in FIG. 19 includes a connection control unit 21B, an LGW communication unit 23 that performs a protocol for connection to a local gateway (LGW), a local communication unit 25 for connection to the local network 110, a base station processing unit 27 that performs a base station process on the mobile terminal (UE) 10 or the core network device, and a cellular communication unit 29 for connection to the mobile terminal (UE) 10B through a cellular channel.

Figure 20:
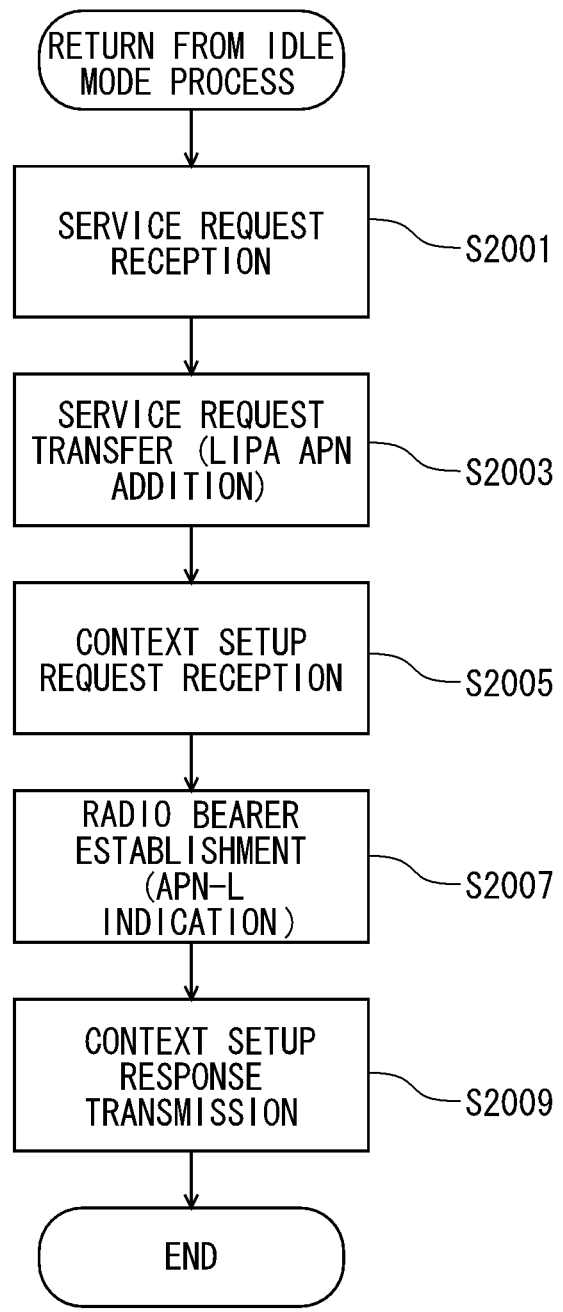
FIG. 20 is a flow diagram illustrating a "recovery from idle process" of the local base station 20B.

Operations of the local base station 20B shown in FIG. 19 will be described with reference to FIG. 20. FIG. 20 is a flow diagram illustrating a "recovery from idle process" of the local base station 20B.

The cellular communication unit 29 receives a service request message from the mobile terminal (UE) 10B (step S2001: service request reception).

The base station processing unit 27 stores an access point name (APN) of the LIPA, for example, "APN-L" which is connectable from the local base station 20B in the service request message, and the local communication unit 25 transfers the service request message stored by the "APN-L" to the mobility management entity (MME) 50B (step S2003: service request transfer (LIPA APN addition)).

The local communication unit 25 receives a context setup request message that requests the establishment of a radio bearer from the mobility management entity (MME) 50B (step S2005: context setup request reception (APN-L)). Here, the "APN-L" which is an access point name (APN) in which a bearer is established is stored in the context setup request message.

The cellular communication unit 29 gives notice of the APN-L extracted from the context setup request message in order to perform a radio bearer setting process between the local base station 20B and the mobile terminal (UE) 10B (step S2007: radio bearer establishment (APN-L notification)).

When the radio bearer establishment with the mobile terminal (UE) 10B is completed, the LGW communication unit 23 transmits a context setup response message to the mobility management entity (MME) 50B (step S2009: context setup response transmission).

<Configuration and Operation of MME>

Figure 21:
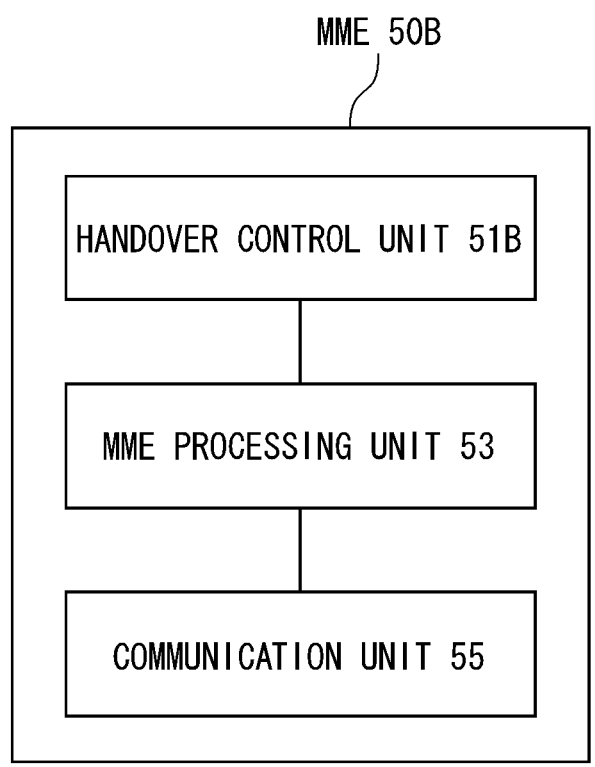
FIG. 21 is a block diagram illustrating a configuration of a mobility management entity (MME) 50B

A configuration of the mobility management entity (MME) 50B will be described with reference to FIG. 21. FIG. 21 is a block diagram illustrating a configuration of the mobility management entity (MME) 50B. The mobility management entity (MME) 50B shown in FIG. 21 includes a handover control unit 51B, an MME processing unit 53, and a communication unit 55.

Figure 22:
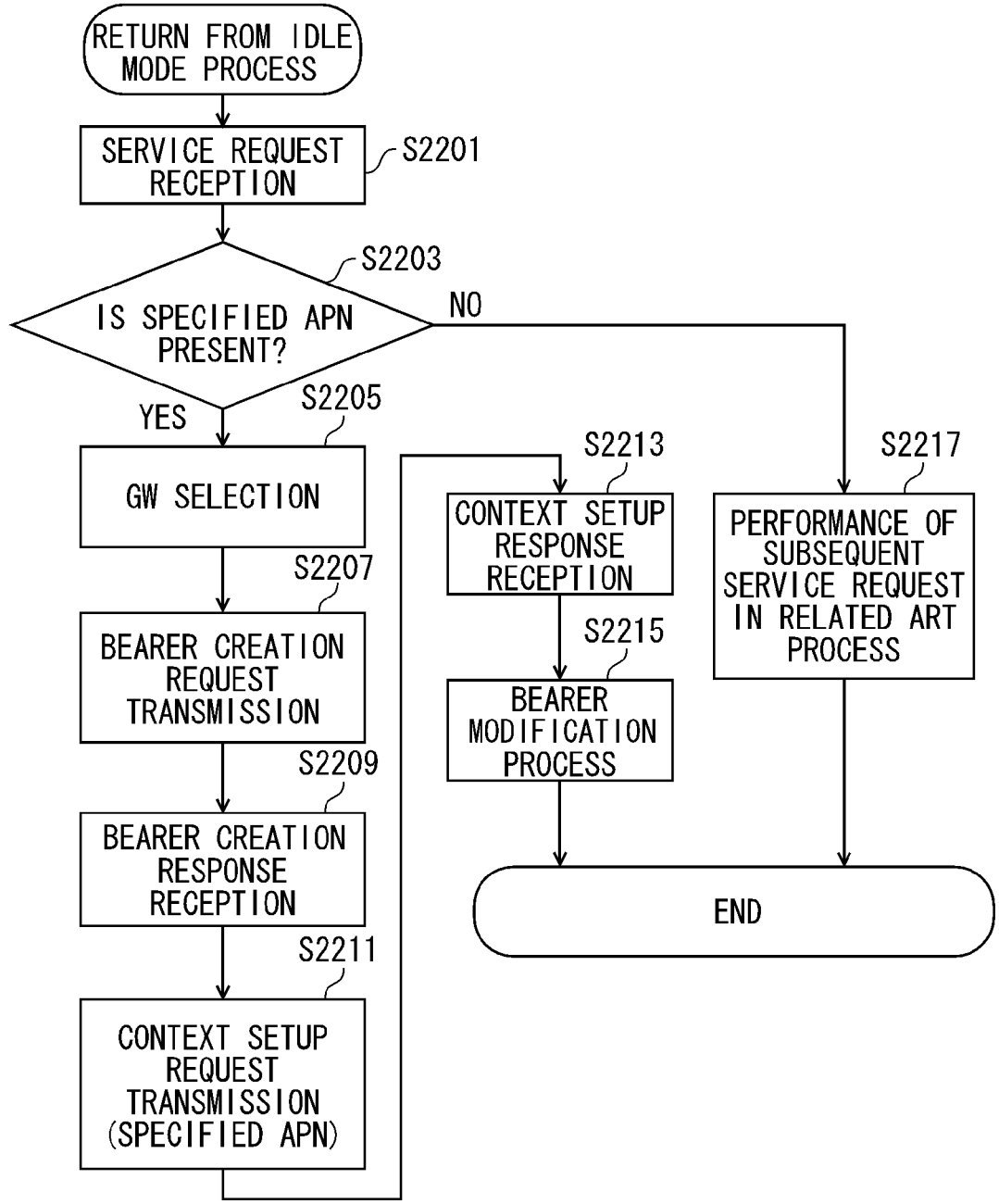
FIG. 22 is a flow diagram illustrating a "recovery from idle process" of the mobility management entity (MME) 50B.

Operations of the mobility management entity (MME) 50B shown in FIG. 21 will be described with reference to FIG. 22. FIG. 22 is a flow diagram illustrating a "recovery from idle process" of the mobility management entity (MME) 50B, and is a flow diagram, particularly, when the mobile terminal (UE) 10B performs an idle mode return under the local base station 20B.

The communication unit 55 receives a service request message stored by an access point name (APN) of the LIPA which is connectable from the local base station 20B, for example, "APN-L" from the local base station 20B (step S2201: service request reception).

The MME processing unit 53 determines whether a specified APN corresponding to a GW (here, "APN-L" which is an access point name (APN) for LIPA) corresponding to the acquired APN-L is present (step S2203: "is specified APN present?"). When the specified APN is present, the process transitions to step S2205. When the specified APN is not present, the process transitions to step S2217.

The MME processing unit 53 inputs the APN-L to, for example, a mechanism such as a DNS, and derives and selects an address of the LGW (in the present embodiment, local gateway (LGW) 30) corresponding to the specified APN (step S2205: GW selection).

The communication unit 55 transmits a bearer creation request message for generating a LIPA bearer to the derived local gateway (LGW) 30 (step S2207: bearer creation request transmission).

The communication unit 55 receives a bearer creation response message in which a context regarding the LIPA bearer of the mobile terminal (UE) 10B is generated, from the local gateway (LGW) 30 (step S2209: bearer creation response reception).

The communication unit 55 transmits a context setup request message that requests the establishment of a radio bearer to the local base station 20B (step S2211: context setup request transmission (specified APN)).

When the radio bearer establishment between the local base station 20B and the mobile terminal (UE) 10B is completed, the communication unit 55 receives a context setup response message from the local base station 20B (step S2213: context setup response reception).

In order to reflect a QoS parameter of the established radio bearer, the MME processing unit 53 performs a bearer modification process, as necessary, between the local gateway (LGW) 30 and the MME processing unit (step S2215: bearer modification process).

The MME processing unit 53 performs a subsequent service request process (step S2217: performance of subsequent service request process).

Fourth Embodiment

In a communication system according to a fourth embodiment, the mobile terminal (UE) establishes PDN connection via the local base station, and then hands over the connection to the macro base station.

<Communication System Configuration>

Figure 23:
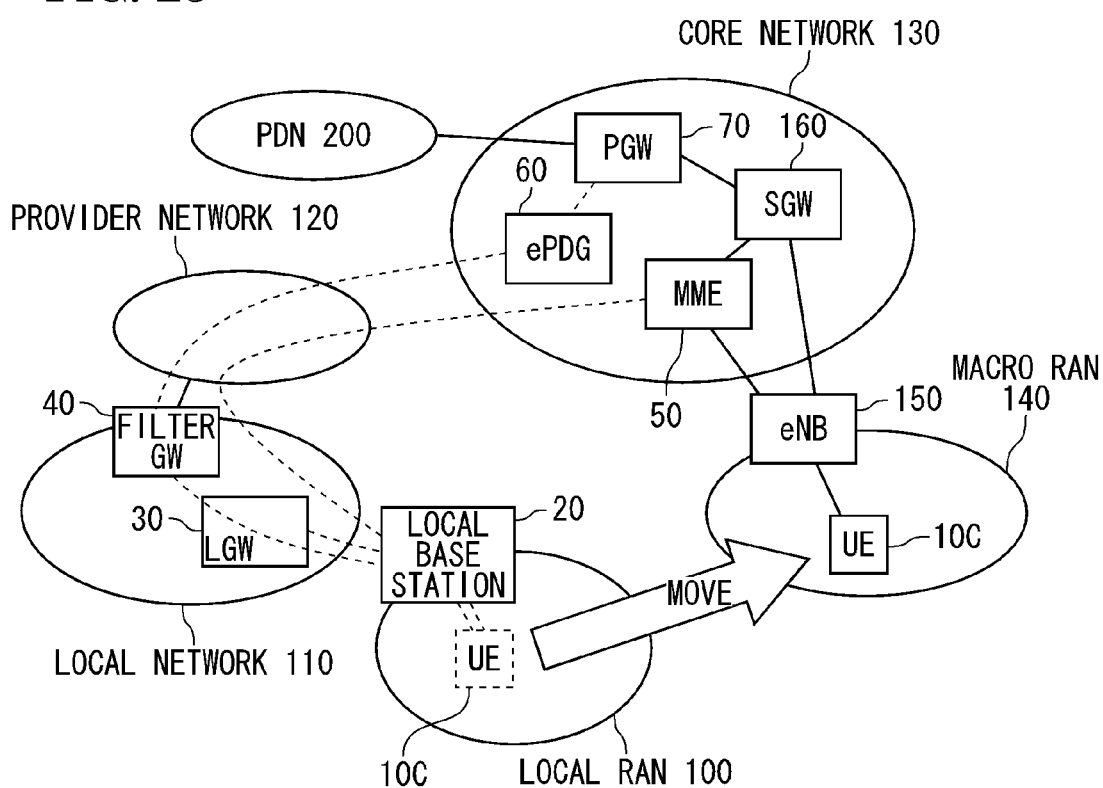
FIG. 23 is a diagram illustrating a configuration of a communication system according to a fourth embodiment.

A configuration of the communication system according to the fourth embodiment will be described with reference to FIG. 23. FIG. 23 is a diagram illustrating a configuration of the communication system according to the fourth embodiment, and is a diagram illustrating a state where the mobile terminal establishes PDN connection via the local base station, and then hands over the connection to the macro base station. The communication system according to the present embodiment shown in FIG. 23 is different from the communication system according to the second embodiment shown in FIG. 7, in that a mobile terminal (UE) 10C moves in the reverse direction. That is, the mobile terminal (UE) 10C moves from the local RAN 100 to the macro RAN 140, and a handover is performed. The configurations other than this point are the same as those of second embodiment. In FIG. 23, components common to those in FIG. 7 are denoted by the same reference numerals and signs.

<Communication System Operation>

Figure 24:
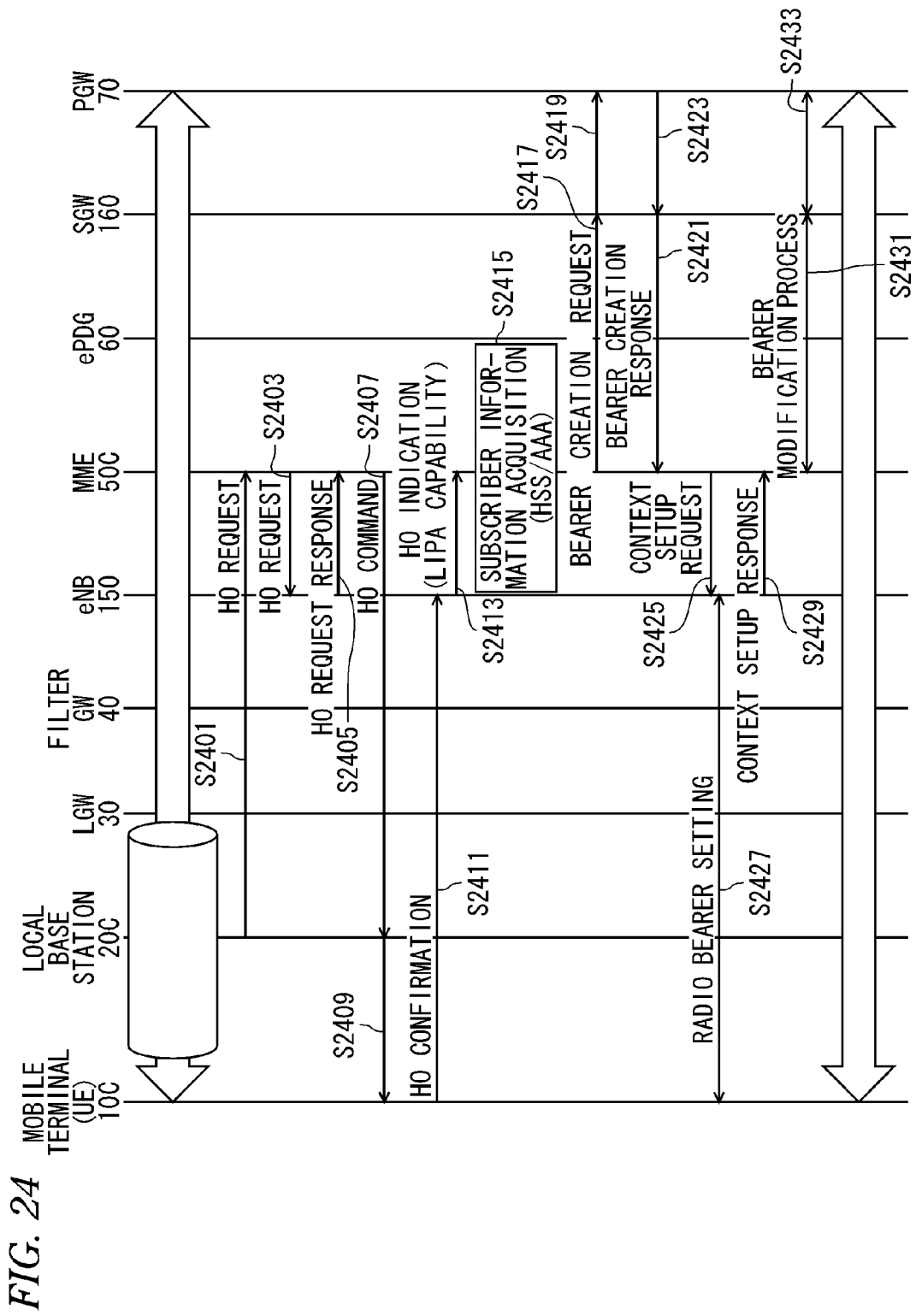
FIG. 24 is a diagram illustrating operations of the communication system shown in FIG. 23.

Operations of the communication system shown in FIG. 23 will be described with reference to FIG. 24. FIG. 24 is a diagram illustrating operations of the communication system shown in FIG. 23. Meanwhile, in FIG. 24, the mobile terminal (UE) 10C establishes a LIPA bearer via a local base station 20C, and establishes PDN connection to the packet gateway PGW 70 on the LIPA bearer. When the mobile terminal (UE) 10C moves to enter an area of the macro RAN 140, and transmits a measurement report to the local base station 20, the local base station 20 determines a handover to the macro base station eNB 150.

As shown in FIG. 23, the local base station 20 transmits a handover request message to a mobility management entity (MME) 50C (step S2401: HO request). Similarly, the mobility management entity (MME) 50C transmits a handover request message to the macro base station eNB 150 (step S2403: HO request).

When a resource that accommodates the mobile terminal (UE) 10C is secured or the possibility of the resource being secured is made, the macro base station eNB 150 transmits a handover request response message (Handover Response) to the mobility management entity (MME) 50C (step S2405: HO request response).

By receiving the handover request response message (Handover Response), the mobility management entity (MME) 50C transmits a handover command message to the mobile terminal (UE) 10C (step S2407: HO command). Meanwhile, the handover command message is delivered to the mobile terminal (UE) 10C through the local base station 20C (step S2409: HO delivery).

The mobile terminal (UE) 10C transmits a handover confirmation message to the macro base station eNB 150 (step S2411: HO confirmation).

By receiving the handover confirmation message, the macro base station eNB 150 transmits a handover indication message to the mobility management entity (MME) 50C (step S2413: HO indication (LIPA capability)).

In step S2413, the macro base station eNB 150 stores information indicating whether or not to allow the LIPA to be performed on the access point name (APN) to which the mobile terminal (UE) 10C is connected, in the handover indication message, and transmits the information to the mobility management entity (MME) 50C. Alternatively, the mobility management entity (MME) 50C may confirm whether the LIPA connection can be performed on the APN to which the mobile terminal (UE) 10C is connected from a base station of a handover destination (here, macro base station eNB 150), or whether a user thereof is permitted. In this case, the mobility management entity (MME) 50C determines whether or not to allow the LIPA to be performed using information or the like regarding subscriber information or RAN (base station) capability.

When the LIPA is able to be performed, the mobility management entity (MME) 50C continuously performs a handover procedure in the related art. That is, the established LIPA bearer is handed over to the macro base station eNB 150. At this time, since the same address is allocated to the mobile terminal (UE) 10C, it is not necessary to update a tunnel with the packet gateway ePDG 60 established on the LIPA bearer. Meanwhile, (1) in a case where the LIPA is able to be performed, but the access point name (APN) is updated, (2) in a case where the local gateway (LGW) of a connection destination is updated, or the like, the address allocated to the mobile terminal (UE) 10C may be updated (at this time, the LIPA bearer may be required to be newly established). As seen from the above, when the address of the LIPA bearer allocated to the mobile terminal (UE) 10C is updated, the mobile terminal (UE) 10C performs a process of changing a tunnel endpoint address with the packet gateway ePDG 60.

When the LIPA is not able to be performed, the mobility management entity (MME) 50C confirms whether the mobile terminal (UE) 10C holds connection (hereinafter, referred to as a macro PDN bearer, macro PDN connection, or the like) to a macro PDN (that is, other than a local network shown by the LIPA APN) established on the LIPA bearer. For this reason, the mobility management entity (MME) 50C may store information (on whether connection to the macro PDN is superimposed on the LIPA bearer) for status management in a LIPA bearer context.

When it is detected that another connection is superimposed on the LIPA bearer, the mobility management entity (MME) 50C acquires subscriber information of the mobile terminal (UE) 10C from a subscriber information server (HSS) or an authentication server (AAA) which are not shown, and extracts an address of the packet gateway PGW 70 to which a connection on the LIPA bearer is connected (step S2415: subscriber information acquisition (HSS/AAA)).

Subsequently, the mobility management entity (MME) 50C selects the serving gateway (SGW) 160 and switches the connection to the macro PDN to a bearer via 3G access, and thus transmits a bearer creation request message to the packet gateway PGW 70 extracted via the serving gateway (SGW) 160 (steps S2417 and S2419: bearer creation request). Meanwhile, when the serving gateway (SGW) is allocated in advance, the mobility management entity (MME) 50C selects the allocated serving gateway (SGW).

The packet gateway PGW 70 generates a context regarding the macro PDN bearer of the mobile terminal (UE) 10C, and transmits a bearer creation response message to the mobility management entity (MME) 50C via the serving gateway (SGW) 160 (steps S2421 and S2423: bearer creation response).

The mobility management entity (MME) 50C transmits a context setup request message that requests the establishment of a radio bearer to the macro base station eNB 150 (step S2425: context setup request).

When the context setup request message is received, the macro base station eNB 150 performs a radio bearer setting process between the mobile terminal (UE) 10C and the macro base station (step S2427: radio bearer setting).

When the radio bearer establishment with the mobile terminal (UE) 10C is completed, the macro base station eNB 150 transmits a context setup response message to the mobility management entity (MME) 50C (step S2429: context setup response).

In order to reflect a QoS parameter of the established radio bearer, the mobility management entity (MME) 50C performs a bearer modification process, as necessary, between the packet gateway PGW 70 and the mobility management entity (step 2431: bearer modification process). Thereby, the macro PDN bearer for connection to the external network PDN 200 is established between the mobile terminal (UE) 10C and the packet gateway PGW 70. After this, the release of the LIPA bearer may be performed as necessary.

For example, a LIPA capability notification from the macro base station eNB 150 is stored in the handover request response message and the mobility management entity (MME) 50C is notified of the notification. When the mobility management entity (MME) 50C determines that the LIPA of the macro base station eNB 150 is not able to be performed, the mobility management entity commands the local base station 20 to release the LIPA bearer together in the handover command message.

By receiving this, the local base station 20 releases the LIPA bearer of the mobile terminal (UE) 10C at an arbitrary timing after the handover confirmation message is transmitted. At this time, until the handover of the macro PDN bearer is completed, the mobility management entity (MME) 50C does not release the LIPA bearer context. Thereby, it is possible to prevent even the connection to the macro PDN (before the handover is completed) from being released unexpectedly.

Through the above processed, the handover of the macro PDN bearer is completed, and the PDN connection via the macro RAN without passing through the local network 100 is established, thereby allowing communication with the external network PDN 200 to be continued.

<Configuration and Operation of Mobile Terminal>

Figure 25:
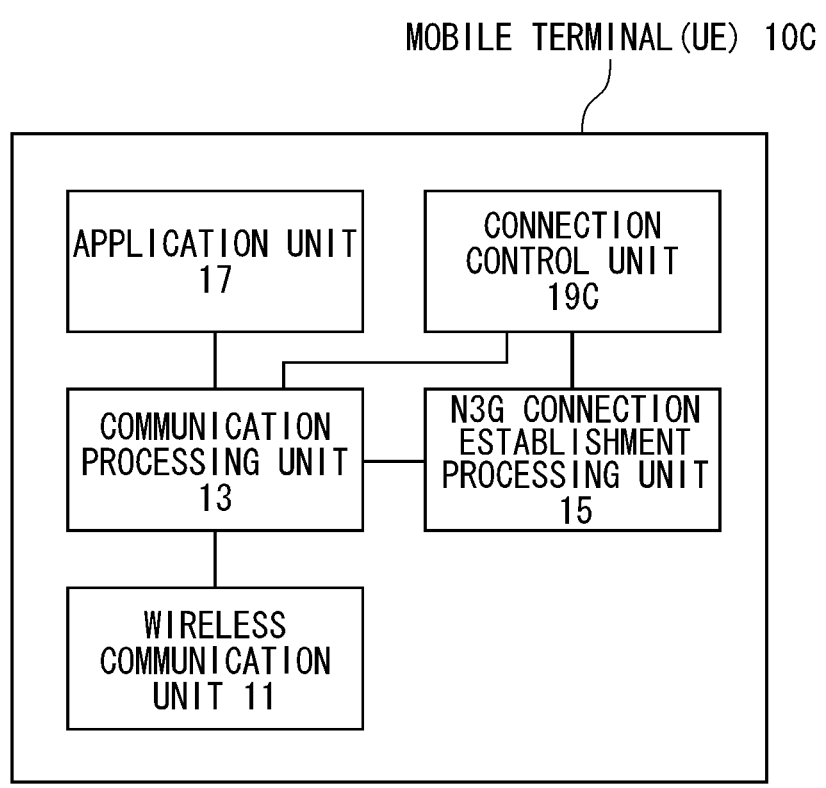
FIG. 25 is a block diagram illustrating a configuration of a mobile terminal (UE) 10C according to the fourth embodiment.

A configuration of the mobile terminal (UE) 10C according to the fourth embodiment will be described with reference to FIG. 25. FIG. 25 is a block diagram illustrating a configuration of the mobile terminal (UE) 10C according to the fourth embodiment. The mobile terminal (UE) 10C shown in FIG. 25 includes a wireless communication unit 11 for physical/logical connection to a cellular base station including the local base station 20C, a communication processing unit 13 that performs protocol processing such as connection or handover to a base station or a core network device, an N3G connection establishment processing unit 15 that performs protocol processing between communication nodes used from Non-3GPP access of the ePDG and the like, an application unit 17 for getting applications to work, and a connection control unit 19C.

<Configuration and Operation of Local Base Station>

Figure 26:
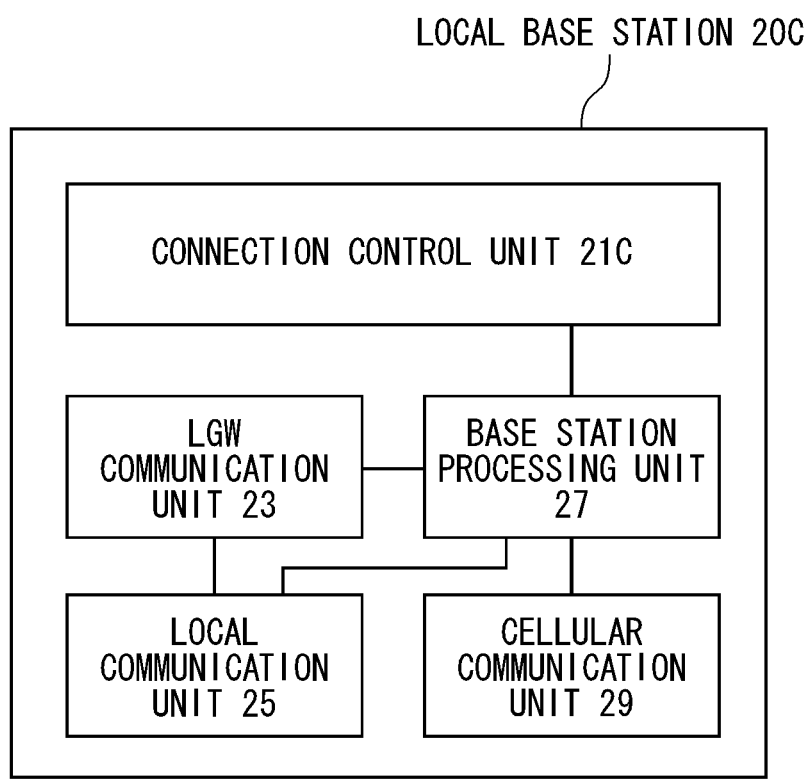
FIG. 26 is a block diagram illustrating a configuration of a local base station 20C according to the fourth embodiment.

A configuration of the local base station 20C according to the fourth embodiment will be described with reference to FIG. 26. FIG. 26 is a block diagram illustrating a configuration of the local base station 20C. The local base station 20C shown in FIG. 26 includes a connection control unit 21C, an LGW communication unit 23 that performs a protocol for connection to a local gateway (LGW), a local communication unit 25 for connection to the local network 110, a base station processing unit 27 that performs a base station process on the mobile terminal (UE) 10C or the core network device, and a cellular communication unit 29 for connection to the mobile terminal (UE) 10C through a cellular channel.

<Configuration and Operation of MME>

Figure 27:
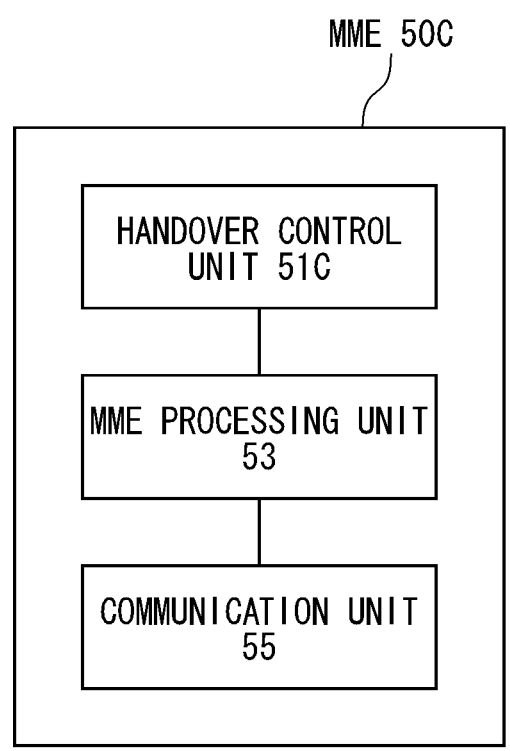
FIG. 27 is a block diagram illustrating a configuration of a mobility management entity (MME) 50C.

A configuration of the mobility management entity (MME) 50C will be described with reference to FIG. 27. FIG. 27 is a block diagram illustrating a configuration of the mobility management entity (MME) 50C. The mobility management entity (MME) 50C shown in FIG. 27 includes a handover control unit 51C, an MME processing unit 53, and a communication unit 55.

Figure 28:
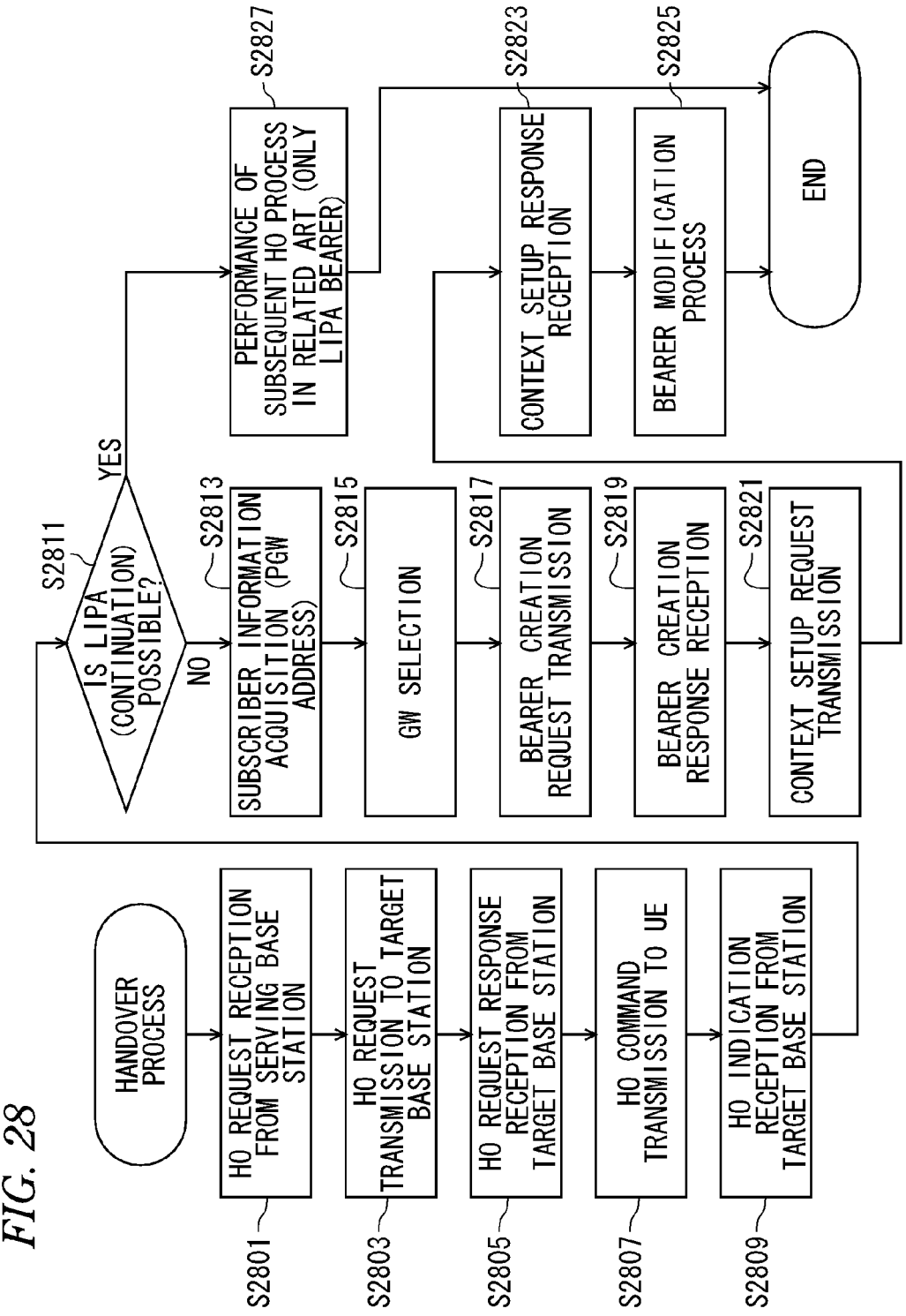
FIG. 28 is a flow diagram illustrating a "handover process" of the mobility management entity (MME) 50C.

Operations of the mobility management entity (MME) 50C shown in FIG. 27 will be described with reference to FIG. 28. FIG. 28 is a flow diagram illustrating a "handover process" of the mobility management entity (MME) 50C, and is a flow diagram, particularly, for performing a handover process from the local base station 20C of the mobile terminal (UE) 10C to the macro base station eNB 150.

As shown in FIG. 28, the communication unit 55 receives a handover request message from the macro base station eNB 150 which is a serving base station (step S2801: "HO request reception from serving base station").

The MME processing unit 53 transmits a handover request message to the local base station 20C which is a target base station through the communication unit 55 (step S2803: "HO request transmission to target base station").

The MME processing unit 53 receives a handover request response message (Handover Response) from the local base station 20C which is a target base station through the communication unit 55 (step S2805: "HO request response reception from target base station").

The MME processing unit 53 transmits a handover command message to the mobile terminal (UE) 10C through the communication unit 55 (step S2807: "HO command transmission to UE"). Meanwhile, the handover command message is delivered to the mobile terminal (UE) 10C through the macro base station eNB 150.

The MME processing unit 53 receives a handover indication message from the local base station 20C which is a target base station through the communication unit 55 (step S2809: "HO indication reception from target base station").

The handover control unit 51C determines whether the LIPA connection (continuation) is possible based on information, stored in the handover indication message, indicating whether or not to allow the LIPA to be performed on the access point name (APN) to which the mobile terminal (UE) 10C is connected (step S2811: "is LIPA (continuation) possible?"). When the LIPA connection is possible (if Yes), the process transitions to step S2827. When the LIPA connection is not possible (if No), the process transitions to step S2813.

When the LIPA connection is possible (if Yes), the handover control unit 51C continuously performs a subsequent handover procedure in the related art (step S2827: "performance of subsequent HO process in the related art"). That is, the established LIPA bearer is handed over to the macro base station eNB 150. At this time, since the same address is allocated to the mobile terminal (UE) 10C, it is not necessary to update a tunnel with the packet gateway ePDG 60 established on the LIPA bearer.

When the LIPA connection is not possible (if No), the handover control unit 51C confirms whether the mobile terminal (UE) 10C holds connection to a macro APN (that is, other than the LIPA APN) established on the LIPA bearer. When the handover control unit 51C detects that another connection is superimposed on the LIPA bearer, the mobility management entity (MME) 50C acquires subscriber information of the mobile terminal (UE) 10C from a subscriber information server (HSS) or an authentication server (AAA) which are not shown (step S2813: subscriber information acquisition (PGW address)), and extracts an address of the packet gateway PGW 70 to which a connection on the LIPA bearer is connected.

Subsequently, the MME processing unit 53 selects the serving gateway (SGW) 160 through the communication unit 55 and switches the connection to the macro PDN to a bearer via 3G access, and thus transmits a bearer creation request message to the extracted packet gateway PGW 70 through the serving gateway (SGW) 160 (step S2817: bearer creation request transmission).

The MME processing unit 53 receives a bearer creation response message from the packet gateway PGW 70 through the communication unit 55 via the serving gateway (SGW) 160 (step S2819: bearer creation response reception).

The MME processing unit 53 transmits a context setup request message that requests the establishment of a radio bearer to the macro base station eNB 150 through the communication unit 55 (step S2821: context setup request transmission).

When the radio bearer establishment with the mobile terminal (UE) 10C is completed, the MME processing unit 53 receives a context setup response message from the macro base station eNB 150 through the communication unit 55 (step S2823: context setup response reception).

In order to reflect a QoS parameter of the established radio bearer, the MME processing unit 53 performs a bearer modification process, as necessary, between the packet gateway PGW 70 and the MME processing unit (step S2825: bearer modification process).

Fifth Embodiment

In a communication system according to a fifth embodiment, the mobile terminal (UE) establishes PDN connection via a local base station and then transitions to an idle mode. The mobile terminal moves to a macro base station and then returns from an idle mode.

<Communication System Configuration>

Figure 29:
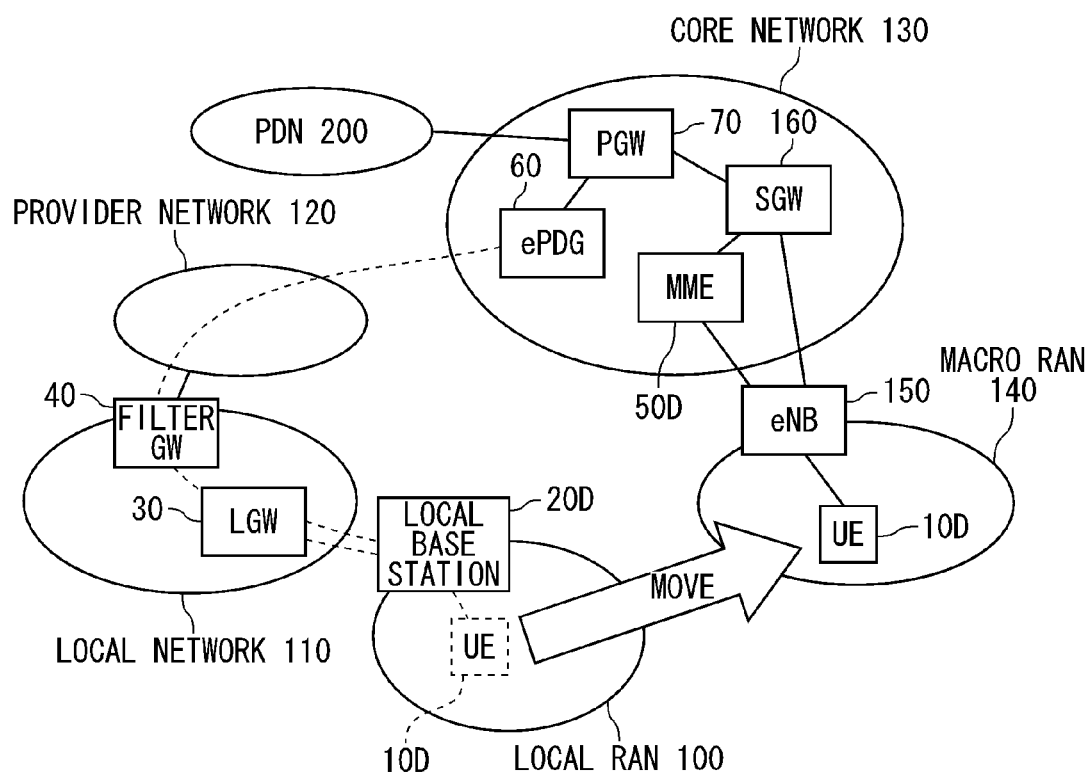
FIG. 29 is a diagram illustrating a configuration of a communication system according to a fifth embodiment.

A configuration of the communication system according to the fifth embodiment will be described with reference to FIG. 29. FIG. 29 is a diagram illustrating a configuration of the communication system according to the fifth embodiment, and is a diagram particularly illustrating a state where the mobile terminal establishes PDN connection via a local base station and then transitions to an idle mode, and moves to a macro base station and then returns from an idle mode. The communication system according to the present embodiment shown in FIG. 29 is different from the communication system according to the second embodiment shown in FIG. 7, in that a mobile terminal (UE) 10D moves in the reverse direction. That is, the mobile terminal (UE) 10D moves the macro RAN 140 in a state where the mobile terminal transitions to an idle mode in the local RAN 100, and performs an idle mode return process.

<Communication System Operation>

Figure 30:
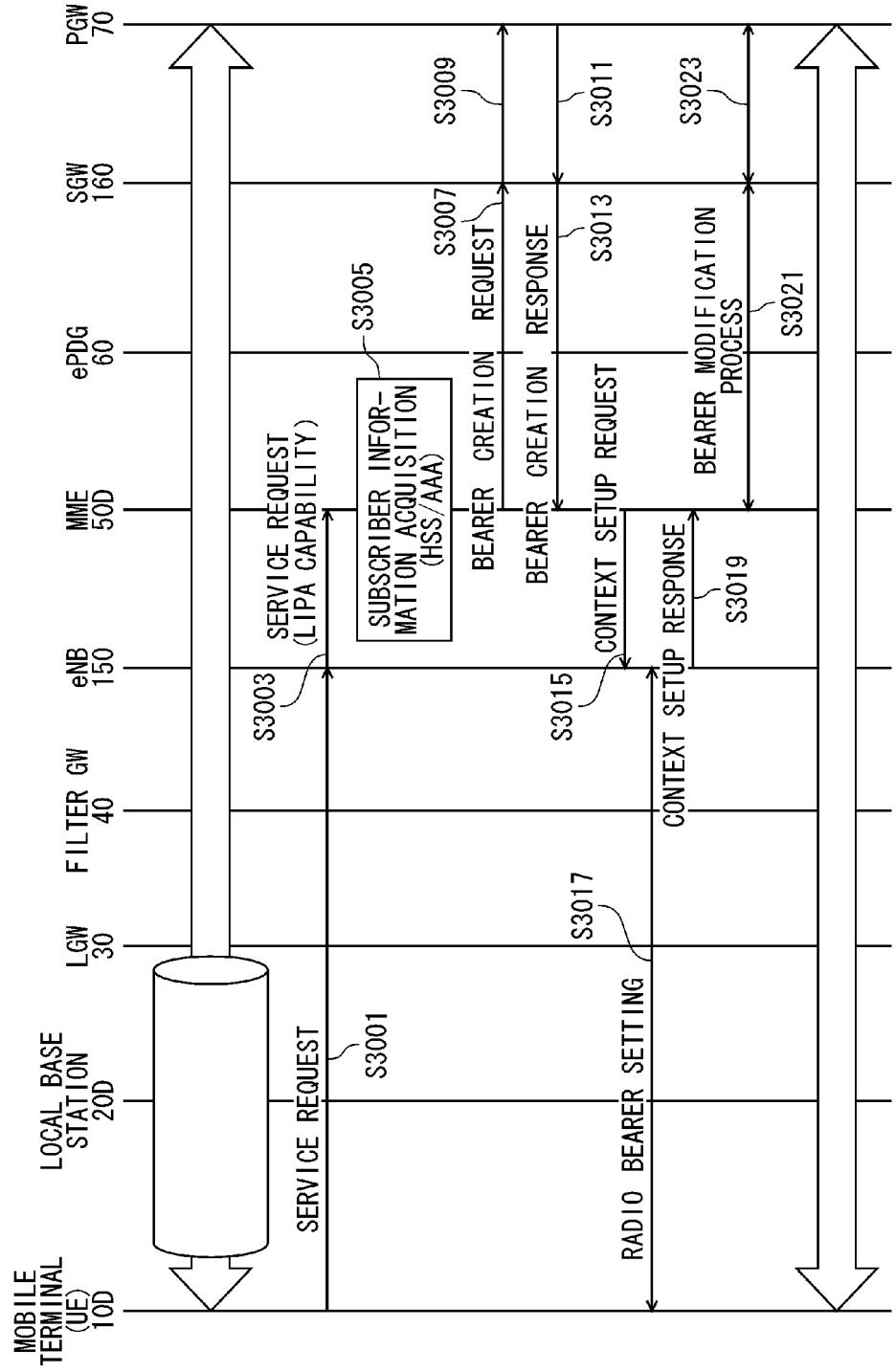
FIG. 30 is a diagram illustrating operations of the communication system shown in FIG. 29.

Operations of the communication system shown in FIG. 29 will be described with reference to FIG. 30. FIG. 30 is a diagram illustrating operations of the communication system shown in FIG. 29. Meanwhile, in FIG. 30, the mobile terminal (UE) 10D establishes a LIPA bearer via a local base station 20D, establishes PDN connection the packet gateway PGW 70 on the LIPA bearer, and then transitions to an idle mode. That is, in the communication system shown in FIG. 29, a radio bearer between the local base station 20D and the mobile terminal (UE) 10D, a bearer context of the mobile terminal (UE) 10D in the local base station 20D, and a S1 bearer for the mobile terminal (UE) 10D between the local base station 20D and a mobility management entity (MME) 50D are not present.

When the mobile terminal (UE) 10D moves to enter an area of the macro RAN 140, and determines a return from an idle mode in order to start communication, a service request message is transmitted to the macro base station eNB 150 (step S3001: service request).

The macro base station eNB 150 stores information indicating whether or not to allow the LIPA to be performed on the access point name (APN) to which the mobile terminal (UE) 10D is connected, in the service request message, and transmits the information to the mobility management entity (MME) 50D (step S3003: service request (LIPA capability)). Alternatively, the mobility management entity (MME) 50D may confirm whether the LIPA connection can be performed on the access point name (APN) to which the mobile terminal (UE) 10D is connected from the macro base station eNB 150, or whether a user thereof is permitted. In this case, the mobility management entity (MME) 50D determines whether or not to allow the LIPA to be performed using information or the regarding subscriber information or RAN (base station) capability.

When the LIPA is able to be performed, the mobility management entity (MME) 50D continuously performs a service request procedure in the related art (recovery from idle process). That is, the established LIPA bearer is established in the macro base station eNB 150. At this time, since the same address is allocated to the mobile terminal (UE) 10D, it is not necessary that the mobility management entity (MME) 50D update a tunnel with the packet gateway ePDG 60 established on the LIPA bearer. Meanwhile, the LIPA is able to be performed, but (1) in a case where the access point name (APN) is updated, (2) in a case where the local gateway (LGW) of a connection destination is updated, or the like, the address allocated to the mobile terminal (UE) 10D may be updated (at this time, the LIPA bearer may be required to be newly established). As seen from the above, when the address of the LIPA bearer allocated to the mobile terminal (UE) 10D is updated, the mobile terminal (UE) 10D performs a process of changing a tunnel endpoint address with the packet gateway ePDG 60.

When the LIPA is not able to be performed, the mobility management entity (MME) 50D confirms whether the mobile terminal (UE) 10D holds connection to a macro APN (that is, other than the LIPA APN) established on the LIPA bearer. For this reason, the mobility management entity (MME) 50D may store information (on whether connection to the macro PDN is superimposed on the LIPA bearer) for status management in a LIPA bearer context. When it is detected that another connection is superimposed on the LIPA bearer, the mobility management entity (MME) 50D acquires subscriber information of the mobile terminal (UE) 10D from a subscriber information server (HSS) or an authentication server (AAA) which are not shown, and extracts an address of the packet gateway PGW 70 to which a connection on the LIPA bearer is connected (step S3005: subscriber information acquisition (HSS/AAA)).

Subsequently, the mobility management entity (MME) 50D selects the serving gateway (SGW) 160 (selects the allocated SGW when allocated in advance) and switches the connection to the macro PDN to a bearer via 3G access, and thus transmits a bearer creation request message to the extracted packet gateway PGW 70 through the serving gateway (SGW) 160 (steps S3007 and S3009: bearer creation request).

The packet gateway PGW 70 generates a context regarding the macro PDN bearer of the mobile terminal (UE) 10D, and transmits a bearer creation response message to the mobility management entity (MME) 50D (steps S3011 and S3013: bearer creation response).

The mobility management entity (MME) 50D transmits a context setup request message that requests the establishment of a radio bearer to the macro base station eNB 150 (step S3015: context setup request).

When the context setup request message is received, the macro base station eNB 150 performs a radio bearer setting process between the mobile terminal (UE) 10D and the macro base station (step S3017: radio bearer setting).

When the radio bearer establishment with the mobile terminal (UE) 10D is completed, the macro base station eNB 150 transmits a context setup response message to the mobility management entity (MME) 50D (step S3019: context setup response). In order to reflect a QoS parameter of the established radio bearer, the mobility management entity (MME) 50D performs a bearer modification process, as necessary, between the packet gateway PGW 70 and the mobility management entity (steps S3021 and S3023: bearer modification process). Thereby, the macro PDN bearer for connection to the external network PDN 200 is established between the mobile terminal (UE) 10D and the packet gateway PGW 70. After this, the release of the LIPA bearer may be performed as necessary. For example, the MME commands the local base station 20D to release the LIPA bearer.

Through the above processes, in the communication system according to the present embodiment, the return process of the bearer held by the mobile terminal (UE) 10D is complete, and the PDN connection via the macro RAN without passing through the local network 100 is established, thereby allowing communication with the external network PDN 200 to be continued.

<Configuration and Operation of Mobile Terminal>

Figure 31:
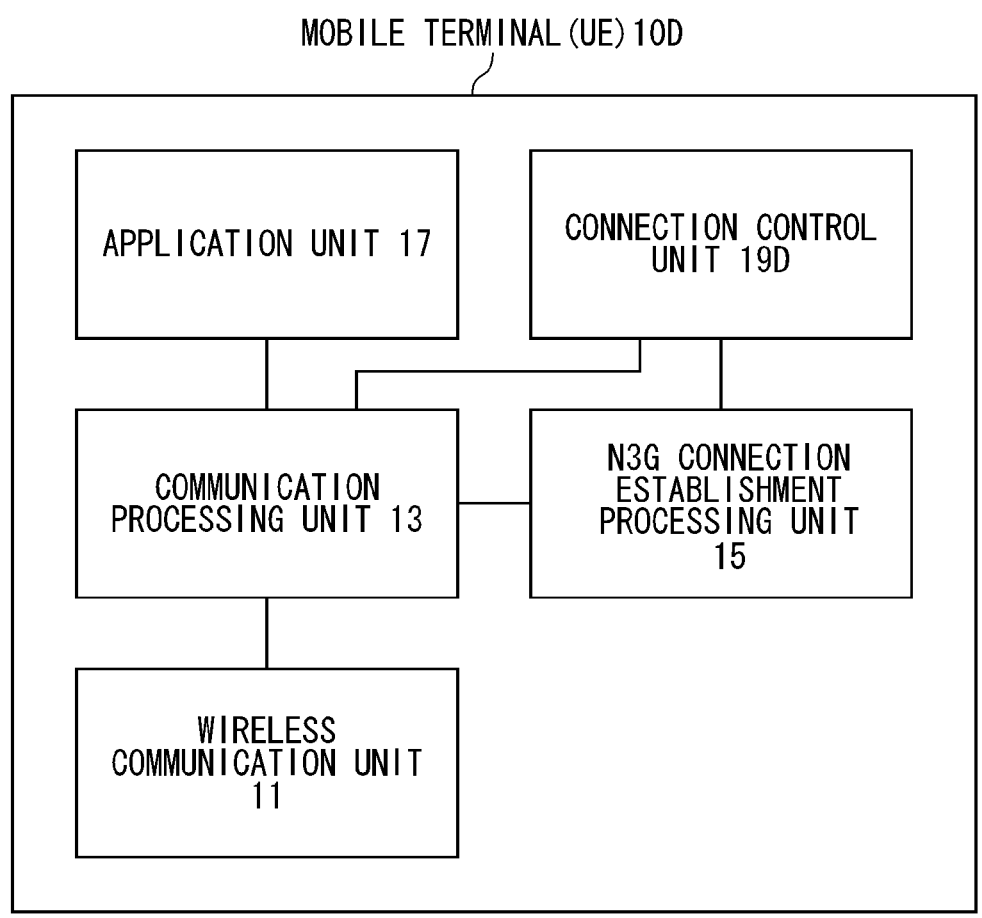
FIG. 31 is a block diagram illustrating a configuration of a mobile terminal (UE) 10D according to the fifth embodiment

A configuration of the mobile terminal (UE) 10D according to the fifth embodiment will be described with reference to FIG. 31. FIG. 31 is a block diagram illustrating a configuration of the mobile terminal (UE) 10D according to the fifth embodiment. The mobile terminal (UE) 10D shown in FIG. 31 includes a wireless communication unit 11 for physical/logical connection to a cellular base station including the local base station 20D, a communication processing unit 13 that performs protocol processing such as connection or handover to a base station or a core network device, an N3G connection establishment processing unit 15 that performs protocol processing between communication nodes used from Non-3GPP access of the ePDG and the like, an application unit 17 for getting applications to work, and a connection control unit 19D.

<Configuration and Operation of Local Base Station>

Figure 32:
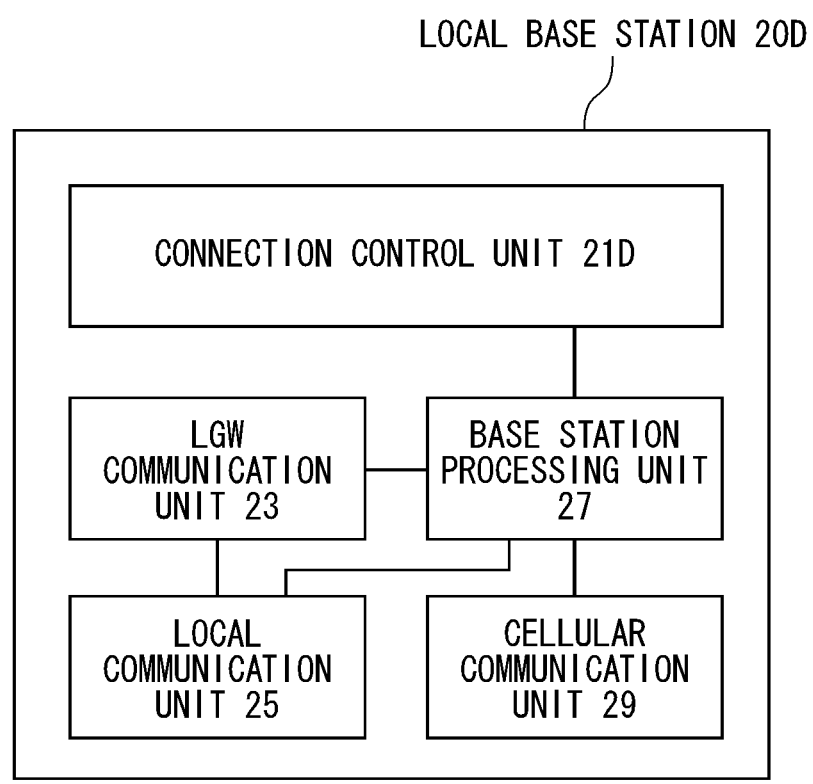
FIG. 32 is a block diagram illustrating a configuration of a local base station 20D according to the fifth embodiment.

A configuration of the local base station 20D according to the fifth embodiment will be described with reference to FIG. 32. FIG. 32 is a block diagram illustrating a configuration of the local base station 20D. The local base station 20D shown in FIG. 32 includes a connection control unit 21D, an LGW communication unit 23 that performs a protocol for connection to a local gateway (LGW), a local communication unit 25 for connection to the local network 110, a base station processing unit 27 that performs a base station process on the mobile terminal (UE) 10C or the core network device, and a cellular communication unit 29 for connection to the mobile terminal (UE) 10D through a cellular channel.

<Configuration and Operation of MME>

Figure 33:
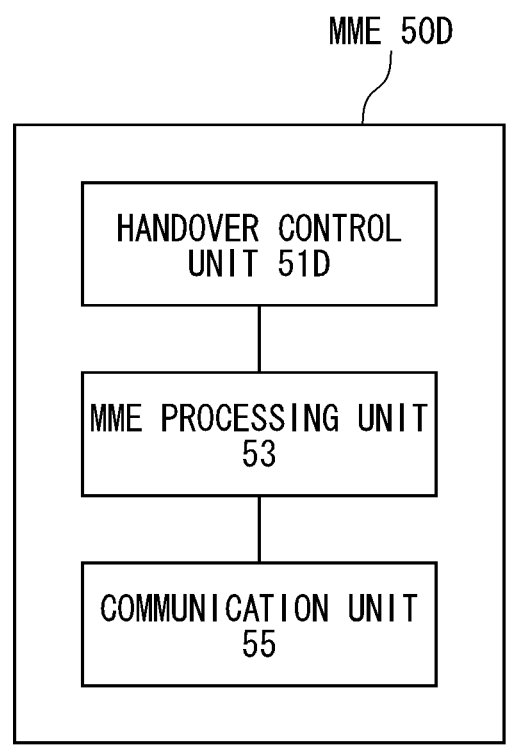
FIG. 33 is a block diagram illustrating a configuration of a mobility management entity (MME) 50D.

A configuration of the mobility management entity (MME) 50D will be described with reference to FIG. 33. FIG. 33 is a block diagram illustrating a configuration of the mobility management entity (MME) 50D. The mobility management entity (MME) 50D shown in FIG. 33 includes a handover control unit 51D, an MME processing unit 53, and a communication unit 55.

Figure 34:
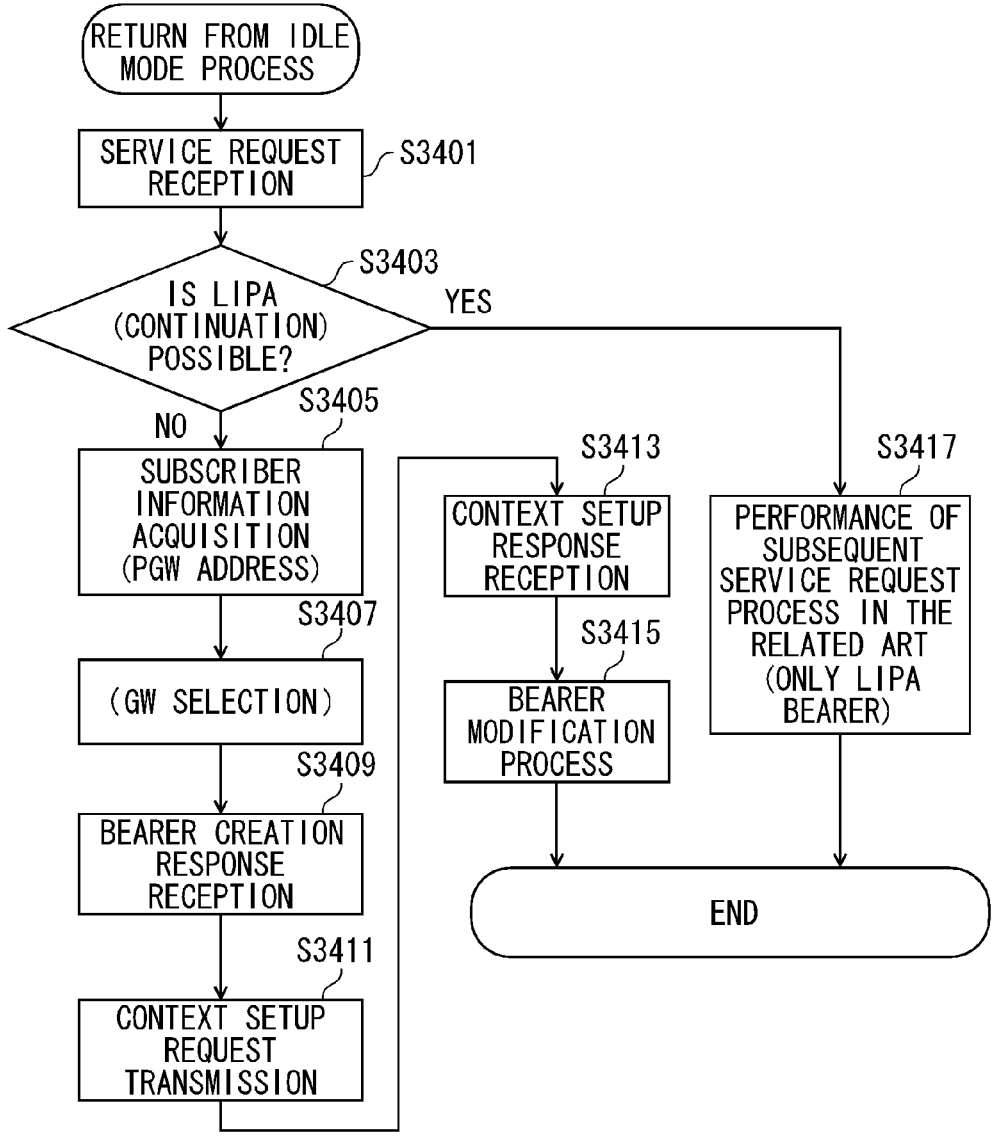
FIG. 34 is a flow diagram illustrating a "recovery from idle process" of the mobility management entity (MME) 50D.

Operations of the mobility management entity (MME) 50D shown in FIG. 33 will be described with reference to FIG. 34. FIG. 34 is a flow diagram illustrating a "recovery from idle process" of the mobility management entity (MME) 50D, and is a flow diagram, particularly, when the mobile terminal (UE) 10D performs an idle mode return under a macro base station.

As shown in FIG. 33, the handover control unit 51D receives a service request message in which information indicating whether or not to allow the LIPA to be performed on the access point name (APN) to which the mobile terminal (UE) 10D is connected is stored, from the macro base station eNB 150 through the communication unit 55 (step S3401: service request reception).

The handover control unit 51D determines whether or not to allow the LIPA to be performed using information or the like regarding subscriber information or RAN (base station) capability (step S3403: is LIPA (continuation) possible?). When the LIPA is able to be performed (if Yes), the process transitions to step S3417. When the LIPA is not able to be performed (if No), the process transitions to step S3405.

When the LIPA is not able to be performed, the MME processing unit 53 confirms whether the mobile terminal (UE) 10D holds connection to a macro APN (that is, other than the LIPA APN) established on the LIPA bearer. The MME processing unit 53 stores information (on whether connection to the macro PDN is superimposed on the LIPA bearer) for status management in a LIPA bearer context. When it is detected that another connection is superimposed on the LIPA bearer, the MME processing unit 53 acquires subscriber information of the mobile terminal (UE) 10D from a subscriber information server (HSS) or an authentication server (AAA), which are not shown, through the communication unit 55 (step S3405: subscriber information acquisition (PGW address)).

The MME processing unit 53 selects the serving gateway (SGW) 160 (step S3407: (GW selection)). Meanwhile, when the serving gateway (SGW) 160 is allocated in advance, the allocated serving gateway (SGW) 160 is selected.

The MME processing unit 53 receives a bearer creation response message in which a context regarding the macro PDN bearer of the mobile terminal (UE) 10D is generated, from the packet gateway PGW 70 through the communication unit 55 (step S3409: bearer creation response reception).

The MME processing unit 53 transmits a context setup request message that requests the establishment of a radio bearer to the macro base station eNB 150 through the communication unit 55 (step S3411: context setup request transmission).

After the macro base station eNB 150 completes the radio bearer establishment between the mobile terminal (UE) 10D and the macro base station, the MME processing unit 53 receives a context setup response message from the macro base station eNB 150 through the communication unit 55 (step S3413: context setup response reception).

In order to reflect a QoS parameter of the established radio bearer, the MME processing unit 53 performs a bearer modification process, as necessary, between the packet gateway PGW 70 and the MME processing unit through the communication unit 55 (step S3415: bearer modification process).

When the LIPA is able to be performed, the MME processing unit 53 continuously performs a service request procedure in the related art (recovery from idle process) (step S3417: performance of subsequent service request process in the related art (only LIPA bearer)).

Sixth Embodiment

A communication system according to a sixth embodiment discloses a different method when the mobile terminal (UE) is initially connected to a PDN that provides network services such as the Internet via a local base station, performs a handover or returns from an idle mode.

<Configuration of Communication System>

Figure 35:
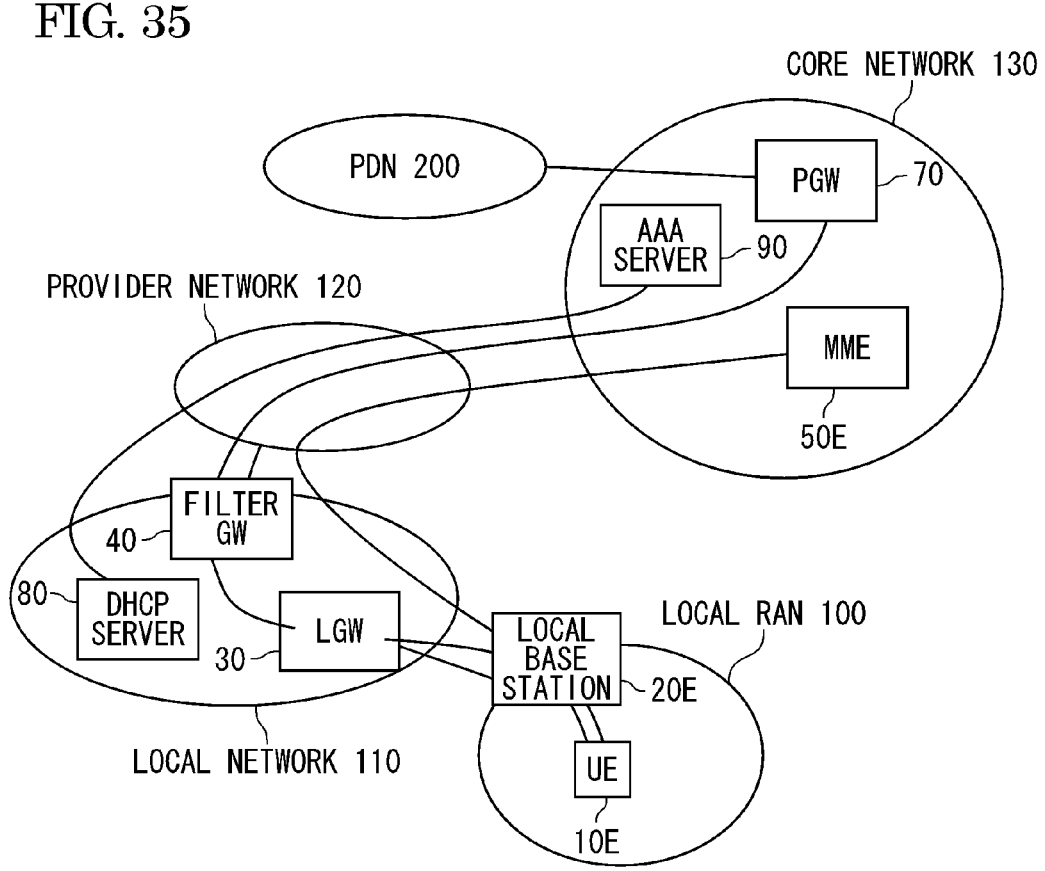
FIG. 35 is a diagram illustrating a configuration of a communication system according to a sixth embodiment.

A configuration of the communication system according to the sixth embodiment will be described with reference to FIG. 35. FIG. 35 is a diagram illustrating a configuration of the communication system according to the sixth embodiment. FIG. 35 is a diagram particularly illustrating a system that establishes macro PDN connection in order for a mobile terminal (UE) 10E to be connected from a local base station 20E via a LIPA bearer to the external network PDN 200. The communication system shown in FIG. 35 is different from the communication system shown in FIG. 1, in that the ePDG is not disposed in the core network 130, and that instead thereof, an AAA server 90 is disposed in the core network 130 and a DHCP server 80 is disposed in the local network 110. Meanwhile, the DHCP server is provided with a function of the proxy AAA server operating in conjunction with the AAA server. The configurations other than these points are the same as those of the first embodiment. In FIG. 35, components common to those in FIG. 1 are denoted by the same reference numerals and signs.

<Communication System Operation>

Figure 36:
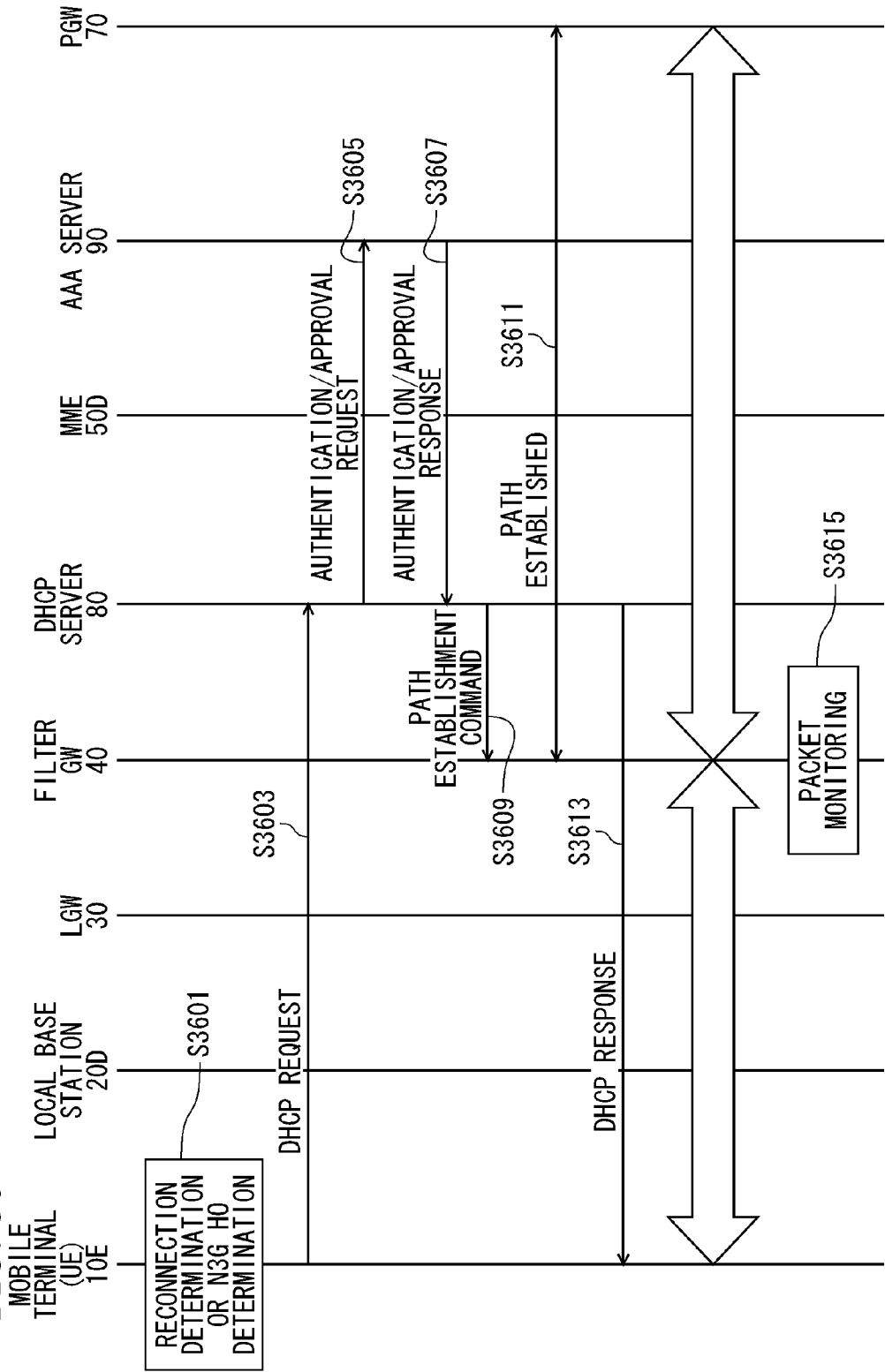
FIG. 36 is a diagram illustrating operations of the communication system shown in FIG. 35.

Operations of the communication system shown in FIG. 35 will be described with reference to FIG. 36. FIG. 36 is a diagram illustrating operations of the communication system shown in FIG. 35. The operations of a basic system of the communication system shown in FIG. 36 are the same as those of the communication system according to the first embodiment shown in FIG. 2. However, the difference between the operations of the communication system shown in FIG. 36 and the operations of the communication system according to the first embodiment shown in FIG. 2 is the reconnection determination step and the following ones performed by mobile terminal (UE) 10 in FIG. 2. Further, in the operations of the communication system shown in FIG. 36, the N3G HO determination step performed by the mobile terminal (UE) 10B in FIG. 8 is also included in the reconnection determination step and the following ones. Hereinafter, particularly, processes of the reconnection determination step to the N3G HO determination step and the following ones will be described.

As shown in FIG. 36, the mobile terminal (UE) 10E transmits a DHCP request message onto the established LIPA bearer (without contacting the ePDG). At this time, the mobile terminal (UE) 10E stores the macro APN serving as a connection destination, or the "APN-M" which is an access point name indicating the external network PDN 200 in the present embodiment, in the DHCP request message, and performs transmission thereof (step S3603: DHCP request).

When the DHCP server 80 on the local network receives the DHCP request message, the DHCP server requests terminal authentication of the mobile terminal (UE) 10E and connection approval to the APN-M from the AAA server 90 on the core network 130 (step S3605: connection authentication/approval request).

When the authentication/approval of the AAA server 90 is completed, the AAA server 90 sends back the connection approval result to the DHCP server 80 (step S3607: connection authentication/approval response).

The DHCP server 80 determines an action for the mobile terminal (UE) 10E in accordance with the received authentication/approval result. That is, when the mobile terminal (UE) 10 is properly authenticated, and connection to the "APN-M" is approved, the DHCP server 80 commands the filter GW 40 to establish a path to the packet gateway PGW 70 (step S3609: path establishment command).

The path between the filter GW 40 and the packet gateway PGW 70 which is established based on the "path establishment command" of step S3609 is, for example, a path based on the PMIP (Proxy Mobile IP) protocol, a path based on the GTP (Generic Tunnel Protocol), or a path of a VPN tunnel based on the IPsec (step S3611: path establishment).

In addition, the DHCP server 80 allocates an address (IP address) for connection to the APN-M, stores the address in a DHCP response message and transmits it to the mobile terminal (UE) 10E (step S3613: DHCP response). Here, the address allocated to the mobile terminal (UE) 10 may be notified from the AAA server 90 to the DHCP server 80 in the previous connection authentication/approval response step.

Here, the AAA server 90 may acquire an allocated address from the DHCP server 80 of the external network PDN 200 in the authentication/approval process of step S3605 and step S3607. Alternatively, in the authentication/approval process of step S3605 and step S3607, the AAA server 90 acquires an allocated address from the address range specified in advance.

The mobile terminal (UE) 10E receiving a DHCP response sets the acquired address in the LIPA bearer, and manages it as a bearer context in association with the corresponding access point name (APN) ("APN-M"). Thereby, the mobile terminal (UE) 10E can perform communication on the external network PDN 200.

<Operation of Mobile Terminal>

Figure 37:
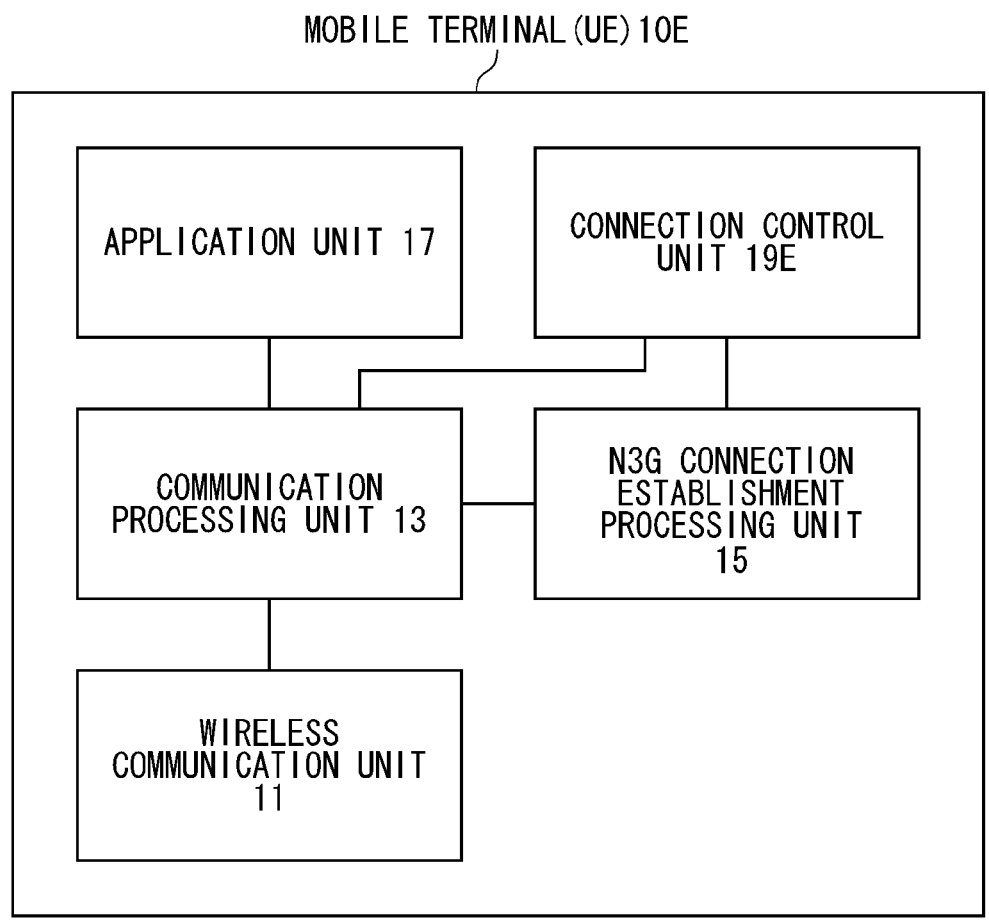
FIG. 37 is a block diagram illustrating a configuration of a mobile terminal (UE) 10E according to the sixth embodiment.

A configuration of the mobile terminal (UE) 10E according to the sixth embodiment will be described with reference to FIG. 37. FIG. 37 is a block diagram illustrating a configuration of the mobile terminal (UE) 10E according to the sixth embodiment. The mobile terminal (UE) 10E shown in FIG. 37 includes a wireless communication unit 11 for physical/logical connection to a cellular base station including the local base station 20E, a communication processing unit 13 that performs protocol processing such as connection or handover to a base station or a core network device, an N3G connection establishment processing unit 15 that performs protocol processing between communication nodes used from Non-3GPP access of the ePDG and the like, an application unit 17 for getting applications to work, and a connection control unit 19E.

Figure 38:
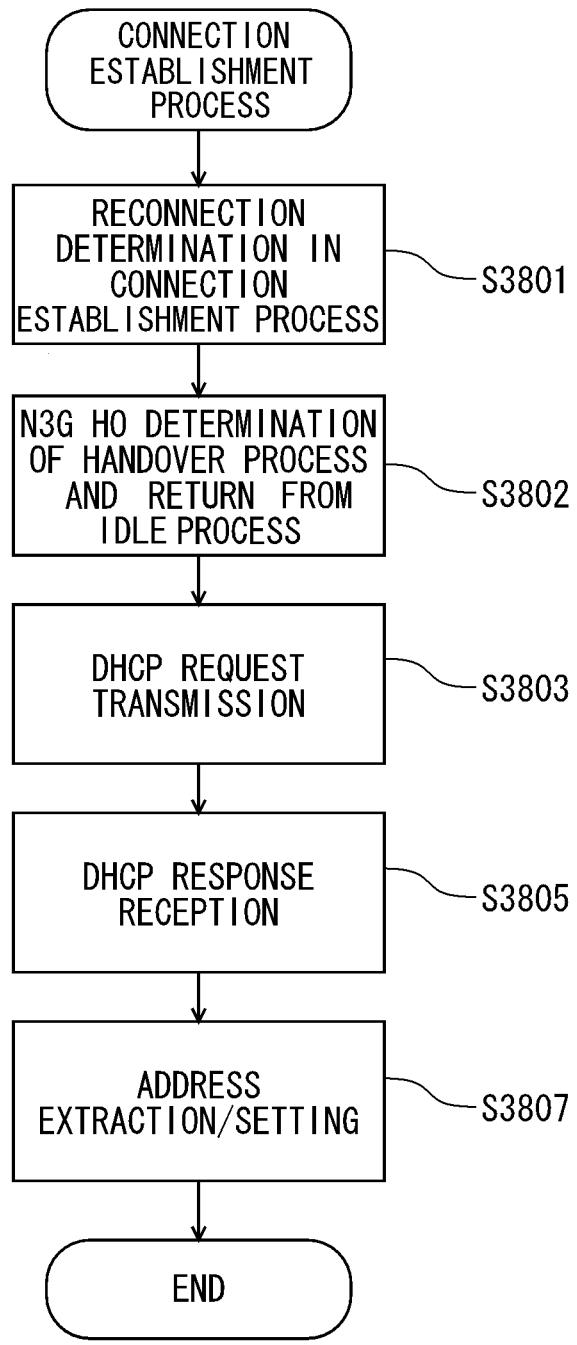
FIG. 38 is a flow diagram illustrating a "connection establishment process" of the mobile terminal (UE) 10E.

Operations of the mobile terminal (UE) 10E shown in FIG. 37 will be described with reference to FIG. 38. FIG. 38 is a flow diagram illustrating a "connection establishment process" of the mobile terminal (UE) 10E, and is a flow diagram, particularly, for performing a different method at the time of initial connection to a PDN that provides network services such as the Internet via the local base station 20E, a handover or a return from an idle mode.

The connection control unit 19E determines that a bearer (that is, LIPA bearer) different from the bearer (that is, bearer to the external network PDN 200) established before a handover is newly established through the communication processing unit 13, it is detected that the corresponding APN (APN-L) is notified in the radio bearer setting process, and connection to the external network PDN (APN-M) directly via the core network is not permitted under the present local base station 20E (step S3801: reconnection determination in connection establishment process). The connection control unit 19E then determines that handover connection using a Non3G access method on the LIPA bearer is performed through the N3G connection establishment processing unit 15 (step S3802: N3G HO determination of handover process and recovery from idle process).

The connection control unit 19E transmits a DHCP request message onto the established LIPA bearer through the communication processing unit 13. At this time, the mobile terminal (UE) 10E stores the macro APN serving as a connection destination, or the "APN-M" which is an access point name indicating the external network PDN 200 in the present embodiment, in the DHCP request message, and performs transmission thereof (step S3803: DHCP request transmission).

The connection control unit 19E receives a DHCP response message including allocation information of an address (IP address) for connection to the "APN-M", from the DHCP server 80 through the communication processing unit 13 (step S3805: DHCP response reception). Here, the address allocated to the mobile terminal (UE) 10 may be notified from the AAA server 90 to the DHCP server 80.

The connection control unit 19E extracts the allocation information of the address (IP address) for connection to the "APN-M", from the DHCP response message, sets the extracted address in the LIPA bearer, and manages the address as a bearer context. Thereby, the mobile terminal (UE) 10E can perform communication on the external network PDN 200 (step S3807: address extraction/setting).

Seventh Embodiment

In a communication system according to a seventh embodiment, a method is disclosed in which a mobile terminal 1000 (hereinafter, UE 1000) further performs local wireless communication such as a wireless LAN or local communication such as wired LAN, and initial connection, a handover, a recovery from idle and the like are performed when a different mobile terminal 2000 (hereinafter, UE_LAN 2000) is accommodated.

<Configuration 1 of Communication System: Initial Connection>

Figure 39:
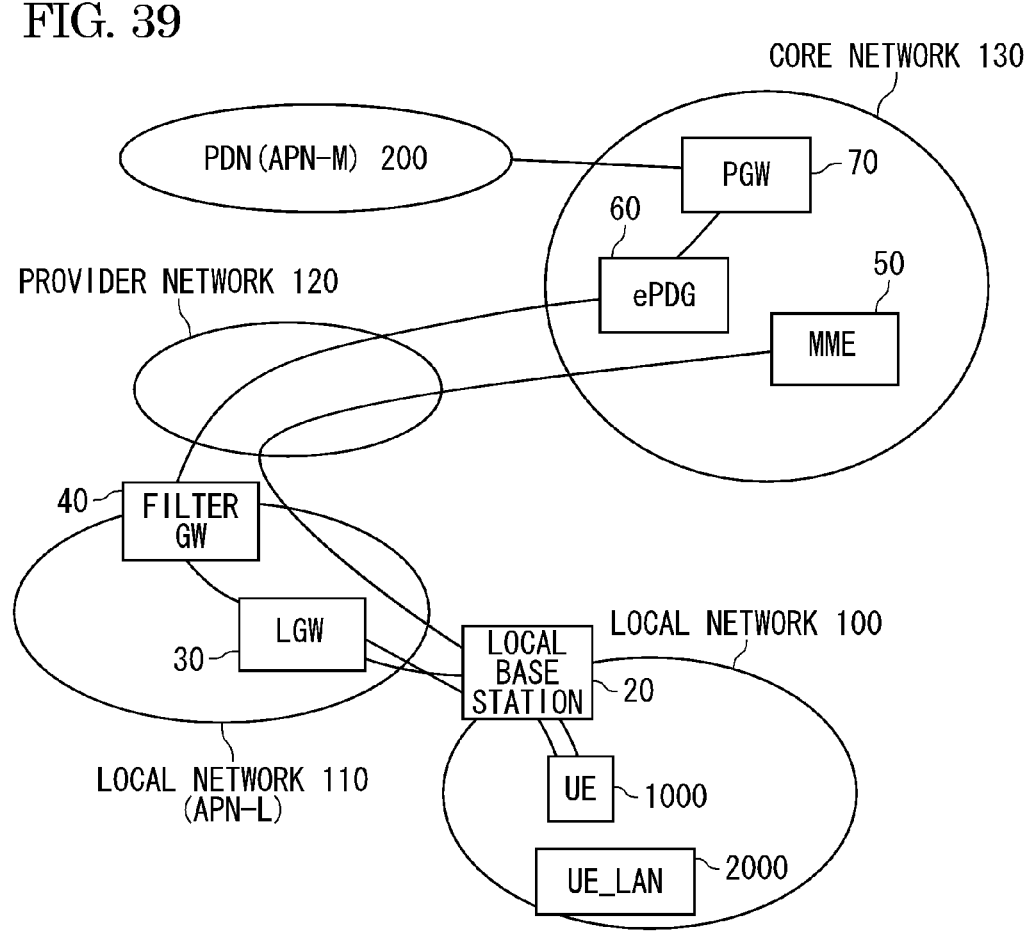
FIG. 39 is a diagram illustrating a configuration of a communication system relating to an initial connection according to a seventh embodiment.

A configuration of the communication system illustrating an initial connection method according to the seventh embodiment will be described with reference to FIG. 39. FIG. 39 is a diagram illustrating a configuration of the communication system relating to initial connection according to the seventh embodiment, and the basic components are the same as those shown in FIG. 1. The difference therebetween is that the UE_LAN 2000 to which the UE 1000 is connected through local communication means is disposed. The configurations other than this point are the same as those of the first embodiment. In FIG. 39, components common to those in FIG. 1 are denoted by the same reference numerals and signs.

In the above-mentioned configuration, when the UE_LAN 2000 capable of N3G access is connected to the UE 1000 through local communication means such as a wireless LAN, an N3G connection procedure specified in 3GPP TS23.402 is performed for connection to the PDN 200 via the core network. Specifically, for example, the ePDG and the IPsec tunnel are established, and the PGW and the PDN connection are established over the established IPsec tunnel. Thereby, the UE_LAN 2000 can perform communication with the PDN 200 through the UE 1000. However, since the UE_LAN 2000 uniquely selects the ePDG of a connection destination, there is a problem in that packet screening cannot be performed by the filter GW when encryption is applied to the IPsec tunnel. Hereinafter, a method to solve this problem will be described.

<Communication System Operation 1: Initial Connection>

Figure 40:
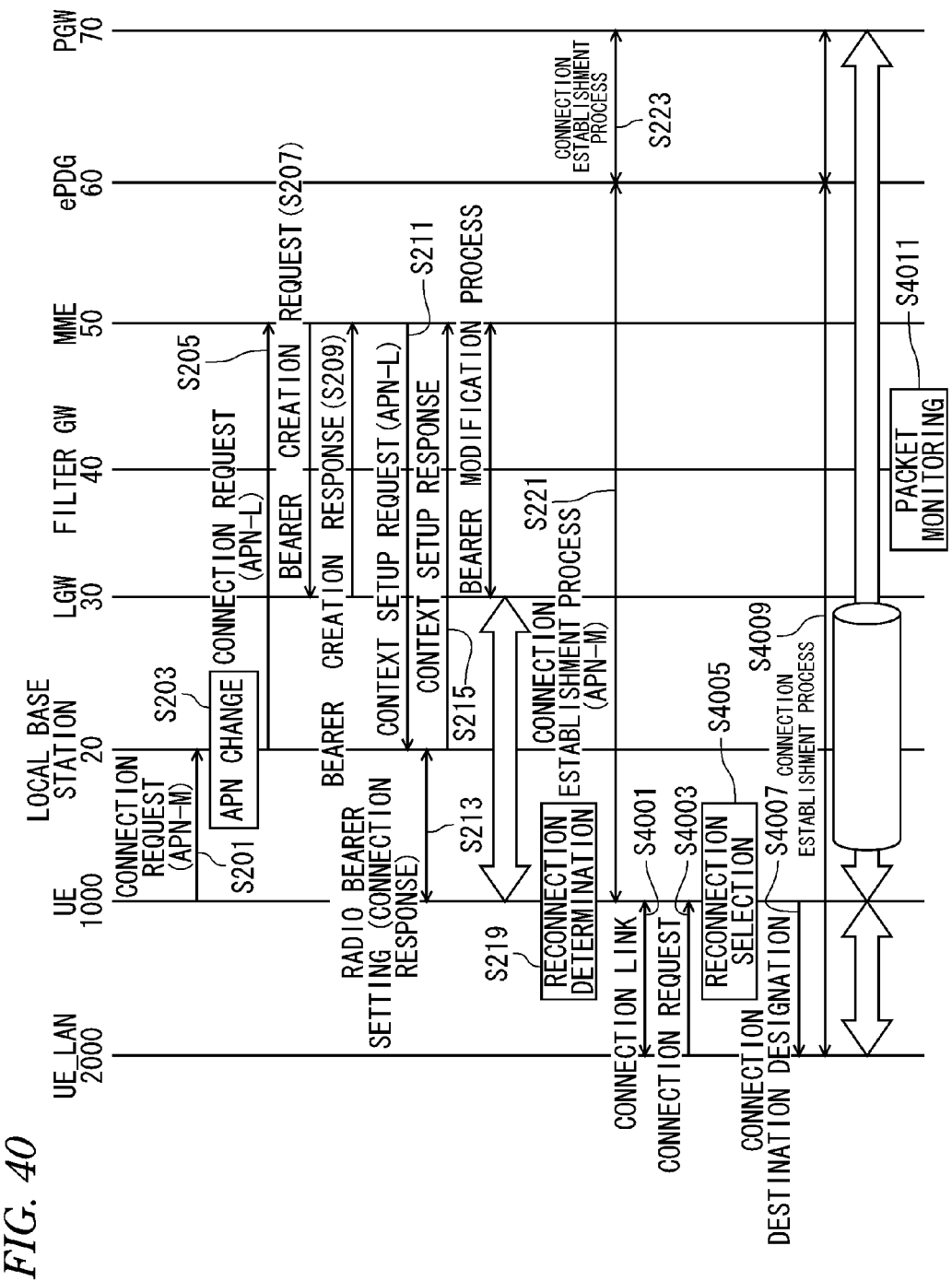
FIG. 40 is a diagram illustrating operations of the communication system shown in FIG. 39.

Operations of the communication system shown in FIG. 39 will be described with reference to FIG. 40. FIG. 40 is a diagram illustrating operations of the communication system shown in FIG. 39. The operations of a basic system of the communication system shown in FIG. 40 are the same as those of the communication system according to the first embodiment shown in FIG. 2. However, the difference between the operations of the communication system shown in FIG. 40 and the operations of the communication system according to the first embodiment shown in FIG. 2 is a connection establishment process (APN-M) step and the following ones performed by the UE 1000. Hereinafter, a process of different steps will be described.

As shown in FIG. 40, the mobile terminal (UE) 1000 performs link connection to the UE_LAN 2000 after a connection establishment process to the packet gateway ePDG 60 (ePDG 60) is completed (step S4001), and the UE_LAN 2000 transmits a connection request in order to perform N3G connection (step S4003). The connection request is, for example, a phase 1 message of the IKE protocol that requests connection establishment to the ePDG 60 uniquely selected by the UE_LAN 2000.

Here, when the UE_LAN 2000 establishes connection to the ePDG, a tunnel encrypted by the IPsec is established, and thus packet screening using the filter GW or the like is not possible. In order to prevent this, when the UE 1000 detects that the connection request is transmitted from the UE_LAN 2000, the ePDG serving as a connection destination is specified from a header of the connection request (step S4005: connection destination selection). When the specified ePDG is different from the ePDG (ePDG 60) to which the UE 1000 is connected, the UE 1000 transmits a connection destination direction for commanding reconnection to the ePDG 60 to the UE_LAN 2000 (step S4007). The connection destination direction includes an identifier (for example, IP address or host name) of the ePDG 60. The connection destination direction may be IKE redirect including the identifier of the ePDG 60, and may be a unique message. In a case of a connection request of an ePDG destination to which the UE 1000 is connected, the UE 1000 transfers the connection request to the ePDG as in the related art, and does not send the connection destination direction.

The UE_LAN 2000 receiving the connection destination direction transmits a connection request for setting the specified ePDG 60 to a destination, and performs a connection establishment process between the ePDG 60 and the UE_LAN (step S4009: connection establishment process). In this connection establishment process, similarly to the connection establishment process which is previously performed with the ePDG 60 by the UE 1000, a null algorithm is selected as an encryption algorithm applied to a tunnel to be established. Meanwhile, the UE 1000 may separately direct the UE_LAN 2000 to designate the null algorithm during the connection destination direction, and an AAA server (not shown) may direct the ePDG 60 to use the null algorithm by receiving an authentication result at the time of the tunnel establishment. Thereby, packets (application messages) that the UE_LAN 2000 exchanges with the external network PDN 200 can be monitored in the filter GW 40 (step S4011: packet monitoring).

When a security filter entry is added, real-time filter update can be made by performing an additional correction to a security filter of the filter GW 40 using a predetermined interface. In addition, since the security filter can be set with respect to the mobile terminal (UE) 1000 located down the local base station 20 and the mobile terminal (UE_LAN) 2000 located further down than that, settings for the individual mobile terminal (UE) 1000 and the UE_LAN 2000 are not required, and thus management costs can be reduced.

Meanwhile, for the purpose of simplifying description, the PDN and the PGW 70 to which the UE 1000 and the UE_LAN 2000 are connected are set to have the same configuration. However, even when the UE 1000 and the UE_LAN 2000 are connected to a different PDN or PGW, the method according to the present invention can be effected similarly.

In the above description, the connection request of the UE_LAN 2000 is set to be performed after the UE 1000 completes the connection to the ePDG 60. Here, while the UE 1000 performs the connection establishment process to the ePDG 60, or when the connection request from the UE_LAN 2000 is received before that, the UE 1000 pends or refuses the received connection request until the connection establishment process of the UE 1000 is completed. Meanwhile, the UE 1000 and the UE_LAN 2000 may perform the link connection at a timing before or after the UE 1000 completes its own connection establishment process, or in the midst of the connection establishment process. The implementation of the method according to the present invention is not damaged thereby.

In addition, the UE 1000 specifies the same ePDG 60 as that to which the UE is connected and transmits the connection destination direction. However, though not necessarily the same ePDG 60, the ePDG that satisfies requirements may be specified (hereinafter, called the equivalent ePDG). It is considered that an example of requirements satisfied by the equivalent ePDG may include ePDG which is set to specify a null code, or include ePDG, disposed in a predetermined network (for example, in-house network), which is capable of guaranteeing that communication security is reliably obtained even using non-code.

<Operation of Mobile Terminal (UE) 1000>

Figure 41:
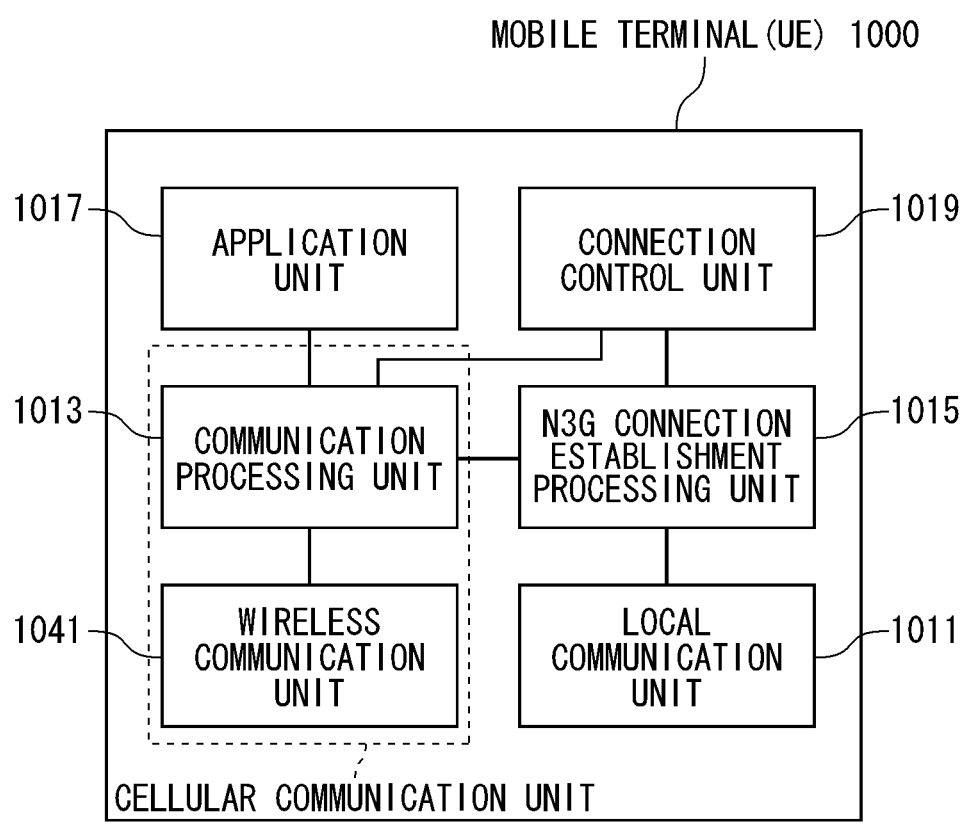
FIG. 41 is a block diagram illustrating a configuration of a mobile terminal (UE) 1000 according to the seventh embodiment.

A configuration of the mobile terminal (UE) 1000 according to the seventh embodiment will be described with reference to FIG. 41. FIG. 41 is a block diagram illustrating a configuration of the mobile terminal (UE) 1000 according to the seventh embodiment. The mobile terminal (UE) 1000 shown in FIG. 41 includes a wireless communication unit 1041 for physical/logical connection to a cellular base station including the local base station 20, a communication processing unit 1013 that performs protocol processing such as connection or handover to a base station or a core network device, an N3G connection establishment processing unit 1015 that performs protocol processing between communication nodes used from Non-3GPP access of the ePDG and the like, an application unit 1017 for getting applications to work, a connection control unit 1019, and a local communication unit 1011 that performs local communication such as a wireless LAN or a wired LAN. Meanwhile, the configuration of the mobile terminal (UE) 1000 shown in FIG. 41 is common to all the operations of the mobile terminal (UE) in the present embodiment.

Figure 42:
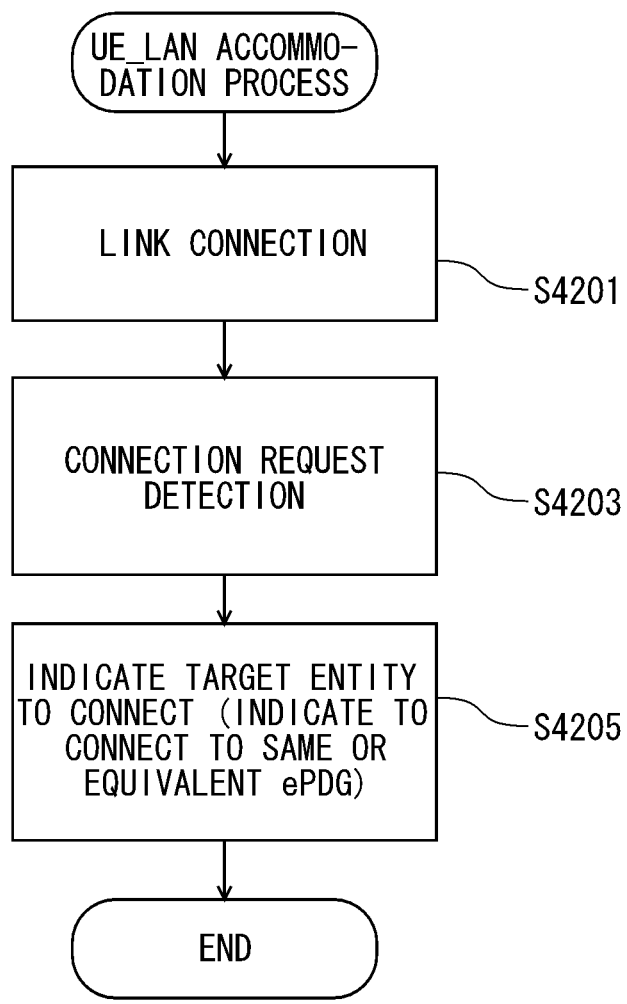
FIG. 42 is a flow diagram illustrating a "UE_LAN accommodation process" of the mobile terminal 1000.

Operations relating to the UE_LAN accommodation of the mobile terminal (UE) 1000 shown in FIG. 41 will be described with reference to FIG. 42. Meanwhile, operations relating to the initial connection of the UE 1000 will be described with reference to FIG. 4 in the first embodiment, and thus the description herein will be omitted. The UE_LAN accommodation operation shown in FIG. 42 is performed after the initial connection operation described in FIG. 4. FIG. 42 is a flow diagram illustrating a "UE_LAN accommodation process" of the mobile terminal (UE) 1000, and is a flow diagram, particularly, for performing a method of accommodating the UE_LAN connected through the local communication unit 1011.

The local communication unit 1011 receives a link connection request from the UE_LAN 2000, and performs a link connection establishment process (step S4201: link connection). The link connection establishment process depends on a local communication system, and is, for example, a procedure based on a wireless LAN, a wired LAN or the like. Subsequently, when the local communication unit 1011 receives the connection request from the UE_LAN 2000, the connection request is transferred to the connection control unit 1019. Here, a filtering rule may be set in the local communication unit 1011 (for example, a rule for picking up an initial message of IKE phase 1 is set), and a connection request message may be detected. Packets may be transferred to a transfer unit (not shown) for transferring packets between the local communication unit 1011 and the cellular communication unit to be connected (communication processing unit 1013, wireless communication unit 1041), and the connection request message may be detected by a filter rule or the like in the transfer unit (in this case, the connection request detected by the transfer unit is transferred (notified) to the connection control unit 1019). Meanwhile, the connection request from the UE_LAN 2000 is not necessarily received immediately after the link connection is completed.

When the detected connection request is acquired, the connection control unit 1019 confirms a destination node of the connection request. That is, when it is detected by address comparison or the like that the destination node of the connection request is ePDG different from the ePDG 60 to which the UE 1000 is connected (step S4203: connection request detection), an address of the ePDG 60 to which the UE 1000 is connected or an identifier (such as a host name) equivalent thereto is notified, and a connection destination direction (message) for promoting reconnection is generated (step S4205: indicate target entity to connect (indicate to connect to the same or equivalent ePDG)). The connection destination direction may be, for example, an IKE Redirect message (at that time, the address of the ePDG 60 is included in the message). The connection control unit 1019 sets the transmission destination of the connection destination direction to the UE_LAN 2000, and performs the transfer thereof to the local communication unit 1011. The local communication unit 1011 transfers the connection destination direction to the UE_LAN 2000 through local communication.

<Configuration 2 of Communication System: Handover (from Macro RAN to Local RAN)>

Figure 43:
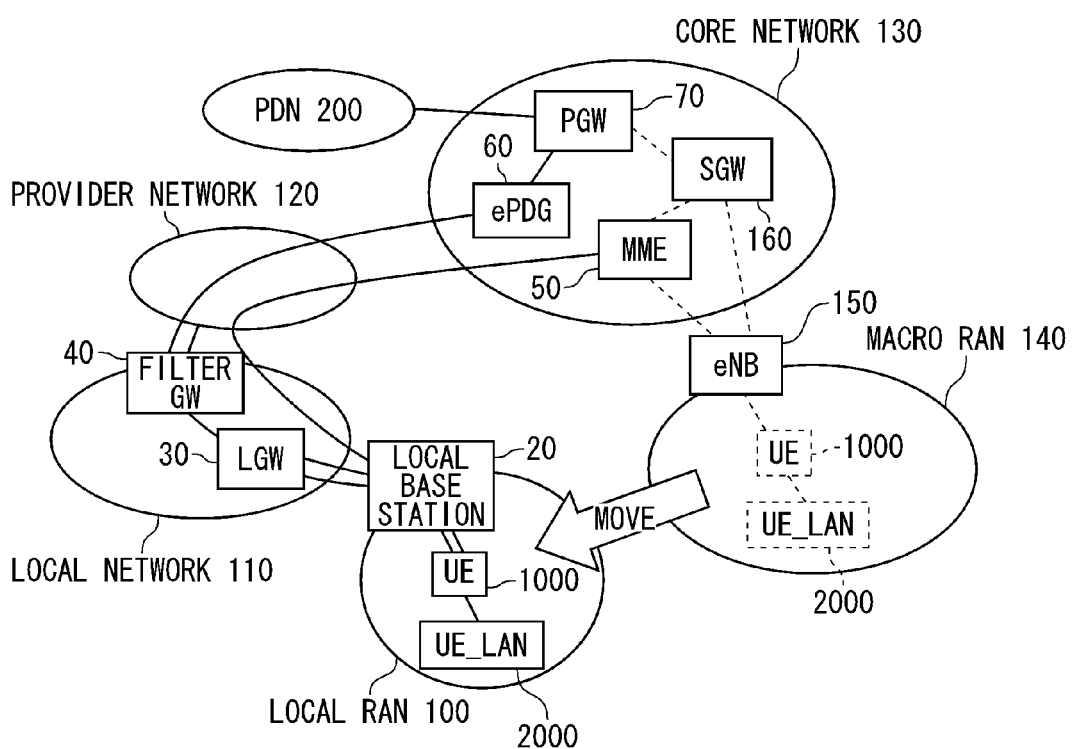
FIG. 43 is a diagram illustrating a configuration of the communication system relating to a handover from a macro RAN to a local RAN according to the seventh embodiment.

A configuration of the communication system illustrating a method of a handover from the macro RAN to the local RAN according to the seventh embodiment will be described with reference to FIG. 43. FIG. 43 is a diagram illustrating a configuration of the communication system relating to a handover from the macro RAN 140 to the local RAN 100 according to the seventh embodiment, and the basic components are the same as those shown in FIG. 7. The difference therebetween is that the UE_LAN 2000 to which the UE 1000 is connected through local communication means is disposed. The configurations other than this point are the same as those of the second embodiment. In FIG. 43, components common to those in FIG. 7 are denoted by the same reference numerals and signs.

<Communication System Operation 2: Handover (from Macro RAN to Local RAN)>

Figure 44:
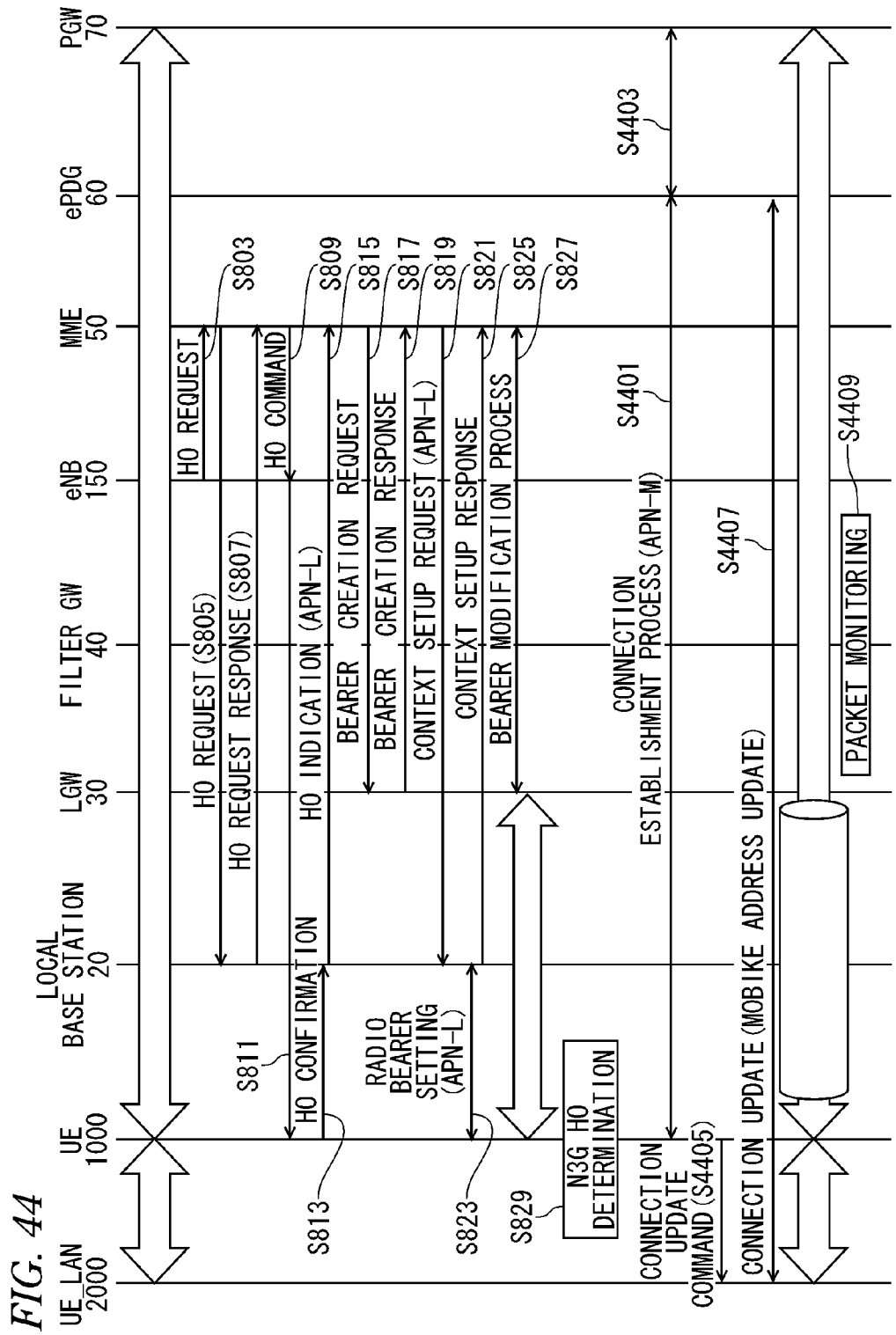
FIG. 44 is a diagram illustrating operations of the communication system shown in FIG. 43.

Operations of the communication system shown in FIG. 43 will be described with reference to FIG. 44. FIG. 44 is a diagram illustrating operations of the communication system shown in FIG. 43. The operations of a basic system of the communication system shown in FIG. 44 are the same as those of the communication system according to the second embodiment shown in FIG. 8. However, the difference between the operations of the communication system shown in FIG. 44 and the operations of the communication system according to the second embodiment shown in FIG. 8 is a connection establishment process (APN-M) step (step S4401) and the following ones performed by the UE 1000. Hereinafter, a process of different steps will be described.

As shown in FIG. 44, the UE_LAN 2000 establishes PDN connection to the PGW 70 through the UE 1000 in advance. Afterward, when the UE 1000 and the UE_LAN 2000 find the coverage of the local RAN 100 by movement or the like, the UE 1000 performs the handover process as described in FIG. 8. When the connection establishment process to the ePDG 60 is completed (steps S4401 and S4403: connection establishment process (APN-M)), the UE 1000 transmits a connection update command to the UE_LAN 2000 (step S4405: connection update command). The identifier (address, host name or the like) of the ePDG 60 to which the UE 1000 is connected is written in the connection update command.

When the connection update command is received, the UE_LAN 2000 starts a connection update process (step S4407: connection update (Mobike address update)). In the connection update process, the UE_LAN 2000 switches connection from the ePDG connected until then to the ePDG 60 specified in the UE 1000. Specifically, a handover between the ePDGs specified in TS23.402 is performed (handover attach is performed on a new ePDG 60, and the IPsec tunnel to an old ePDG is cut off after the connection is completed). When it can be confirmed that the ePDG to which the UE_LAN 2000 is connected is the same or equivalent to the ePDG 60 to which the UE 1000 is connected, the UE 1000 can stop the transmission of the connection update command.

In addition, the connection update process is also aimed at updating an address endpoint (the connection update process can apply an address change (Changing Address in IPsec SA) process in, for example, Mobike (IKEv2 Mobility and Multihoming Protocol: RFC 4555)).

An IP address provided to the UE 1000 may be updated by a handover of the UE 1000. The UE 1000 operates as NAT with respect to the UE_LAN 2000. Therefore, at the time of such an address change of the UE 1000, it is necessary that the UE_LAN 2000 update an endpoint address (that is, address on the UE_LAN 2000 side=address of the UE 1000 seen from the ePDG 60) of the IPsec tunnel established with the ePDG 60. In addition, since the UE_LAN 2000 is not aware of whether the address of the UE 1000 is updated, it is necessary that the UE 1000 transmit a command (connection update command) to the UE_LAN 2000. Thereby, it is possible to continue a session through the ePDG 60 of the UE_LAN 2000 even after the handover. When the connection update process is issued for the purpose of updating the endpoint address, the address provided to the UE 1000 is not updated. That is, when it is confirmed that address preservation is valid, the UE 1000 may not transmit the connection update command to the UE_LAN 2000. In addition, on a similar case, the UE 1000 may transmit the connection update command only when its own address is updated. Thereby, it is possible to avoid a useless connection update process, and to contribute to a reduction in battery consumption of the terminal and the effective utilization of network resources.

Meanwhile, in the above description, the UE_LAN 2000 starts the connection update process by receiving a command of the UE 1000. However, when the UE 1000 is connected to the ePDG 60 (that is, connection establishment process (APN-M): step S4401), the ePDG 60 may be notified of the identifier of the UE_LAN 2000 in which the connection to the ePDG is established through the UE 1000, and the connection update process starting from the ePDG 60 may be performed. In this case, regarding the UE_LAN 2000 in which the connection (IPsec tunnel) to the ePDG 60 is established in advance, the update of the address endpoint may be performed using a procedure such as MOBIKE, and regarding the UE_LAN 2000 in which the ePDG 60 is not accommodated (that is, connection to another ePDG is established), the ePDG 60 may command the ePDG holding connection to move the connection (however, at this time, it is necessary that the UE 1000 simultaneously notify the ePDG 60 of the identifier of the ePDG serving as a connection destination of the UE_LAN 2000; the connection destination ePDG identifier of the UE_LAN 2000 holds, as a history, the destination address when the IKE phase 1 message having performed in the past by the UE_LAN 2000 is detected, and can be extracted therefrom).

Thereby, packets (application messages) that the UE_LAN 2000 exchanges with the external network PDN 200 can be monitored in the filter GW 40 (step S4409: "packet monitoring"). When a security filter entry is added, real-time filter update can be made by performing an additional correction to a security filter of the filter GW 40 using a predetermined interface. In addition, since the security filter can be set with respect to the mobile terminal (UE) 1000 located down the local base station 20 and the mobile terminal (UE_LAN) 2000 located further down than that, settings for the individual mobile terminal (UE) 1000 and the UE_LAN 2000 are not required, and thus management costs can be reduced.

Meanwhile, when located within the macro RAN, the UE_LAN 2000 may be connected to the eNB 150 directly without passing through the UE 1000. In that case, the UE_LAN 2000 performs a 3G-N3G handover in the related art specified in TS23.402.

<Operation 2 of Mobile Terminal (UE) 1000: Handover (from Macro RAN to Local RAN)>

Figure 45:
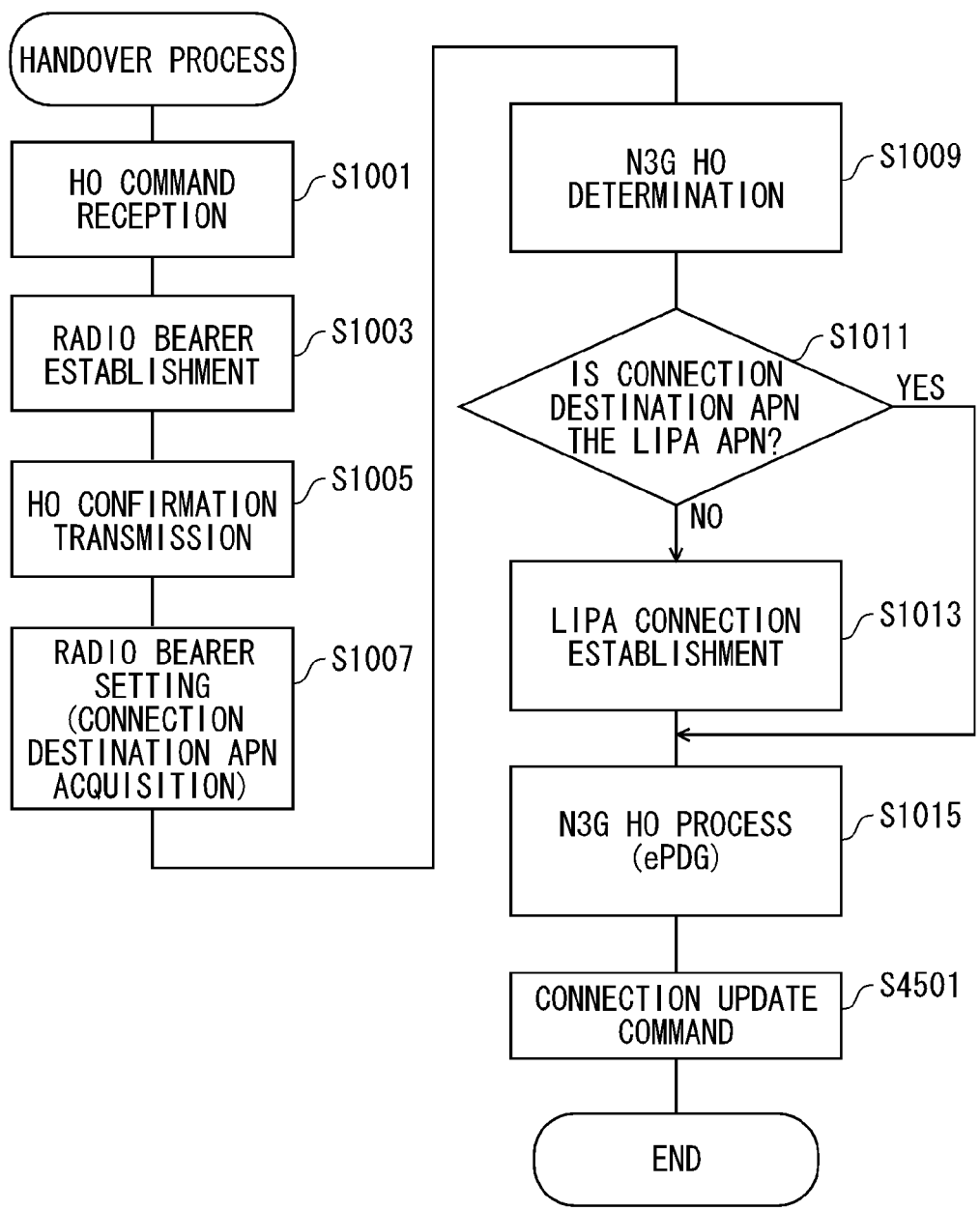
FIG. 45 is a diagram illustrating operations relating to a handover of the mobile terminal 1000 shown in FIG. 41 from the macro RAN to the local RAN.

Operations relating to the handover from the macro RAN to the local RAN of the mobile terminal (UE) 1000 shown in FIG. 41 will be described with reference to FIG. 45. Meanwhile, the operations are basically the same as those described with reference to FIG. 10 in the second embodiment. The difference therebetween is that the N3G HO process (ePDG) is performed and then the connection update command is transmitted. Hereinafter, the difference will be described.

When the N3G connection establishment processing unit 1015 completes an N3G handover process with respect to the ePDG 60, the connection control unit 1019 transmits a connection update command (message) to the UE_LAN 2000 (step S4501). The identifier (address, host name, or the like) of the ePDG 60 to which the UE 1000 is connected is included in the connection update command. The connection update command is transmitted to the UE_LAN 2000 through the local communication unit 1011.

<Configuration 3 of Communication System: Recovery from Idle (from Macro RAN to Local RAN)>

Figure 46:
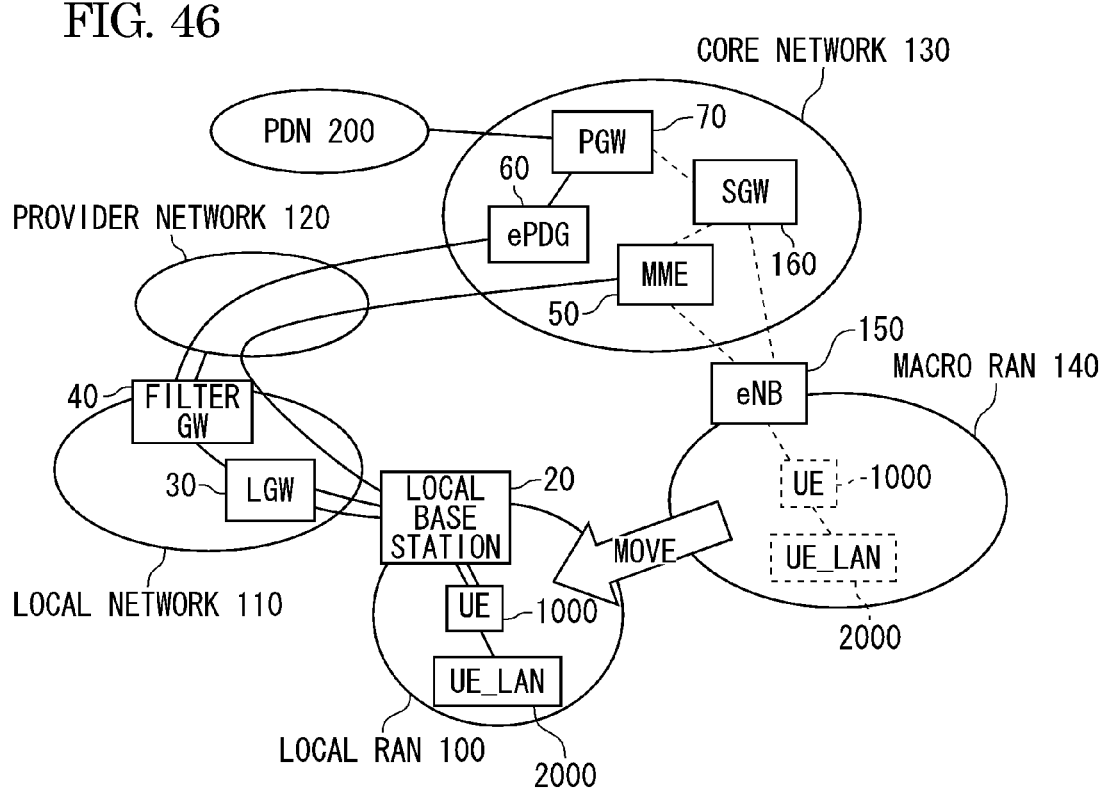
FIG. 46 is a diagram illustrating a configuration of the communication system relating to a case where the mobile terminal moves from the macro RAN and returns to an idle mode at the local RAN according to the seventh embodiment.

A configuration of the communication system illustrating a method of performing movement from the macro RAN 140 and a recovery from idle in the local RAN 100 according to the seventh embodiment will be described with reference to FIG. 46. FIG. 46 is a diagram illustrating a configuration of the communication system relating to a case of movement from the macro RAN 140 and a recovery from idle in the local RAN 100 according to the seventh embodiment, and the basic components are the same as those shown in FIG. 15. The difference therebetween is that the UE_LAN 2000 to which the UE 1000 is connected through local communication means is disposed. The configurations other than this point are the same as those of the third embodiment. In FIG. 46, components common to those in FIG. 15 are denoted by the same reference numerals and signs.

<Communication System Operation 3: Recovery from Idle (from Macro RAN to Local RAN)>

Figure 47:
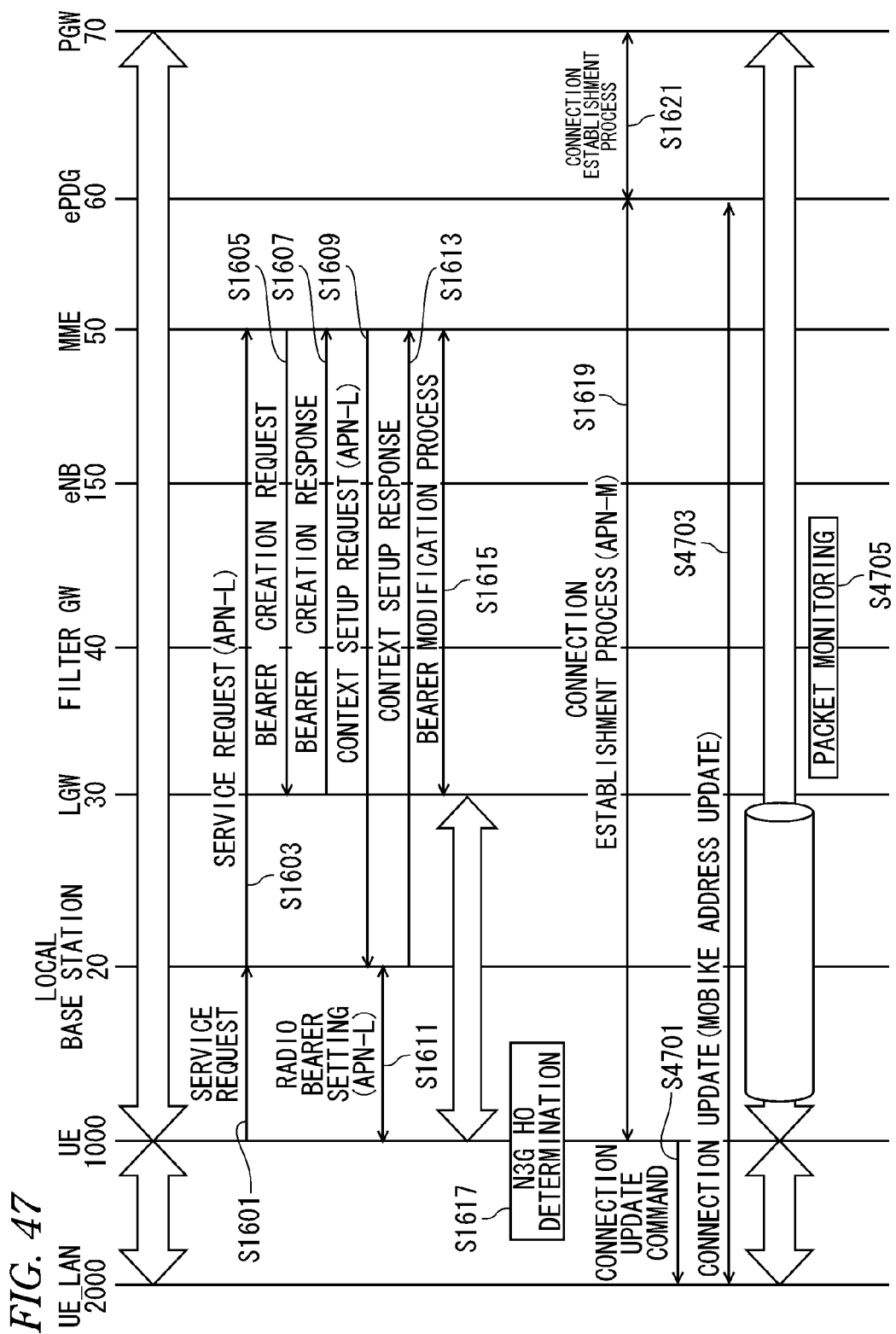
FIG. 47 is a diagram illustrating operations of the communication system shown in FIG. 46.

Operations of the communication system shown in FIG. 46 will be described with reference to FIG. 47. FIG. 47 is a diagram illustrating operations of the communication system shown in FIG. 46. The operations of a basic system of the communication system shown in FIG. 47 are the same as those of the communication system according to the second embodiment shown in FIG. 16, but the difference between the operations of the communication system shown in FIG. 47 and the operations of the communication system according to the third embodiment shown in FIG. 16 is a connection establishment process (APN-M) step and the following ones performed by the UE 1000. Hereinafter, a process of different steps will be described.

As shown in FIG. 47, the UE_LAN 2000 is in a state where the UE 1000 transitions to an idle mode in a state where the PDN connection to the PGW 70 is established through the UE 1000 in advance. Afterward, the UE 1000 and the UE_LAN 2000 enter the coverage of the local RAN 100 by movement or the like, and the UE 1000 starts a recovery from idle (for example, paging reception from the core network, the transfer start of packets received from the UE_LAN 2000, or the like causes a recovery from idle process to be started).

The recovery from idle process of the UE 1000 is performed based on the procedure as described in FIG. 16. When the connection establishment process to the ePDG is completed, the UE 1000 transmits a connection update command to the UE_LAN 2000 (step S4701: connection update command). The identifier (address, host name, or the like) of the ePDG 60 to which the UE 1000 is connected is written in the connection update command.

When the connection update command is received, the UE_LAN 2000 starts a connection update process (step S4703: connection update (Mobike address update)). In the connection update process, the UE_LAN 2000 switches connection from the ePDG connected until then to the ePDG 60 specified in the UE 1000. Specifically, a handover between the ePDGs specified in TS23.402 is performed (handover attach is performed on a new ePDG 60, and the IPsec tunnel to an old ePDG is cut off after the connection is completed). When it can be confirmed that the ePDG to which the UE_LAN 2000 is connected is the same or equivalent to the ePDG 60 to which the UE 1000 is connected, the UE 1000 can stop the transmission of the connection update command.

In addition, the connection update process is also aimed at updating an address endpoint (the connection update process can apply an address change (Changing Address in IPsec SA) process in, for example, Mobike (IKEv2 Mobility and Multihoming Protocol: RFC 4555)). The IP address provided to the UE 1000 may be updated by the recovery from idle of the UE 1000.

The UE 1000 operates as NAT with respect to the UE_LAN 2000. Therefore, at the time of such an address change of the UE 1000, it is necessary that the UE_LAN 2000 update an endpoint address (that is, address on the UE_LAN 2000 side=address of the UE 1000 seen from the ePDG 60) of the IPsec tunnel established with the ePDG 60.

In addition, since the UE_LAN 2000 is not aware of whether the address of the UE 1000 is updated, it is necessary that the UE 1000 transmit a command (connection update command) to the UE_LAN 2000. Thereby, it is possible to continue a session through the ePDG 60 of the UE_LAN 2000 even after the recovery from idle.

When the connection update process is issued for the purpose of updating the address endpoint, the address provided to the UE 1000 is not updated. That is, when it is confirmed that address preservation is valid, the UE 1000 may not transmit the connection update command to the UE_LAN 2000. In addition, on a similar case, the UE 1000 may transmit the connection update command only when its own address is updated. Thereby, it is possible to avoid a useless connection update process, and to contribute to a reduction in battery consumption of the terminal and the effective utilization of network resources.

Meanwhile, in the above description, the UE_LAN 2000 starts the connection update process by receiving a command of the UE 1000. However, when the UE 1000 is connected to the ePDG 60 (that is, connection establishment process (APN-M)), the ePDG 60 may be notified of the identifier of the UE_LAN 2000 in which the connection to the ePDG is established through the UE 1000, and the connection update process starting from the ePDG 60 may be performed.

In this case, regarding the UE_LAN 2000 in which the connection (IPsec tunnel) to the ePDG 60 is established in advance, the update of the address endpoint may be performed using a procedure such as MOBIKE, and regarding the UE_LAN 2000 in which the ePDG 60 is not accommodated (that is, connection to another ePDG is established), the ePDG 60 may command the ePDG holding connection to move the connection (however, at this time, it is necessary that the UE 1000 simultaneously notify the ePDG 60 of the identifier of the ePDG serving as a connection destination of the UE_LAN 2000; the connection destination ePDG identifier of the UE_LAN 2000 holds, as a history, the destination address when the IKE phase 1 message having performed in the past by the UE_LAN 2000 is detected, and can be extracted therefrom).

Thereby, packets (application messages) that the UE_LAN 2000 exchanges with the external network PDN 200 can be monitored in the filter GW 40 (step S4705: packet monitoring). When a security filter entry is added, real-time filter update can be made by performing an additional correction to a security filter of the filter GW 40 using a predetermined interface. In addition, since the security filter can be set with respect to the mobile terminal (UE) 1000 located down the local base station 20 and the mobile terminal (UE_LAN) 2000 located further down than that, settings for the individual mobile terminal (UE) 1000 and the UE_LAN 2000 are not required, and thus management costs can be reduced.

Meanwhile, when located within the macro RAN, the UE_LAN 2000 may be connected to the eNB 150 directly without passing through the UE 1000. In that case, the UE_LAN 2000 performs a 3G-N3G handover in the related art specified in TS23.402.

<Operation 3 of Mobile Terminal: Recovery from Idle (from Macro RAN to Local RAN)>

Figure 48:
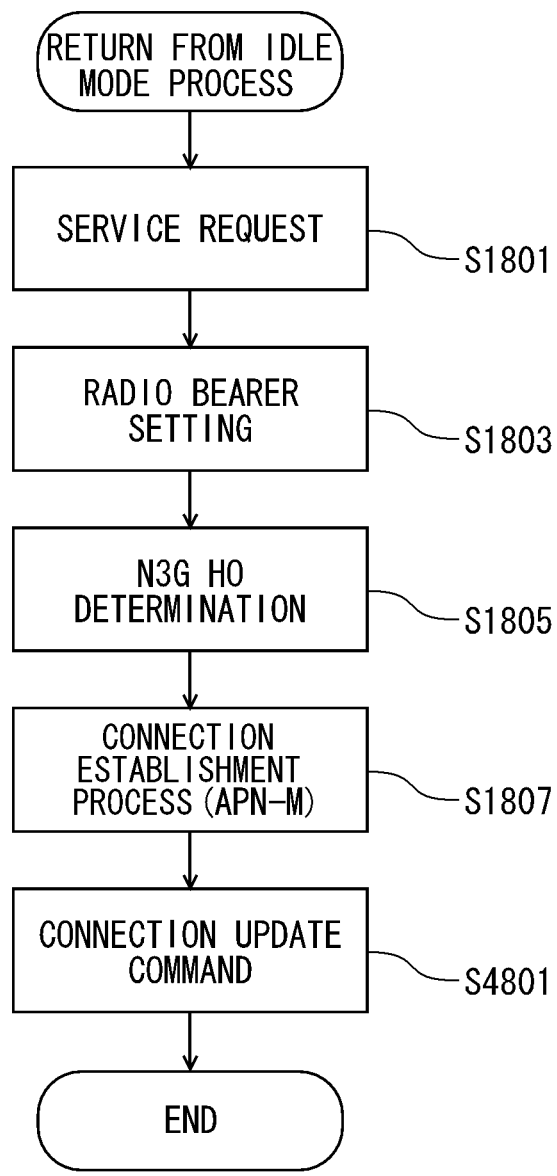
FIG. 48 is a diagram illustrating operations in a case where the mobile terminal 1000 shown in FIG. 41 moves from the macro RAN and returns to an idle mode at the local RAN.

Operations in a case where the mobile terminal (UE) 1000 shown in FIG. 41 moves from the macro RAN and performs a recovery from idle in the local RAN will be described with reference to FIG. 48. Meanwhile, the operations are basically the same as those as described with reference to FIG. 18 in the third embodiment. The difference therebetween is that the connection establishment process (APN-M) is completed after the determination of performing N3G HO, and then the connection update command is transmitted. Hereinafter, the difference will be described.

When the N3G connection establishment processing unit 1015 completes the connection establishment process (APN-M) with respect to the ePDG 60, the connection control unit 1019 transmits a connection update command (message) to the UE_LAN 2000 (step S4801: connection update command). The identifier (address, host name, or the like) of the ePDG 60 to which the UE 1000 is connected is included in the connection update command. The connection update command is transmitted to the UE_LAN 2000 through the local communication unit 1011.

<Configuration 4 of Communication System: Handover (from Local RAN to Macro RAN)>

Figure 49:
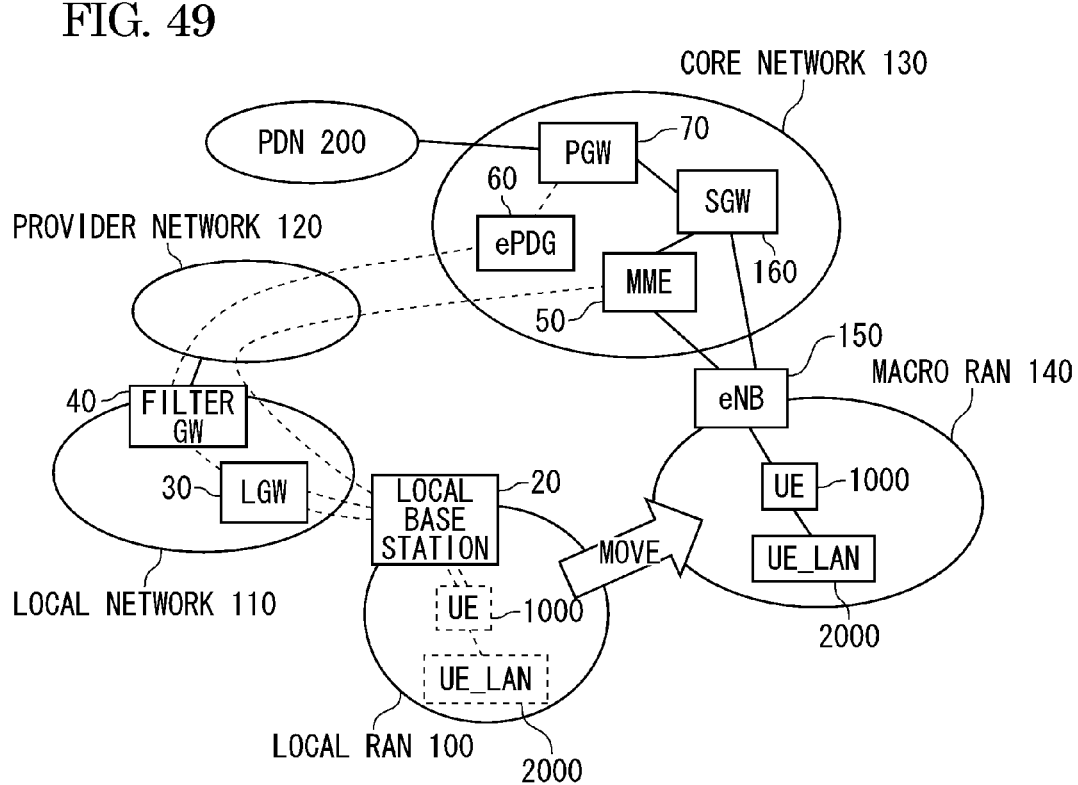
FIG. 49 is a diagram illustrating a configuration of the communication system relating to a handover from the local RAN to the macro RAN according to the seventh embodiment.

A configuration of the communication system illustrating a method of a handover from the local RAN 100 to the macro RAN 140 according to the seventh embodiment will be described with reference to FIG. 49. FIG. 49 is a diagram illustrating a configuration of the communication system relating to a handover from the local RAN 100 to the macro RAN 140 according to the seventh embodiment. The basic components are the same as those shown in FIG. 23. The difference therebetween is that the UE_LAN 2000 to which the UE 1000 is connected through local communication means is disposed. The configurations other than this point are the same as those of the fourth embodiment. In FIG. 49, components common to those in FIG. 23 are denoted by the same reference numerals and signs.

<Communication System Operation 4: Handover (from Local RAN to Macro RAN)>

Figure 50:
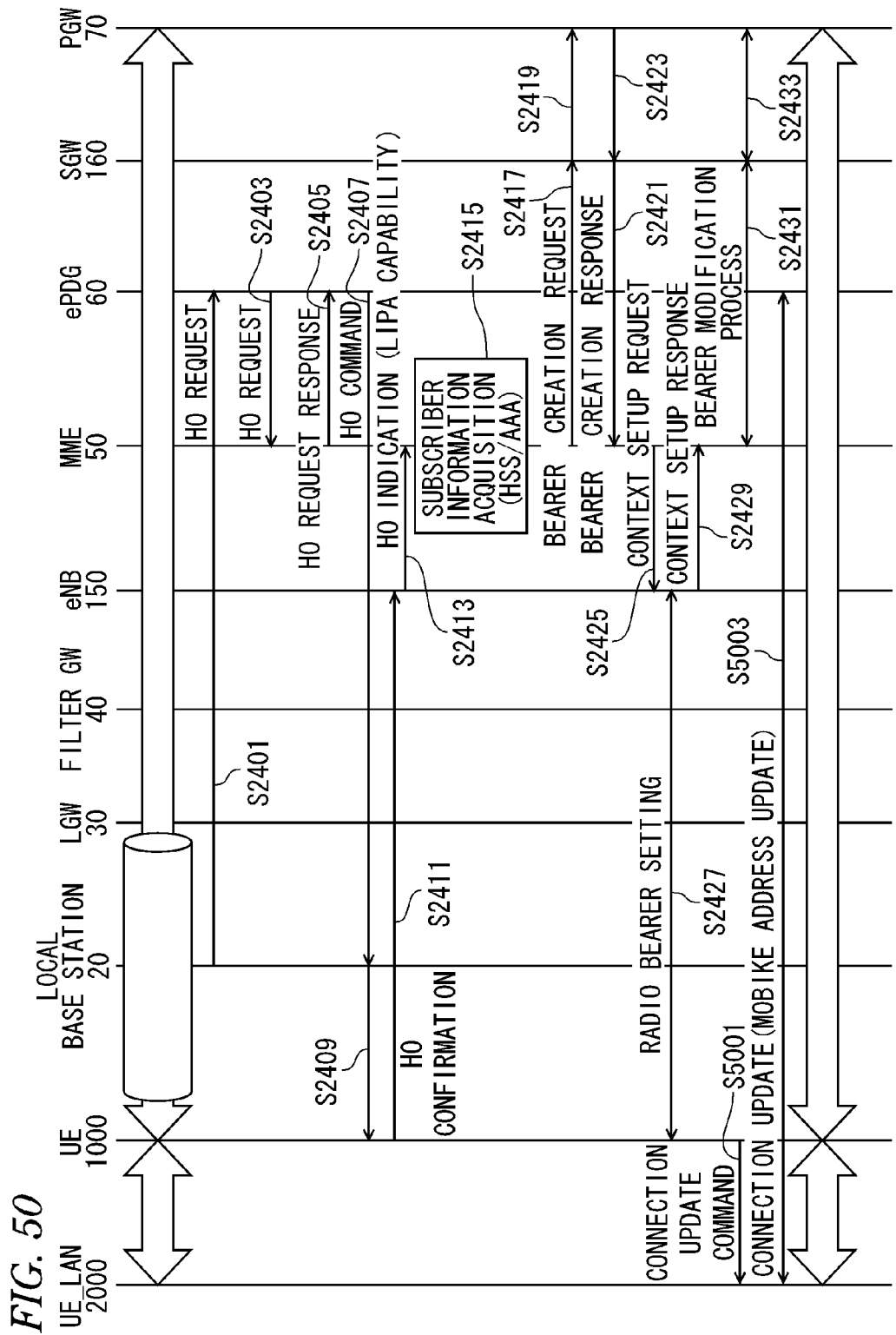
FIG. 50 is a diagram illustrating operations of the communication system shown in FIG. 49.

Operations of the communication system shown in FIG. 49 will be described with reference to FIG. 50. FIG. 50 is a diagram illustrating operations of the communication system shown in FIG. 49. The operations of a basic system of the communication system shown in FIG. 50 are the same as those of the communication system according to the fourth embodiment shown in FIG. 24, but the difference between the operations of the communication system shown in FIG. 50 and the operations of the communication system according to the fourth embodiment shown in FIG. 24 is a radio bearer setting process step and the following ones performed between the UE 1000 and the eNB 150. Hereinafter, a process of different steps will be described.

As shown in FIG. 50, the UE_LAN 2000 establishes PDN connection to the PGW 70 through the UE 1000 in advance. Afterward, when the UE 1000 and the UE_LAN 2000 find the coverage of the macro RAN 100 by movement or the like, the UE 1000 performs the handover process as described in FIG. 24. When the radio bearer setting process to the eNB 150 is completed, the UE 1000 transmits a connection update command to the UE_LAN 2000 (step S5001: connection update command).

The connection update process herein (step S5003: connection update (Mobike address update)) is aimed at updating an address endpoint (the connection update process can apply an address change (Changing Address in IPsec SA) process in, for example, MOBIKE (IKEv2 Mobility and Multihoming Protocol: RFC 4555)). The IP address provided to the UE 1000 may be updated by the handover of the UE 1000.

The UE 1000 operates as NAT with respect to the UE_LAN 2000. Therefore, at the time of such an address change of the UE 1000, it is necessary that the UE_LAN 2000 update an endpoint address (that is, address on the UE_LAN 2000 side=address of the UE 1000 seen from the ePDG 60) of the IPsec tunnel established with the ePDG 60.

In addition, since the UE_LAN 2000 is not aware of whether the address of the UE 1000 is updated, it is necessary that the UE 1000 transmit a command (connection update command) to the UE_LAN 2000. Thereby, it is possible to continue a session through the ePDG 60 of the UE_LAN 2000 even after the handover. When the connection update process is issued for the purpose of updating the address endpoint, the address provided to the UE 1000 is not updated. That is, when it is confirmed that address preservation is valid, the UE 1000 may not transmit the connection update command to the UE_LAN 2000.

In addition, on a similar case, the UE 1000 may transmit the connection update command only when its own address is updated. Thereby, it is possible to avoid a useless connection update process, and to contribute to a reduction in battery consumption of the terminal and the effective utilization of network resources.

Meanwhile, at the time of the handover to the macro RAN, the UE_LAN 2000 may be connected to the eNB 150 directly without passing through the UE 1000. In that case, the UE_LAN 2000 performs a N3G-3G handover in the related art specified in TS23.402.

<Operation 4 of Mobile Terminal: Handover (from Local RAN to Macro RAN)>

Figure 51:
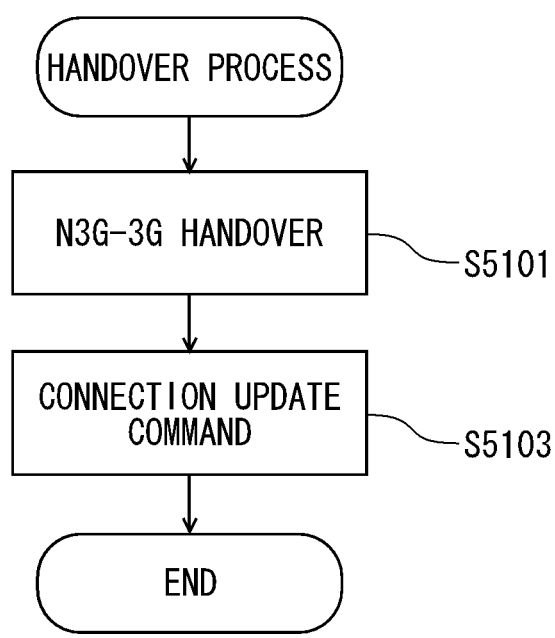
FIG. 51 is a diagram illustrating operations relating to a handover of the mobile terminal 1000 shown in FIG. 41 from the local RAN to the macro RAN.

Operations relating to the handover from the local RAN to the macro RAN of the mobile terminal (UE) 1000 shown in FIG. 41 will be described with reference to FIG. 51.

The communication processing unit 1013 performs an N3G-3G handover process specified in TS23.402 (step S5101: N3G-3G handover). When radio bearer setting is completed between the eNB 150 and the communication processing unit, the handover process is completed. When this is received and the existence of the UE_LAN 2000 accommodated thereunder is detected, the connection control unit 1019 transmits a connection update command (message) to the UE_LAN 2000 (step S5103: connection update command). The connection update command is transmitted to the UE_LAN 2000 through the local communication unit 1011.

<Configuration 5 of Communication System: Recovery from Idle (from Local RAN to Macro RAN)>

Figure 52:
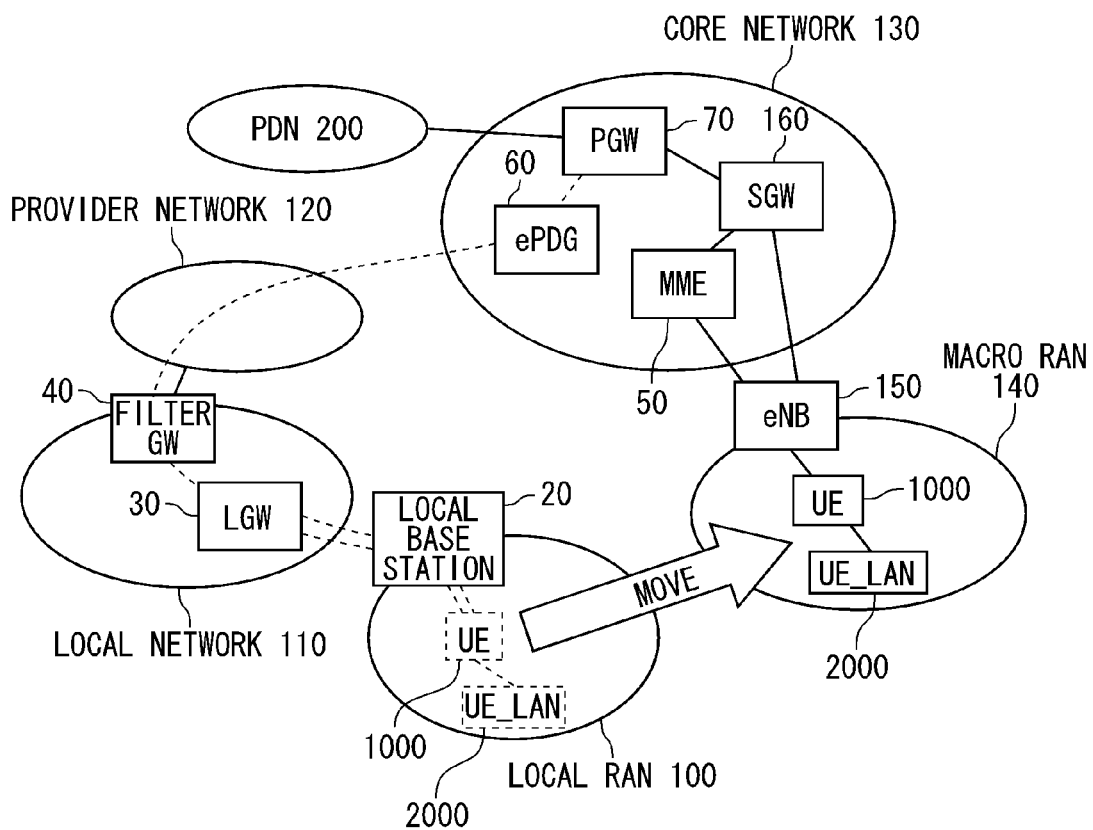
FIG. 52 is a diagram illustrating a configuration of the communication system relating to a case where the mobile terminal moves from the local RAN and returns to an idle mode at the macro RAN according to the seventh embodiment.

A configuration of the communication system illustrating a method of performing movement from the local RAN 100 and a recovery from idle in the macro RAN 140 according to the seventh embodiment will be described with reference to FIG. 52. FIG. 52 is a diagram illustrating a configuration of the communication system relating to a case of movement from the local RAN 100 and a recovery from idle in the macro RAN 140 according to the seventh embodiment, and the basic components are the same as those shown in FIG. 29. The difference therebetween is that the UE_LAN 2000 to which the UE 1000 is connected through the local communication unit 1011 is disposed. The configurations other than this point are the same as those of the fifth embodiment. In FIG. 52, components common to those in FIG. 29 are denoted by the same reference numerals and signs.

<Communication System Operation 5: Recovery from Idle (from Local RAN to Macro RAN)>

Figure 53:
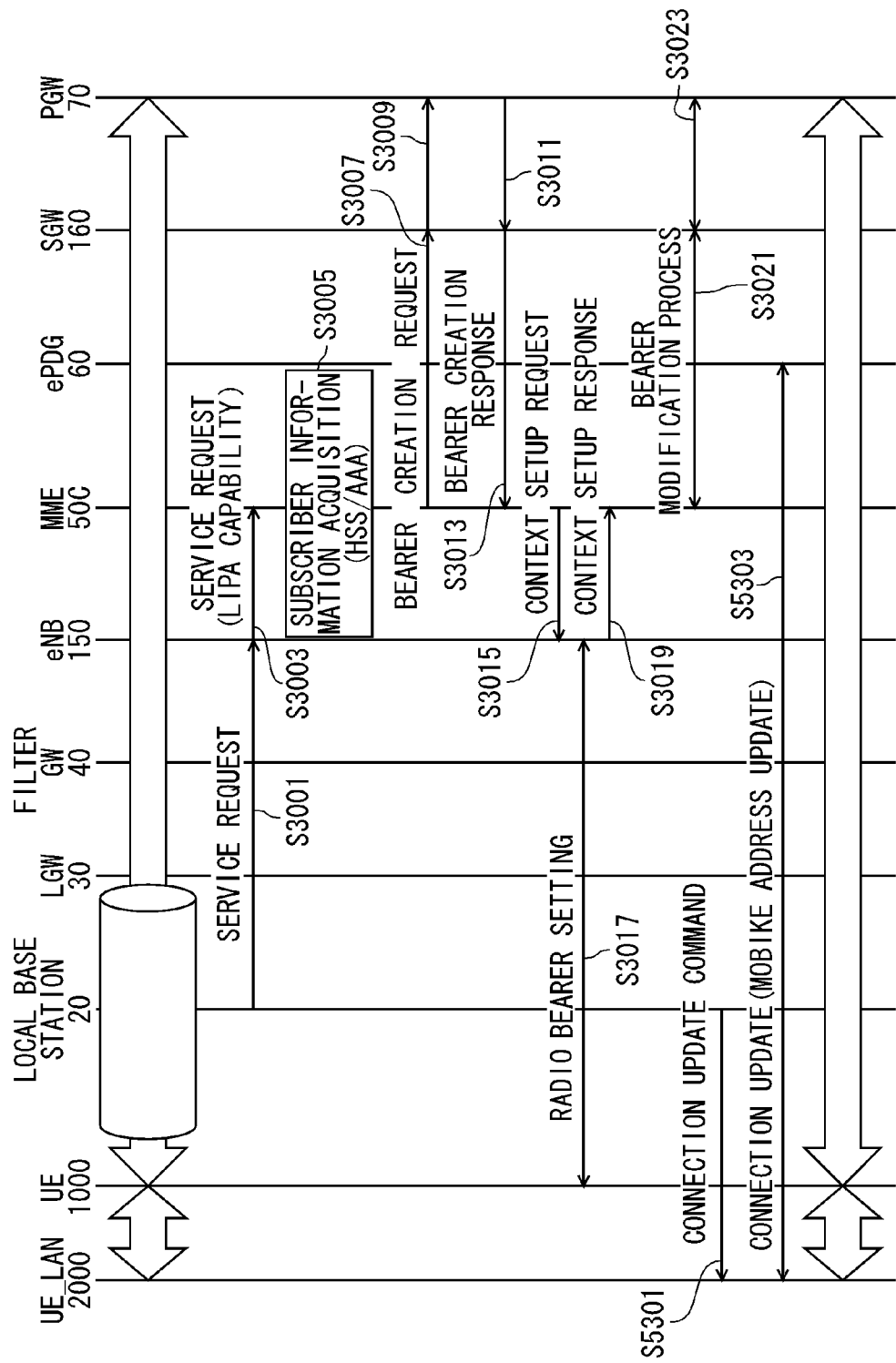
FIG. 53 is a diagram illustrating operations the communication system shown in FIG. 52.

Operations of the communication system shown in FIG. 52 will be described with reference to FIG. 53. FIG. 53 is a diagram illustrating operations of the communication system shown in FIG. 52. The operations of a basic system of the communication system shown in FIG. 53 are the same as those of the communication system according to the fifth embodiment shown in FIG. 30, but the difference between the operations of the communication system shown in FIG. 53 and the operations of the communication system according to the fifth embodiment shown in FIG. 30 is a radio bearer setting process step and the following ones performed between the UE 1000 and the eNB 150. Hereinafter, a process of different steps will be described.

As shown in FIG. 53, the UE_LAN 2000 is in a state where the UE 1000 transitions to an idle mode in a state where the PDN connection to the PGW 70 is established through the UE 1000 in advance. Afterward, the UE 1000 and the UE_LAN 2000 enter the coverage of the local RAN 140 by movement or the like, and the UE 1000 starts a recovery from idle (for example, paging reception from the core network, the transfer start of packets received from the UE_LAN 2000, or the like causes a recovery from idle process to be started).

The recovery from idle process of the UE 1000 is performed based on the procedure described in FIG. 30. When the radio bearer setting process to the eNB 150 is completed, the UE 1000 transmits a connection update command to the UE_LAN 2000 (step S5301: connection update command).

The connection update process herein (step S5303: connection update (Mobike address update)) is aimed at updating an address endpoint (the connection update process can apply an address change (Changing Address in IPsec SA) process in, for example, Mobike (IKEv2 Mobility and Multihoming Protocol: RFC 4555)). The IP address provided to the UE 1000 may be updated by the recovery from idle of the UE 1000.

The UE 1000 operates as NAT with respect to the UE_LAN 2000. Therefore, at the time of such an address change of the UE 1000, it is necessary that the UE_LAN 2000 update an endpoint address (that is, address on the UE_LAN 2000 side=address of the UE 1000 seen from the ePDG 60) of the IPsec tunnel established with the ePDG 60. In addition, since the UE_LAN 2000 is not aware of whether the address of the UE 1000 is updated, it is necessary that the UE 1000 transmit a command (connection update command) to the UE_LAN 2000. Thereby, it is possible to continue a session through the ePDG 60 of the UE_LAN 2000 even after the recovery from idle.

When the connection update process is issued for the purpose of updating the address endpoint, the address provided to the UE 1000 is not updated. That is, when it is confirmed that address preservation is valid, the UE 1000 may not transmit the connection update command to the UE_LAN 2000. In addition, on a similar case, the UE 1000 may transmit the connection update command only when its own address is updated. Thereby, it is possible to avoid a useless connection update process, and to contribute to a reduction in battery consumption of the terminal and the effective utilization of network resources.

Meanwhile, at the time of the recovery from idle in the macro RAN, the UE_LAN 2000 may be connected to the eNB 150 directly without passing through the UE 1000 (for example, the UE_LAN may be separated from the coverage of the UE 1000, or the local communication of the UE 1000 or the UE 1000 itself may be stopped). In that case, the UE_LAN 2000 performs an N3G-3G handover in the related art specified in TS23.402.

<Operation 5 of Mobile Terminal: Recovery from Idle (from Local RAN to Macro RAN)>

Operations in a case where the mobile terminal (UE) 1000 shown in FIG. 41 moves from the local RAN 100 and performs a recovery from idle in the macro RAN 140 are the same as those described with reference to FIG. 51, and thus the description thereof will be omitted. The only difference therebetween is that the occurrence of the N3G-3G handover is caused by a service request process of the UE 1000. Meanwhile, in the handover process from the local RAN to the macro RAN, the startup of a network (MME or eNB) is caused by the handover process.

<Configuration 6 of Communication System: S2a Connection Case>

Figure 54:
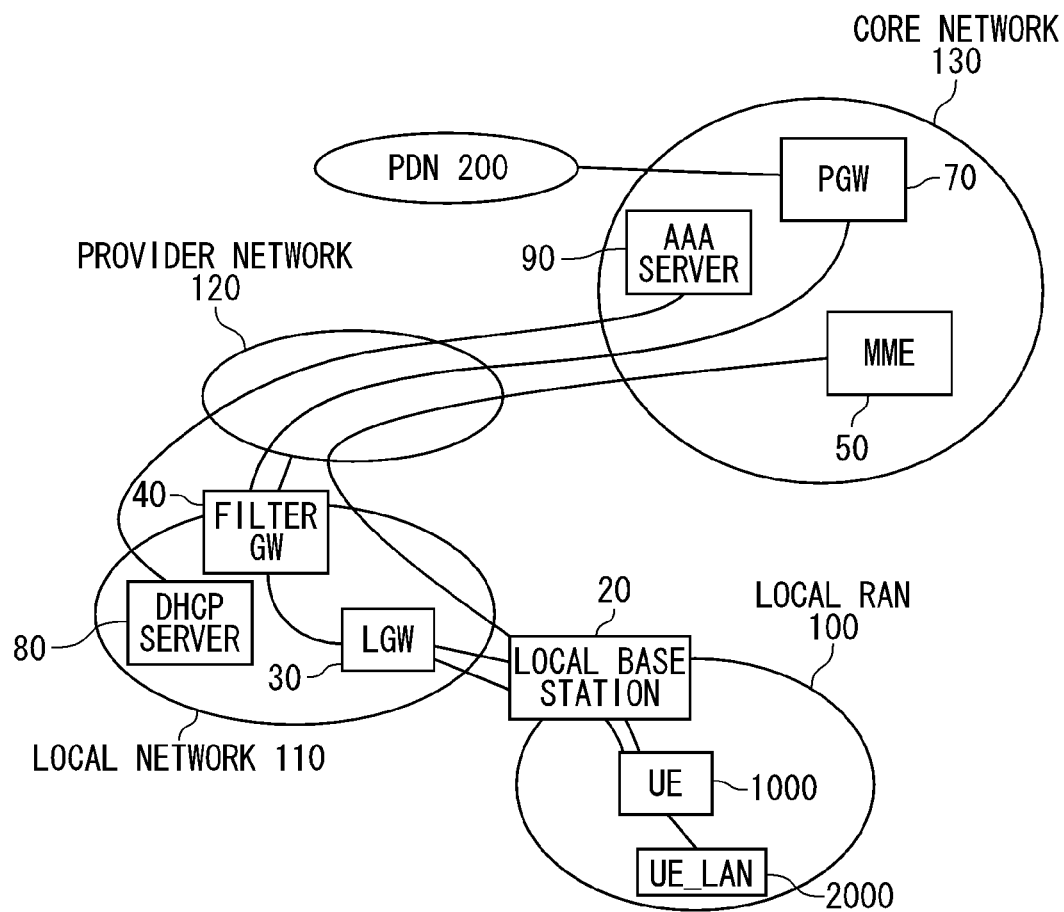
FIG. 54 is a diagram illustrating a configuration of a different communication system according to the seventh embodiment

A configuration of a different communication system according to the seventh embodiment will be described with reference to FIG. 54. FIG. 54 is a diagram illustrating a configuration of a different communication system according to the seventh embodiment, and the basic components are the same as those shown in FIG. 35. The difference therebetween is that the UE_LAN 2000 to which the UE 1000 is connected through local communication means is disposed. The configurations other than this point are the same as those of the fifth embodiment. In FIG. 54, components common to those in FIG. 35 are denoted by the same reference numerals and signs.

<Communication System Operation 6: S2a Connection Case>

Figure 55:
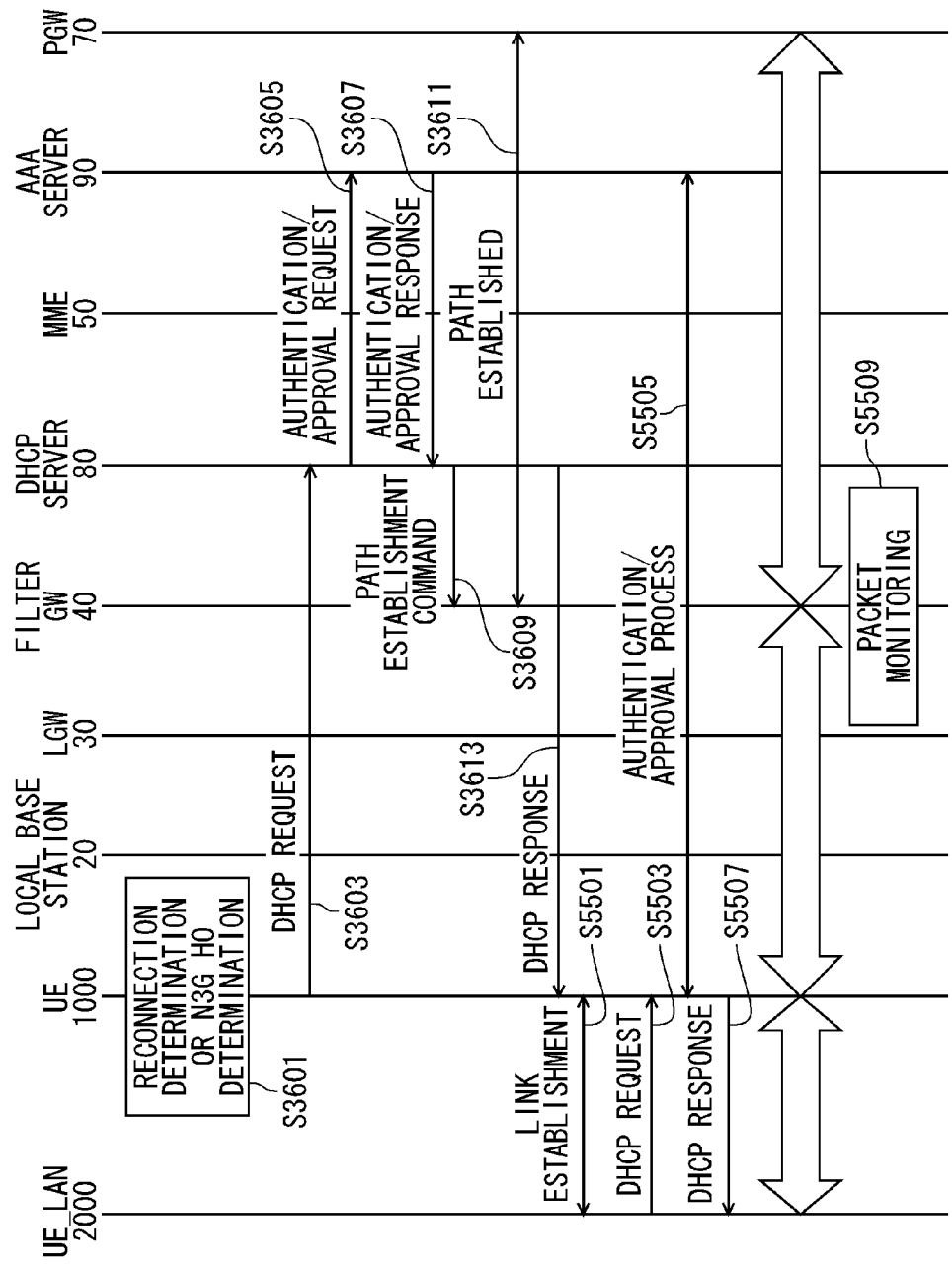
FIG. 55 is a diagram illustrating operations of the different communication system shown in FIG. 54.

Operations of the different communication system shown in FIG. 54 will be described with reference to FIG. 55. FIG. 55 is a diagram illustrating operations of the different communication system shown in FIG. 54. The operations of a basic system of the communication system shown in FIG. 55 are the same as those of the communication system according to the sixth embodiment shown in FIG. 36, but the difference between the operations of the communication system shown in FIG. 55 and the operations of the communication system according to the sixth embodiment shown in FIG. 36 is a DHCP response step and the following ones performed by the UE 1000. Hereinafter, a process of different steps will be described.

As shown in FIG. 55, after the mobile terminal (UE) 1000 acquires an address from a DHCP server, a link to the UE_LAN 2000 is established (link connection) (step S5501: link establishment).

In order for the UE_LAN 2000 to perform N3G connection according to the S2a interface specified in TS23.402, a DHCP request (message) is transmitted (step S5503: DHCP request). The DHCP request message is a message such as, for example, DHCP discovery or DHCP request.

When the DHCP request from the UE_LAN 2000 is acquired, the UE 1000 performs an authentication and approval process of the UE_LAN 2000 with respect to the AAA server 90 (step S5505: authentication/approval process). When the connection of the UE_LAN 2000 is correctly authenticated and approved, the UE 1000 performs address allocation on the UE_LAN 2000 and transmits (gives notice of) the address allocation, including a DHCP response message, to the UE_LAN 2000 (step S5507: DHCP response). The AAA server 90 can also notify the UE 1000 of the address allocated to the UE_LAN 2000. In that case, the UE 1000 transfers the address notified from the AAA server 90 to the UE_LAN 2000. The UE_LAN 2000 sets the notified address. Thereby, packets (application messages) that the UE_LAN 2000 exchanges with the external network PDN 200 can be monitored in the filter GW 40 (step S5509: packet monitoring). When a security filter entry is added, real-time filter update can be made by performing an additional correction to a security filter of the filter GW 40 using a predetermined interface. In addition, since the security filter can be set with respect to the mobile terminal (UE) 1000 located down the local base station 20 and the mobile terminal (UE_LAN) 2000 located further down than that, settings for the individual mobile terminal (UE) 1000 and the UE_LAN 2000 are not required, and thus management costs can be reduced.

Meanwhile, for the purpose of simplifying description, the PDN and the PGW 70 to which the UE 1000 and the UE_LAN 2000 are connected are set to have the same configuration. However, even when the UE 1000 and the UE_LAN 2000 are connected to a different PDN or PGW, the method according to the present invention can be effected similarly.

In the above description, the connection request of the UE_LAN 2000 is set to be performed after the UE 1000 receives a DHCP response (that is, address acquisition is completed). Here, while the UE 1000 performs an address acquisition process, or when the DHCP request from the UE_LAN 2000 is received before that, the UE 1000 pends or refuses the received DHCP request until the address acquisition process is completed. Meanwhile, the UE 1000 and the UE_LAN 2000 may perform the link connection at a timing before or after the UE 1000 completes its own connection establishment process, or in the midst of the connection establishment process. The implementation of the method according to the present invention is not damaged thereby.

In addition, during a link establishment procedure between the UE 1000 and the UE_LAN 2000, the UE 1000 may urge the UE_LAN 2000 to perform S2a connection (that is, transmission of the DHCP request).

Meanwhile, when the UE_LAN 2000 set a static address, the UE_LAN 2000 does not transmit the DHCP request. At that time, when data packets transmitted by the UE_LAN 2000 are transferred for the first time, the UE 1000 may perform an authentication/approval process.

When it can be detected that the UE_LAN 2000 establishes an IPsec tunnel previously (e.g., based on history information that IKE packets for ePDG connection have been transferred in the past), a DHCP re-execution command (for example, DHCP NAK message) is transmitted as an IPsec tunnel erasure command. The UE_LAN receiving the DHCP re-execution command transmits a DHCP request, and the UE 1000 performs the authentication/approval process on the UE_LAN by receiving the request. When authentication and approval are normally completed, the UE 1000 transmits the DHCP response including an allocated address to the UE_LAN 2000. The UE_LAN 2000 receiving the DHCP response performs a process of erasing the established IPsec tunnel with respect to the ePDG (for example, performs an IKEv2 security association termination procedure).

<Operation 6 of Mobile Terminal: S2a Connection Case>

Figure 56:
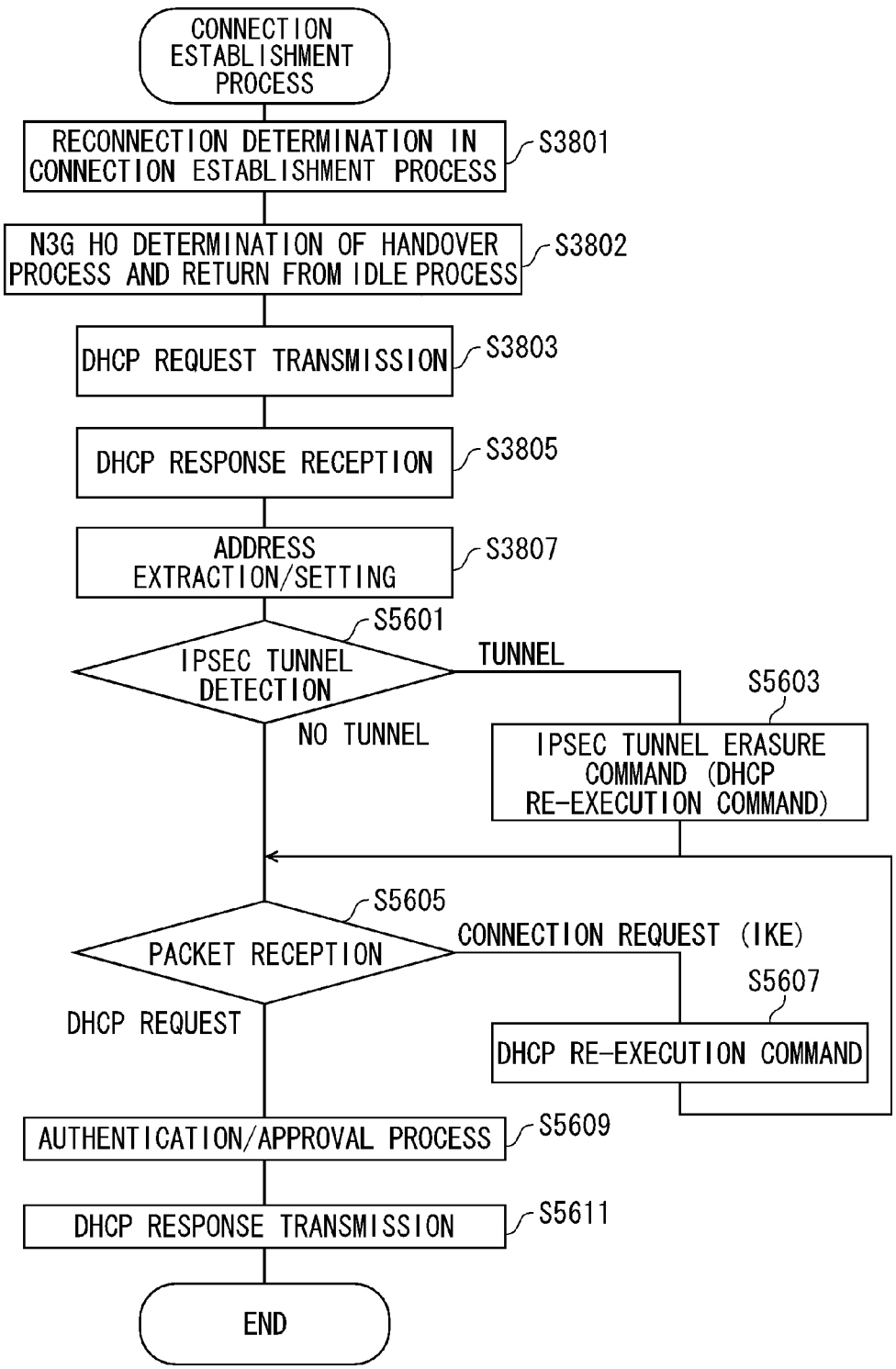
FIG. 56 is a diagram illustrating different operations of the mobile terminal (UE) 1000 shown in FIG. 41.

Different operations of the mobile terminal (UE) 1000 shown in FIG. 41 will be described with reference to FIG. 56. Meanwhile, the operations are basically the same as those described with reference to FIG. 38 in the sixth embodiment, and the difference therebetween is a process of an address extraction/setting step and the following ones. Hereinafter, the difference will be described.

The connection control unit 1019 detects the presence or absence of the connected (established) IPsec tunnel with respect to the UE_LAN 2000 to be accommodated (step S5601: IPsec tunnel detection).

A DHCP re-execution command (for example, DHCP NACK message) is transmitted as an IPsec tunnel erasure command to the UE_LAN 2000 having the established IPsec tunnel (step S5603: IPsec tunnel erasure command (DHCP re-execution command)).

The DHCP re-execution command is transmitted to the UE_LAN 2000 through the local communication unit 1011. The UE_LAN 2000 receiving this recognizes that the connection via the UE 1000 in the present network is not Untrusted connection via the S2b interface, but Trusted connection via the S2a interface. In step S5605, packets are received from the UE_LAN 2000 via the local communication unit 1011. Thereafter, when the packets received from the UE_LAN 2000 via the local communication unit 1011 are an IKE message, the connection control unit 1019 transmits the DHCP re-execution command again to the UE_LAN 2000 via the local communication unit 1011 (step S5607: DHCP re-execution command). When the received packets are a DHCP request, the connection control unit 1019 generates a request message for performing the authentication and approval process of the UE_LAN 2000 with respect to the AAA server 90, and transmits the request message via the communication processing unit 1013 and the local communication unit 1011.

Thereafter, the authentication and approval process is performed to and from the AAA server 90 (step S5609: authentication/approval process). When the connection of the UE_LAN 2000 is correctly authenticated and approved, the connection control unit 1019 generates a DHCP response message including any of the IP address provided to the UE_LAN 2000 by the connection control unit or the IP address, provided by the AAA server 90, which is notified during an authentication and approval procedure, or commands the local communication unit 1011 to generate the response message, and transmits it to the UE_LAN 2000 via the local communication unit 1011 (step S5611: DHCP response transmission).

Meanwhile, in each of the above-mentioned embodiments, particularly, a 3GPP SAE (System Architecture Evolution) system is taken by way of example, but an application to UMTS or GPRS systems and 3GPP2 or WiMAX systems in the related art can also be made by a slight change of message names, parameters or the like. Here, the operations relating to the present invention as described above can be applied to other systems by those skilled in the art, without substantial changes.

In addition, in each of the above-mentioned embodiments, although a case has been described in which the connection to the APN other than the APN (APN-L) indicating a local network is subject to regulation (that is, Non-3G connection on the LIPA), a specific APN other than the APN-L may exclude from an object to be regulated. That is, a specific APN other than the APN-L can be connected to a desired PDN from a local base station through the SGW and the PGW of the core network (without passing through LIPA). This can be implemented by sorting out APNs subject to regulation based on the user subscription of the UE, in devices such as the MME or the local base station.

In addition, each functional block used for the description of each of the above-mentioned embodiments is typically realized as an LSI which is an integrated circuit. The functional blocks may be individually formed in one chip, and may be formed in one chip so as to include some or all of them. Although referred to as the LSI herein, it may also be referred to as an IC, a system LSI, a super LSI, and an ultra LSI, depending on the difference in the degree of integration.

In addition, an approach for forming an integrated circuit is not limited to the LSI, but may be realized by a dedicated circuit or a general-purpose processor. After LSI manufacturing, FPGA (Field Programmable Gate Array) capable of being programmed or a reconfigurable processor capable of reconfiguring the connection and setting of a circuit cell in the inside of the LSI may be used.

Further, when technology for forming an integrated circuit replaced with the LSI by the development of semiconductor technology or another technology derived therefrom makes its appearance, the integration of the functional block may be naturally performed using the technology. Biotechnology or the like may be possibly applied.

Although the present invention has been described in detail and with reference to specific embodiments, it will be obvious to those skilled in the art that various changes and modifications can be made without departing from the spirit and scope of the present invention.

The present application is based upon Japanese Patent Applications No. 2010-202516 filed on Sep. 9, 2010 and No. 2011-133394 filed on Jun. 15, 2011, the contents of which are incorporated herein by reference.

INDUSTRIAL APPLICABILITY

A communication system, a communication method, a mobile terminal, and a base station device according to the present invention are capable of realizing real-time and inexpensive security filtering for the traffic of a mobile terminal, and are useful as a communication system, a communication method, a mobile terminal, a base station device, and the like.

REFERENCE SIGNS LIST

10, 10A to 10E, 1000: mobile terminal (UE)
11, 1041: wireless communication unit
13, 1013: communication processing unit
15, 1015: N3G connection establishment processing unit
17, 1017: application unit 17
19, 19A to 19E, 1019: connection control unit
20, 20A to 20E: local base station
30: local gateway (LGW)
40: filter gateway (filter GW)
50, 50A to 50E: mobility management entity (MME)
60: packet gateway ePDG
70: packet gateway PGW
80: DHCP server
90: AAA server
100: local RAN
110: local network
120: provider network
130: core network
140: macro RAN
150: macro base station eNB
160: serving gateway (SGW)
200: external network PDN (PDN (APN-M))
2000: UE_LAN

The invention claimed is:

1. A base station device, comprising:
a base station processing unit that performs a base station process on a mobile terminal and a core network device;
a cellular communication unit for connection to the mobile terminal through a cellular channel; and
a connection control unit, wherein
the cellular communication unit receives a connection request message (Attach Request) for connection to an external network PDN from the mobile terminal,
when an access point name (APN) indicating a local network is other than APN-L based on the access point name (APN) specified in the connection request message, the base station processing unit replaces the access point name (APN) of the connection request message with "APN-L" which is an access point name (APN) and transfers the replaced connection request message to a mobility management entity (MME), and
the connection control unit performs a radio bearer setting process between the mobile terminal (UE) and the connection control unit through the cellular communication unit based on a context setup request message in which the "APN-L" which is an access point name (APN), having a bearer established, received from the mobility management entity (MME) is stored.

2. A mobile terminal, comprising:
a communication processing unit that performs protocol processing including a connection and a handover to a base station device;
a connection establishment processing unit that switches between a connection to an external network PDN through the base station device and a connection using LIPA through the base station device; and
an N3G connection establishment processing unit that performs a handover using a Non3G access method, wherein
the connection establishment processing unit performs the handover using the Non3G access method through the N3G connection establishment processing unit when it is determined that an access point name (APN) of a connection destination notified from the base station device through the communication processing unit at a time of reconnection is an access point name (APN-L) for LIPA which is different from an access point name (APN-M) of the external network PDN which is an access point name (APN) of a connection destination specified through the communication processing unit at a time of initial connection.

3. The mobile terminal according to claim 2, further comprising
a local communication unit that performs local communication, wherein
when a connection request message is received from a local mobile terminal which is connected through the local communication unit, the connection establishment processing unit specifies ePDG serving as a destination of the received connection request message, and generates a message that commands connection to ePDG to which the mobile terminal is connected, when the specified ePDG is different from ePDG to which the mobile terminal is connected, and
the local communication unit transmits the message generated in the connection establishment processing unit to the local mobile terminal.

4. A base station device, comprising:
an LGW communication unit that performs a protocol for connection to a local gateway (LGW);
a cellular communication unit for connection to a mobile terminal through a cellular channel; and
a connection control unit, wherein
the LGW communication unit stores an access point name (APN-L) for LIPA in a handover indication message to transmit the handover indication message to a mobility management entity (MME), and receives a context setup request message that stores the access point name (APN-L) for LIPA, as an access point name (APN) having a radio bearer established, from the mobility management entity (MME), and
the connection control unit performs a setting process of a LIPA bearer which is different from a bearer to an external network PDN established before a handover through the cellular communication unit based on the access point name (APN-L) for LIPA stored in the context setup request message.

5. A communication system in which a mobile terminal returns from an idle mode to start communication, wherein
a base station device stores an access point name (APN-L) of LIPA to which the mobile terminal is capable of being connected through the base station device, in a service request message for causing the mobile terminal to return from the idle mode and start the communication, and transmits the service request message to a mobility management entity (MME), and
the mobility management entity (MME)
selects an address of a local gateway (LGW) corresponding to the access point name (APN-L) of LIPA which is stored in the service request message, and
transmits a context setup request message in which "APN-L" which is an access point name (APN), having a radio bearer established, is stored, to the base station device.

6. A communication system in which a mobile terminal performs a handover from a base station device to a macro base station eNB, wherein
the macro base station eNB stores information indicating whether or not to allow LIPA to be performed on an access point name (APN) to which the mobile terminal is connected, in a handover indication message, based on a handover confirmation message received from the mobile terminal, and transmits the handover indication message to a mobility management entity (MME), and
the mobility management entity (MME)
hands over an established LIPA bearer to the macro base station eNB, when it is determined that LIPA is able to be performed based on the information indicating whether or not to allow LIPA to be performed, and
extracts an address of a packet gateway PGW to which a connection on a LIPA bearer is connected based on subscriber information of the mobile terminal, when it is determined that LIPA is not able to be performed based on the information indicating whether or not to allow LIPA to be performed.

7. A communication system including a macro base station (eNB) and a mobility management entity (MME), in which a mobile terminal returns from an idle mode to start communication, wherein
the macro base station eNB stores information indicating whether or not to allow LIPA to be performed on an access point name (APN) to which the mobile terminal is connected, in a service request message for causing the mobile terminal to return from the idle mode to start the communication, and transmits the service request message to the mobility management entity (MME), and
the mobility management entity (MME)
establishes an established LIPA bearer in the macro base station eNB, when it is determined that LIPA is able to be performed based on the information indicating whether or not to allow LIPA to be performed, and
extracts an address of a packet gateway PGW to which a connection on a LIPA bearer is connected based on subscriber information of the mobile terminal, when it is determined that LIPA is not able to be performed based on the information indicating whether or not to allow LIPA to be performed.

8. A communication system in which a mobile terminal is connected to an external network PDN from a base station device via a LIPA bearer, wherein
the mobile terminal stores an access point name (APN-M) indicating the external network PDN serving as a connection destination on an established LIPA bearer, and transmits a DHCP request message to a DHCP server, and
the DHCP server commands a filter gateway to establish a path with a packet gateway PGW, when connection to "APN-M" is approved to the mobile terminal as a result of authentication/approval to APN-M received from an AAA server, and transmits a DHCP response message storing an IP address for connection to APN-M, to the mobile terminal.

9. A communication method between a mobile terminal and a base station device which includes a base station processing unit that performs a base station process on the mobile terminal and a core network device, a cellular communication unit for connection to the mobile terminal through a cellular channel, and a connection control unit, the communication method comprising:
a step of causing the cellular communication unit to receive a connection request message (Attach Request) for connection to an external network PDN from the mobile terminal;
a step of causing the base station processing unit to replace an access point name (APN) of the connection request message with "APN-L" which is an access point name (APN) and transfer the connection request message to a mobility management entity (MME), when the access point name (APN) indicating a local network is other than APN-L based on the access point name (APN) specified in the connection request message, and
a step of causing the connection control unit to perform a radio bearer setting process between the mobile terminal (UE) and the connection control unit through the cellular communication unit based on a context setup request message in which the "APN-L" which is an access point name (APN), having a bearer established, received from the mobility management entity (MME) is stored.

* * * * *